United States Patent
Daniell

(10) Patent No.: US 8,037,141 B2
(45) Date of Patent: Oct. 11, 2011

(54) INSTANT MESSAGING (IM) INTERNET CHAT CAPABILITY FROM DISPLAYED EMAIL MESSAGES

(75) Inventor: W. Todd Daniell, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 11/405,259

(22) Filed: Apr. 17, 2006

(65) Prior Publication Data

US 2006/0190546 A1 Aug. 24, 2006

Related U.S. Application Data

(63) Continuation-in-part of application No. 10/325,268, filed on Dec. 19, 2002, now abandoned.

(60) Provisional application No. 60/411,336, filed on Sep. 17, 2002, provisional application No. 60/416,916, filed on Oct. 8, 2002, provisional application No. 60/419,613, filed on Oct. 17, 2002, provisional application No. 60/426,145, filed on Nov. 14, 2002, provisional application No. 60/426,146, filed on Nov. 14, 2002, provisional application No. 60/426,422, filed on Nov. 14, 2002, provisional application No. 60/426,432, filed on Nov. 14, 2002, provisional application No. 60/426,440, filed on Nov. 14, 2002.

(51) Int. Cl.
*G06F 15/16* (2006.01)
(52) U.S. Cl. ..................................................... 709/206
(58) Field of Classification Search .................. 709/206, 709/201
See application file for complete search history.

(56) References Cited

U.S. PATENT DOCUMENTS

| | | | |
|---|---|---|---|
| 5,734,901 A * | 3/1998 | Sidhu et al. .................... | 712/220 |
| 5,917,489 A | 6/1999 | Thurlow et al. | |
| 5,966,714 A | 10/1999 | Huang et al. | |
| 6,020,884 A | 2/2000 | MacNaughton et al. | |
| 6,052,121 A | 4/2000 | Webster et al. | |
| 6,057,841 A | 5/2000 | Thurlow et al. | |
| 6,151,643 A | 11/2000 | Cheng et al. | |
| 6,185,568 B1 | 2/2001 | Douceur et al. | |
| 6,192,410 B1 | 2/2001 | Miller et al. | |
| 6,212,548 B1 | 4/2001 | DeSimone et al. | |
| 6,269,369 B1 | 7/2001 | Robertson | |
| 6,301,609 B1 | 10/2001 | Aravamudan et al. | |
| 6,377,944 B1 | 4/2002 | Busey et al. | |
| 6,405,243 B1 | 6/2002 | Nielsen | |
| 6,430,602 B1 | 8/2002 | Kay et al. | |
| 6,430,604 B1 | 8/2002 | Ogle et al. | |

(Continued)

OTHER PUBLICATIONS

International Search Report mailed Mar. 3, 2004, for PCT/US03/35759.

(Continued)

*Primary Examiner* — Glenton B Burgess
*Assistant Examiner* — Bradford F Fritz
(74) *Attorney, Agent, or Firm* — Thomas, Kayden, Horstemeyer & Risley, LLP

(57) ABSTRACT

Systems and methods for integrating instant messaging (IM) services and email services are described. In one embodiment an email window is configured to display an email message, the email message including a plurality of intended recipients, wherein the email window is also configured to display information about the plurality of intended recipients. At least one embodiment also includes an instant messaging (IM) option configured to begin an instant messaging session with at least two intended recipients having information displayed in the email window.

20 Claims, 59 Drawing Sheets

U.S. PATENT DOCUMENTS

| | | | |
|---|---|---|---|
| 6,463,078 | B1 | 10/2002 | Engstrom et al. |
| 6,480,860 | B1 | 11/2002 | Monday |
| 6,484,196 | B1 | 11/2002 | Maurille |
| 6,539,421 | B1 | 3/2003 | Appelman et al. |
| 6,549,937 | B1 | 4/2003 | Auerbach et al. |
| 6,669,564 | B1 | 12/2003 | Young et al. |
| 6,675,356 | B1 | 1/2004 | Adler et al. |
| 6,684,248 | B1 | 1/2004 | Janacek et al. |
| 6,697,474 | B1 | 2/2004 | Hanson et al. |
| 6,781,608 | B1 | 8/2004 | Crawford |
| 6,839,737 | B1 * | 1/2005 | Friskel ............. 709/206 |
| 6,847,969 | B1 | 1/2005 | Mathai et al. |
| 6,865,268 | B1 | 3/2005 | Matthews et al. |
| 6,879,994 | B1 | 4/2005 | Matsliach et al. |
| 6,907,447 | B1 * | 6/2005 | Cooperman et al. ........ 709/203 |
| 6,910,081 | B1 | 6/2005 | Hammond |
| 6,912,564 | B1 * | 6/2005 | Appelman et al. ........ 709/204 |
| 6,941,149 | B2 | 9/2005 | Smith et al. |
| 6,941,345 | B1 | 9/2005 | Kapil et al. |
| 6,978,136 | B2 | 12/2005 | Jenniges |
| 6,981,223 | B2 * | 12/2005 | Becker et al. ............. 715/753 |
| 7,000,194 | B1 | 2/2006 | Newbold |
| 7,007,068 | B2 | 2/2006 | Morkel |
| 7,024,459 | B2 | 4/2006 | McNamara et al. |
| 7,197,537 | B2 | 3/2007 | Koch |
| 7,222,156 | B2 | 5/2007 | Gupta et al. |
| 7,290,033 | B1 | 10/2007 | Goldman et al. |
| 7,317,928 | B2 | 1/2008 | Stewart et al. |
| 7,525,951 | B2 * | 4/2009 | Musil et al. .............. 370/352 |
| 2002/0032573 | A1 | 3/2002 | Williams et al. |
| 2002/0046250 | A1 | 4/2002 | Nassiri |
| 2002/0049751 | A1 | 4/2002 | Chen et al. |
| 2002/0061003 | A1 | 5/2002 | Sumner et al. |
| 2002/0065887 | A1 | 5/2002 | Paik et al. |
| 2002/0065894 | A1 | 5/2002 | Dalal |
| 2002/0120716 | A1 | 8/2002 | Raghunathan et al. |
| 2002/0198946 | A1 | 12/2002 | Wang et al. |
| 2003/0013483 | A1 | 1/2003 | Ausems et al. |
| 2003/0023691 | A1 | 1/2003 | Knauerhase |
| 2003/0030670 | A1 | 2/2003 | Duarte et al. |
| 2003/0110227 | A1 | 6/2003 | O'Hagan |
| 2003/0210265 | A1 * | 11/2003 | Haimberg ............. 345/758 |
| 2003/0217096 | A1 | 11/2003 | McKelvie et al. |
| 2003/0217108 | A1 | 11/2003 | Karim |
| 2003/0229670 | A1 | 12/2003 | Beyda |
| 2003/0229673 | A1 | 12/2003 | Malik |
| 2004/0054737 | A1 | 3/2004 | Daniell |
| 2004/0078445 | A1 | 4/2004 | Malik |
| 2004/0128356 | A1 | 7/2004 | Bernstein et al. |
| 2004/0193722 | A1 | 9/2004 | Donovan |
| 2004/0254998 | A1 | 12/2004 | Horvitz |
| 2004/0267887 | A1 | 12/2004 | Berger et al. |
| 2005/0030937 | A1 | 2/2005 | Wick et al. |
| 2005/0080852 | A1 | 4/2005 | Kelley et al. |
| 2005/0080864 | A1 | 4/2005 | Daniell |
| 2005/0091319 | A1 | 4/2005 | Kirsch |
| 2005/0091329 | A1 | 4/2005 | Friskel |
| 2005/0223069 | A1 | 10/2005 | Cooperman et al. |
| 2006/0036683 | A1 | 2/2006 | Bracewell et al. |
| 2006/0080393 | A1 | 4/2006 | Cardone et al. |
| 2007/0016647 | A1 | 1/2007 | Gupta et al. |
| 2007/0260580 | A1 | 11/2007 | Omoigui |

OTHER PUBLICATIONS

International Search Report mailed May 11, 2004, for PCT/US03/29066.
International Search Report mailed May 5, 2004, for PCT/US03/29226.
Oikarinen; "Internet Relay Chat Protocol", May 1993, pp. 1-65.
Andre: "XMPP Instant Messaging", Jabber Software Foundation, Jun. 4, 2003, pp. 1-88.
Start up Program, www.malvino.com, Nov. 22, 1998, pp. 1-6.
Trillian; Communicate with Flexibility and Style, www.ceruleanstudios.com, Sep. 10, 2002, pp. 1-15.
Jabber; "Open Instant Messaging Powered by XMPP",www.jabber.org, Apr. 23, 2003, pp. 1-3.
Ramsel; "Simple Instant Messaging and Presence 1.3 Protocol", Mitre Corporation, Jun. 2001, pp. 1-19.
Day; "A Model for Presence and Instant Messaging", Feb. 2000, pp. 1-17.
Paik; "Impp, simple, prim, iptel (CPL), sigtran(SCTP)", Apr. 22, 2002, pp. 1-248.
Angerstein (WG); "Extensible Markup Language (XML) 1.0", W3C Recommendation, Second Edition, Oct. 6, 2000, pp. 1-59.
Osborne; "RVP: A Presence and Instant Messaging Protocol", Dec. 2000, pp. 1-37.
Rosenberg; "SIP Even Packages for Call Leg and Conference State", Mar. 1, 2002, pp. 1-23.
Trillian; Features, Tour, messaging Enhancements, Connect to 5 Mediums, Interface Overview, Features Tour, Gallery-Contact List, Sending Pictures, Message Windows, Apr. 23, 2003, pp. 1-9.
Rosenberg; "A Component Model for SIMPLE", Feb. 22, 2002, pp. 1-11.
Day; "Instant Messaging/ Presence Protocol Requirements", Feb. 2000, pp. 1-26.
Daniell; U.S. Appl. No. 10/686,433, filed Oct. 14, 2003.
Daniell; U.S. Appl. No. 10/814,202, filed Mar. 31, 2004.
Daniell; U.S. Appl. No. 10/326,479, filed Dec. 19, 2002.
Daniell; U.S. Appl. No. 10/325,317, filed Dec. 19, 2002.
Daniell; U.S. Appl. No. 10/325,268, filed Dec. 19, 2002.
Daniell; U.S. Appl. No. 10/325,044, filed Dec. 19, 2002.
Malik; U.S. Appl. No. 10/686,431, filed Oct. 14, 2003.
Malik; U.S. Appl. No. 10/686,345, filed Oct. 14, 2003.
Daniell; Non-Final Rejection mailed May 7, 2003; for U.S. Appl. No. 10/686,433, filed Oct. 14, 2003.
Daniell; Examiner Interview Summary Record mailed Jul. 23, 2007; for U.S. Appl. No. 10/686,433, filed Oct. 14, 2003.
28 Daniell; Requirement for Restriction/Election mailed Oct. 19, 2007; for U.S. Appl. No. 10/686,433, filed Oct. 14, 2003.
Daniell; Non-Final Rejection mailed Dec. 21, 2004; for U.S. Appl. No. 10/814,202, filed Mar. 31, 2004.
Daniell; Examiner Interview Summary Record mailed Feb. 25, 2005; for U.S. Appl. No. 10/814,202, filed Mar. 31, 2004.
Daniell; Final Rejection mailed Jun. 16, 2005; for U.S. Appl. No. 10/814,202, filed Mar. 31, 2004.
Daniell; Non-Final Rejection mailed Dec. 1, 2005; for U.S. Appl. No. 10/814,202, filed Mar. 31, 2004.
Daniell; Examiner Interview Summary Record mailed Dec. 1, 2005; for U.S. Appl. No. 10/814,202, filed Mar. 31, 2004.
Daniell; Final Rejection mailed May 10, 2006; for U.S. Appl. No. 10/814,202, filed Mar. 31, 2004.
Daniell; Examiner Interview Summary Record mailed Jul. 14, 2006; for U.S. Appl. No. 10/814,202, filed Mar. 31, 2004.
Daniell; Examiner Interview Summary Record mailed Aug. 29, 2006; for U.S. Appl. No. 10/814,202, filed Mar. 31, 2004.
Daniell; Non-Final Rejection mailed Sep. 22, 2006; for U.S. Appl. No. 10/814,202, filed Mar. 31, 2004.
Daniell; Final Rejection mailed Mar. 28, 2007; for U.S. Appl. No. 10/814,202, filed Mar. 31, 2004.
Daniell; Examiner Interview Summary Record mailed Jun. 20, 2007; for U.S. Appl. No. 10/814,202, filed Mar. 31, 2004.
Daniell; Non-Final Rejection mailed Sep. 4, 2007; for U.S. Appl. No. 10/814,202, filed Mar. 31, 2004.
Daniell; Examiner Interview Summary Record mailed Oct. 29, 2007; for U.S. Appl. No. 10/814,202, filed Mar. 31, 2004.
Daniell; Non-Final Rejection mailed Apr. 19, 2006; for U.S. Appl. No. 10/326,479, filed Dec. 19, 2002.
Daniell; Examiner Interview Summary Record mailed Jun. 8, 2006; for U.S. Appl. No. 10/326,479, filed Dec. 19, 2002.
Daniell; Final Rejection mailed Sep. 28, 2006; for U.S. Appl. No. 10/326,479, filed Dec. 19, 2002.
Daniell; Non-Final Rejection mailed Mar. 6, 2007; for U.S. Appl. No. 10/326,479, filed Dec. 19, 2002.
Daniell; Final Rejection mailed Aug. 27, 2007; for U.S. Appl. No. 10/326,479, filed Dec. 19, 2002.
Daniell; Non- Final Rejection mailed Apr. 24, 2006; for U.S. Appl. No. 10/325,317, filed Dec. 19, 2002.
Daniell; Final Rejection mailed Oct. 6, 2006; for U.S. Appl. No. 10/325,317, filed Dec. 19, 2002.

Daniell; Examiner Interview Summary Record mailed Jan. 8, 2007; for U.S. Appl. No. 10/325,317, filed Dec. 19, 2002.
Daniell; Non-Final Rejection mailed Mar. 21, 2007; for U.S. Appl. No. 10/325,317, filed Dec. 19, 2002.
Daniell; Final Rejection mailed Sep. 7, 2007; for U.S. Appl. No. 10/325,317, filed Dec. 19, 2002.
Daniell; Non-Final Rejection mailed Apr. 21, 2006; for U.S. Appl. No. 10/325,268, filed Dec. 19, 2002.
Daniell; Final Rejection mailed Oct. 25, 2006; for U.S. Appl. No. 10/325,268, filed Dec. 19, 2002.
Daniell; Examiner Interview Summary Record mailed Jan. 8, 2007; for U.S. Appl. No. 10/325,268, filed Dec. 19, 2002.
Daniell; Advisory Action mailed Feb. 14, 2007; for U.S. Appl. No. 10/325,268, filed Dec. 19, 2002.
Daniell; Requirement for Restriction/Election mailed Feb. 23, 2004; for U.S. Appl. No. 10/325,044, filed Dec. 19, 2002.
Daniell; Non-Final Rejection mailed May 3, 2004; for U.S. Appl. No. 10/325,044, filed Dec. 19, 2002.
Daniell; Examiner Interview Summary Record mailed Jan. 6, 2005; for U.S. Appl. No. 10/325,044, filed Dec. 19, 2002.
Daniell; Non-Final Rejection mailed Feb. 24, 2005; for U.S. Appl. No. 10/325,044, filed Dec. 19, 2002.
Daniell; Final Rejection mailed Aug. 25, 2005; for U.S. Appl. No. 10/325,044, filed Dec. 19, 2002.
Daniell; Non-Final Rejection mailed Dec. 30, 2005; for U.S. Appl. No. 10/325,044, filed Dec. 19, 2002.
Daniell; Examiner Interview Summary Record mailed Jul. 5, 2006; for U.S. Appl. No. 10/325,044, filed Dec. 19, 2002.
Daniell; Final Rejection mailed Jul. 5, 2006; for U.S. Appl. No. 10/325,044, filed Dec. 19, 2002.
Daniell; Examiner Interview Summary Record mailed Aug. 29, 2006; for U.S. Appl. No. 10/325,044, filed Dec. 19, 2002.
Daniell; Non-Final Rejection mailed Oct. 23, 2006; for U.S. Appl. No. 10/325,044, filed Dec. 19, 2002.
Daniell; Final Rejection mailed Mar. 28, 2007; for U.S. Appl. No. 10/325,044, filed Dec. 19, 2002.
Daniell; Examiner Interview Summary Record mailed Jun. 20, 2007; for U.S. Appl. No. 10/325,044, filed Dec. 19, 2002.
Daniell; Non-Final Rejection mailed Sep. 4, 2007; for U.S. Appl. No. 10/325,044, filed Dec. 19, 2002.
Daniell; Examiner Interview Summary Record mailed Oct. 29, 2007; for U.S. Appl. No. 10/325,044, filed Dec. 19, 2002.
Malik; Non-Final Rejection mailed Sep. 24, 2007; U.S. Appl. No. 10/686,431, filed Oct. 14, 2003.
PCT/US03/29226, US, May 5, 2004.
PCT/US03/29066, US, May 11, 2004.
PCT/US03/35759, US, Mar. 3, 2004.
Daniell; U.S. Appl. No. 12/051,633, filed Mar. 19, 2008.
Daniell; Final Rejection mailed Feb. 20, 2008 for U.S. Appl. No. 10/686,433, filed Oct. 14, 2003.
Daniell; Advisory Action mailed Jul. 20, 2006 for U.S. Appl. No. 10/814,202, filed Mar. 31, 2004.
Daniell; Final Rejection mailed Jan. 25, 2008 for U.S. Appl. No. 10/814,202, filed Mar. 31, 2004.
Daniell; Non-Final Rejection mailed Jan. 25, 2008 for U.S. Appl. No. 10/326,479, filed Dec. 19, 2002.
Daniell; Non-Final Rejection mailed Jan. 25, 2008 for U.S. Appl. No. 10/325,317, filed Dec. 19, 2002.
Daniell; Non-Final Rejection mailed Mar. 20, 2008 for U.S. Appl. No. 10/325,268, filed Dec. 19, 2002.
Daniell; Final Rejection mailed Nov. 30, 2004 for U.S. Appl. No. 10/325,044, filed Dec. 19, 2002.
Daniell; Non-Final Rejection mailed Feb. 5, 2008 for U.S. Appl. No. 10/325,044, filed Dec. 19, 2002.
Daniell; Final Rejection mailed Apr. 25, 2008 for U.S. Appl. No. 10/686,431, filed Oct. 14, 2003.
Daniell; Non-Final Rejection mailed Mar. 24, 2008 for U.S. Appl. No. 10/686,345, filed Oct. 14, 2003.
Malik; Examiner Interview Summary mailed Jun. 23, 2008 for U.S. Appl. No. 10/686,345, filed Oct. 14, 2003.
Daniell; Advisory Action mailed Jun. 30, 2008 for U.S. Appl. No. 10/686,433, filed Oct. 14, 2003.
Malik; Non-Final Rejection mailed Aug. 13, 2008 for U.S. Appl. No. 10/686,431, filed Oct. 14, 2003.
Daniell; Non-Final Rejection mailed Aug. 13, 2008 for U.S. Appl. No. 10/686,433, filed Oct. 14, 2003.
Daniell; Final Office Action mailed Jun. 9, 2010 for U.S. Appl. No. 10/686,433, filed Oct. 14, 2003.
Daniell; Non-Final Office Action mailed Nov. 5, 2010 for U.S. Appl. No. 10/686,433, filed Oct. 14, 2003.
Daniell; Final Office Action mailed Feb. 2, 2011 for U.S. Appl. No. 12/051,633, filed Mar. 19, 2008.
Daniell; Notice of Allowance mailed Apr. 13, 2011 for U.S. Appl. No. 10/686,433, filed Oct. 14, 2003.

* cited by examiner

| ADDRESS BOOK | | | | | ? ⊖ ⊙ ⊗ |
|---|---|---|---|---|---|
| YOUR CONTACTS ARE IN ALPHABETICAL ORDER BY LAST NAME. TO FIND A SPECIFIC CONTACT, YOU CAN SCROLL THROUGH THE LIST OR USE THE SELECTION BUTTONS BELOW TO NARROW YOUR SEARCH. TO SEE A CONTACT'S COMPLETE INFORMATION DETAILS SELECT "CLICK." | | | | | |
| LAST NAMES A-K | | LAST NAMES L-Z | NUMBERS | | E-MAIL LISTS |
| SELECT RECIPIENTS | | ~1110 | ~1115 | | 1120~ |
| TO: | CC: | NAME | E-MAIL ADDRESS | | |
| ☒ | ☐ | BACH, JOHANN | BACHMAN@AOL.COM | | DETAILS |
| ☐ | ☐ | BAER, MAX | MAX@BELLSOUTH.NET | | DETAILS |
| ☒ | ☐ | BALDWIN, ALEC | BALD@EARTHLINK.NET | | DETAILS |
| ☐ | ☒ | BALDWIN, KIM | KIM@BELLSOUTH.NET | | DETAILS |
| ☐ | ☒ | BEST, PETE | BEST@HOTMAIL.COM | | DETAILS |
| ☐ | ☐ | BUNDY, AL | BUNDY@EXCITE.COM | | DETAILS |
| ☐ | ☐ | BUNDY, PEG | PEGGY@AOL.COM | | DETAILS |
| ☐ | ☒ | CARTER, JIMMY | PEANUT@GO.COM | | DETAILS |

305

| WRITE 1125 | NEW CONTACT 1130 | NEW E-MAIL LIST 1135 | DELETE 1140 | EDIT 1145 | CANCEL 1150 |
|---|---|---|---|---|---|

| ADD NEW CONTACT | |
|---|---|
| CONTACT NAME | |
| LAST HOWARD   FIRST CURLY   M.I. Q   _1260_ | |

| E-MAIL | INSTANT MESSAGING (IM) |
|---|---|
| CURLY@BELLSOUTH.NET — WORK ▽<br>WISEGUY@STOOGE.NET — HOME ▽<br>_1265_ | ENTER IM ADDRESS(ES) HERE, TO CHAT FROM "READ" WINDOW<br>CURLY2002 — BELLSOUTH<br>STOOGES1935 — AOL ▽<br>THECURLYMAN — HOTMAIL<br>WHYIOTTA — PASSPORT ▽<br>_1280_ |
| E-MAIL LIST(S)<br>STOOGE GROUP   [EDIT]<br>_1270_ | |
| PHONE NUMBER(S)   _1275_<br>770-555-6789 — WORK ▽<br>404-555-1234 — HOME ▽<br>678-555-5432 — CELL ▽ | STREET ADDRESS<br>1313 MOCKINGBIRD LN. — LINE 1<br>SUITE 1234 — LINE 2<br>ATLANTA CITY   GA ▽ STATE<br>30338 ZIP<br>_1285_ |

DESCRIPTION

CURLY HAS TWO BROTHERS, MOE AND SHEMP. SHEMP IS NOT TOO FUNNY. HIS BIRTHDAY IS IN AUGUST. DO NOT LEAVE HIM IN CHARGE.   _1290_

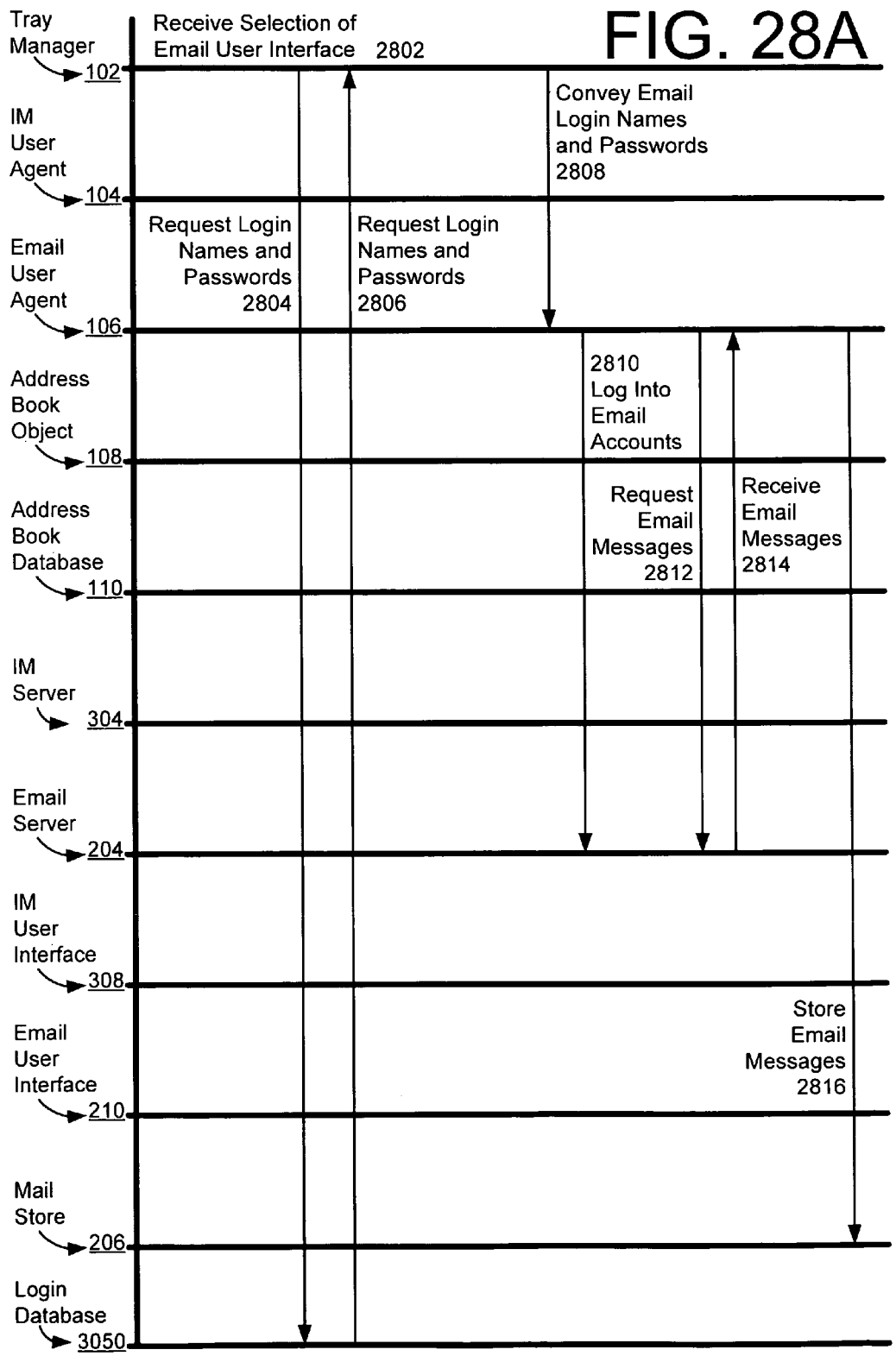

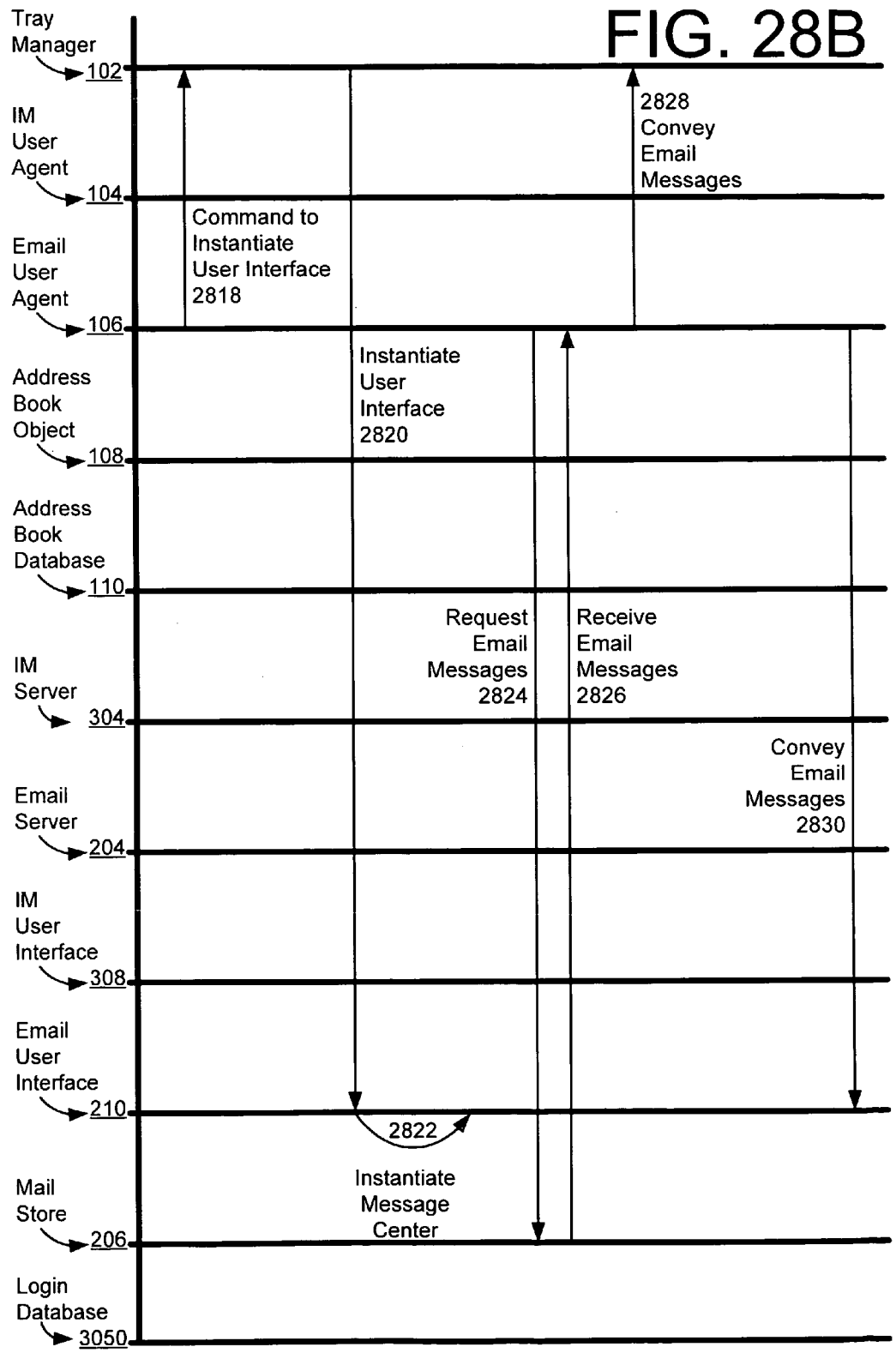

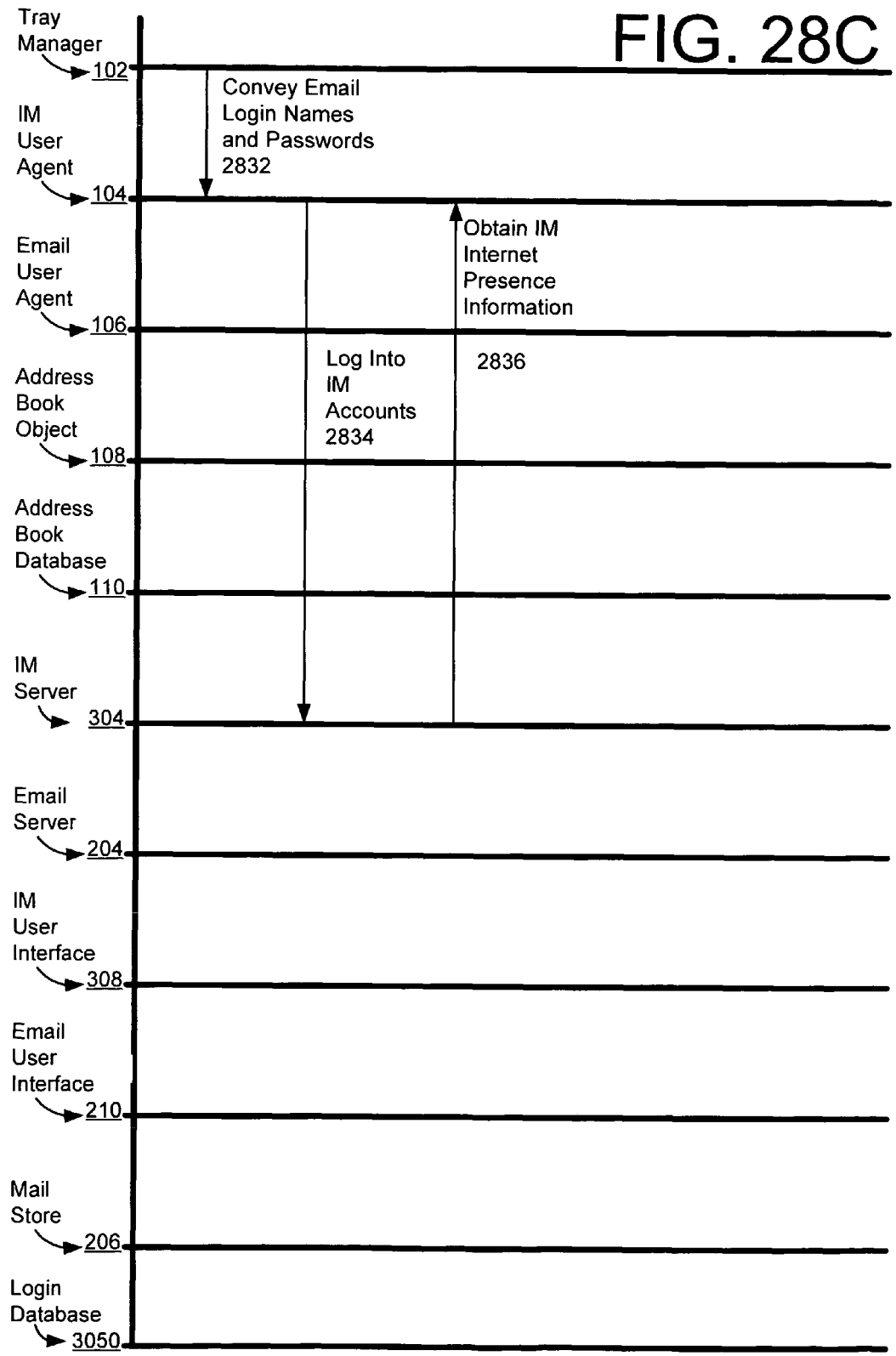

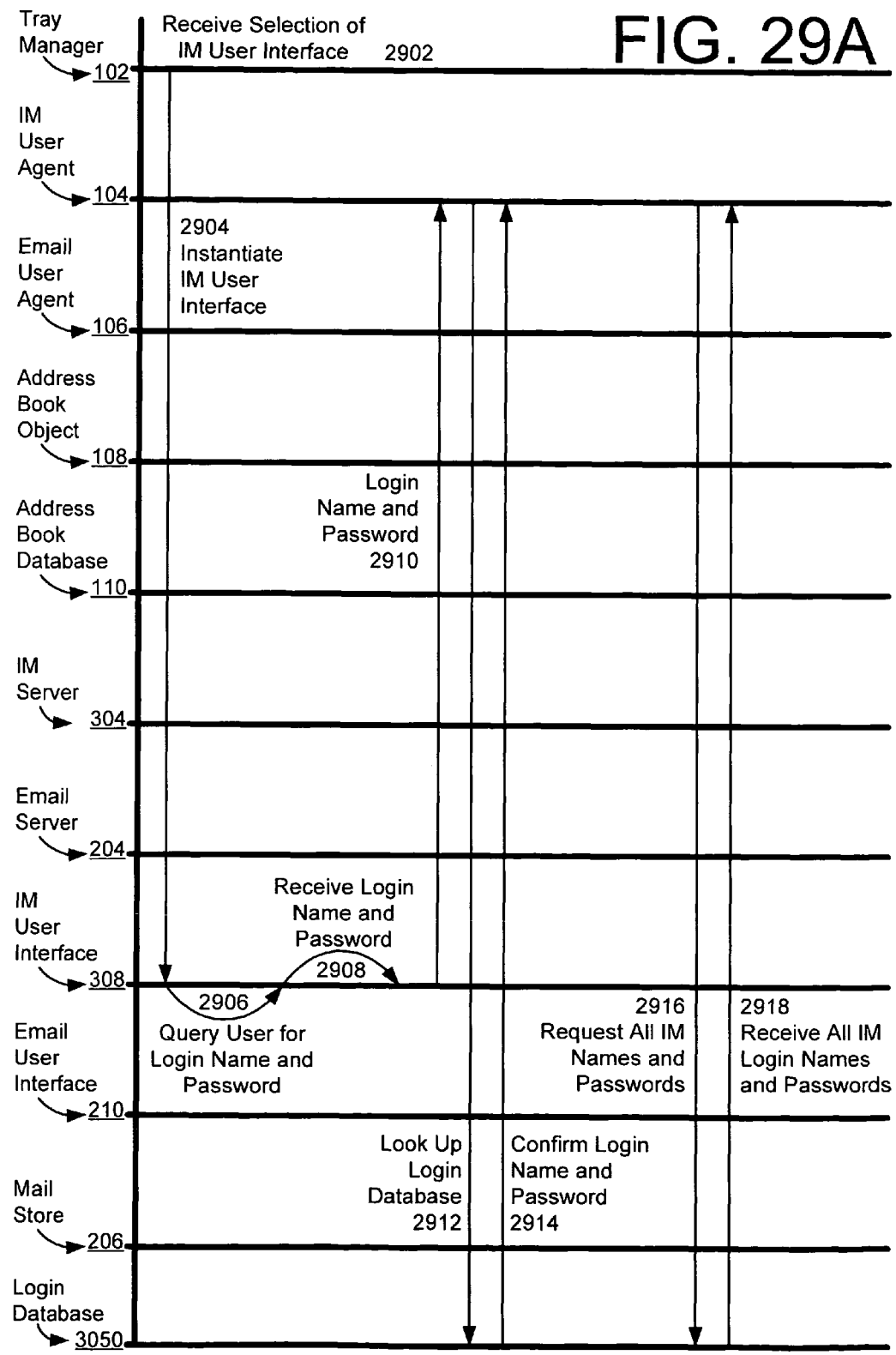

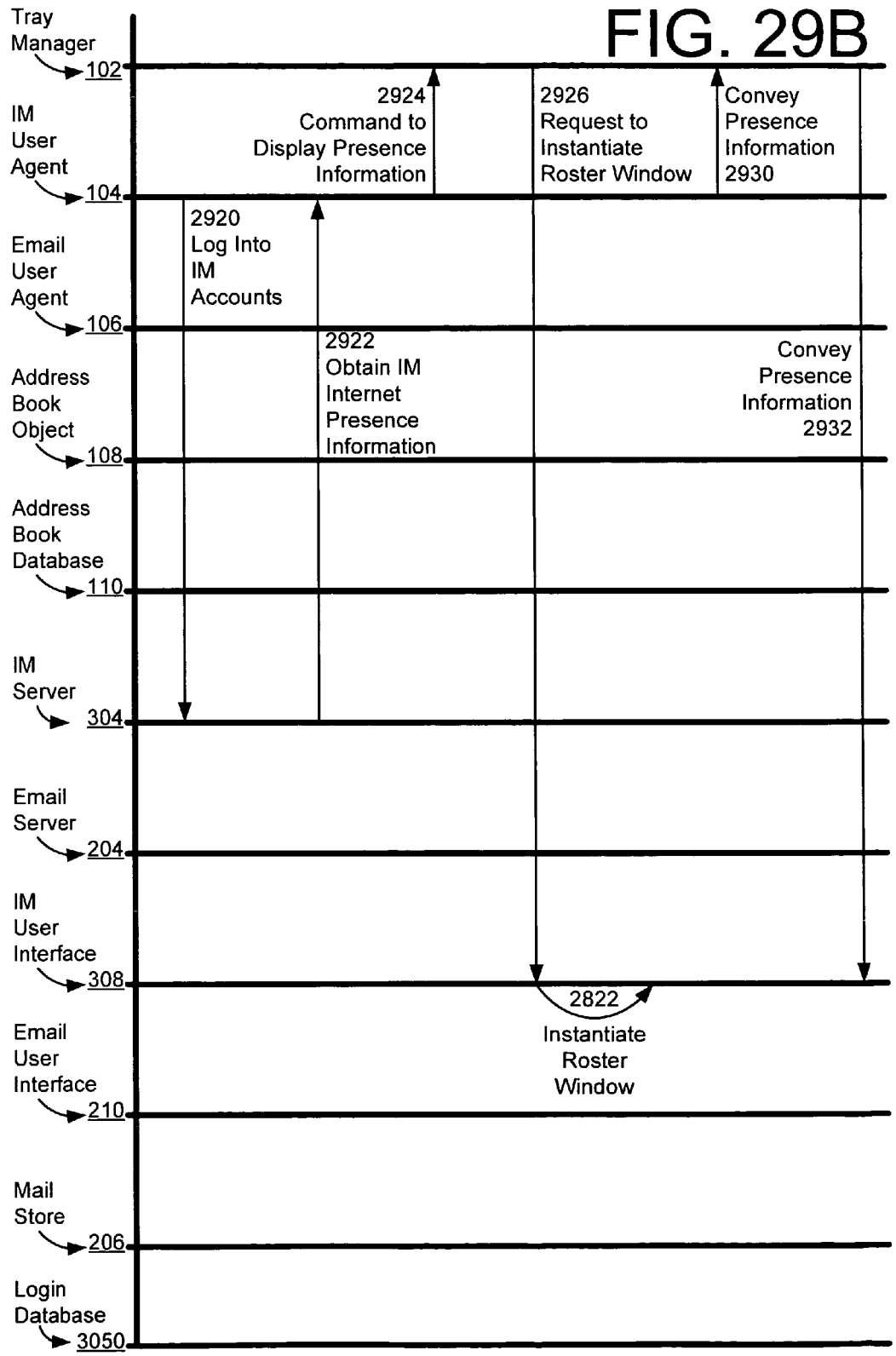

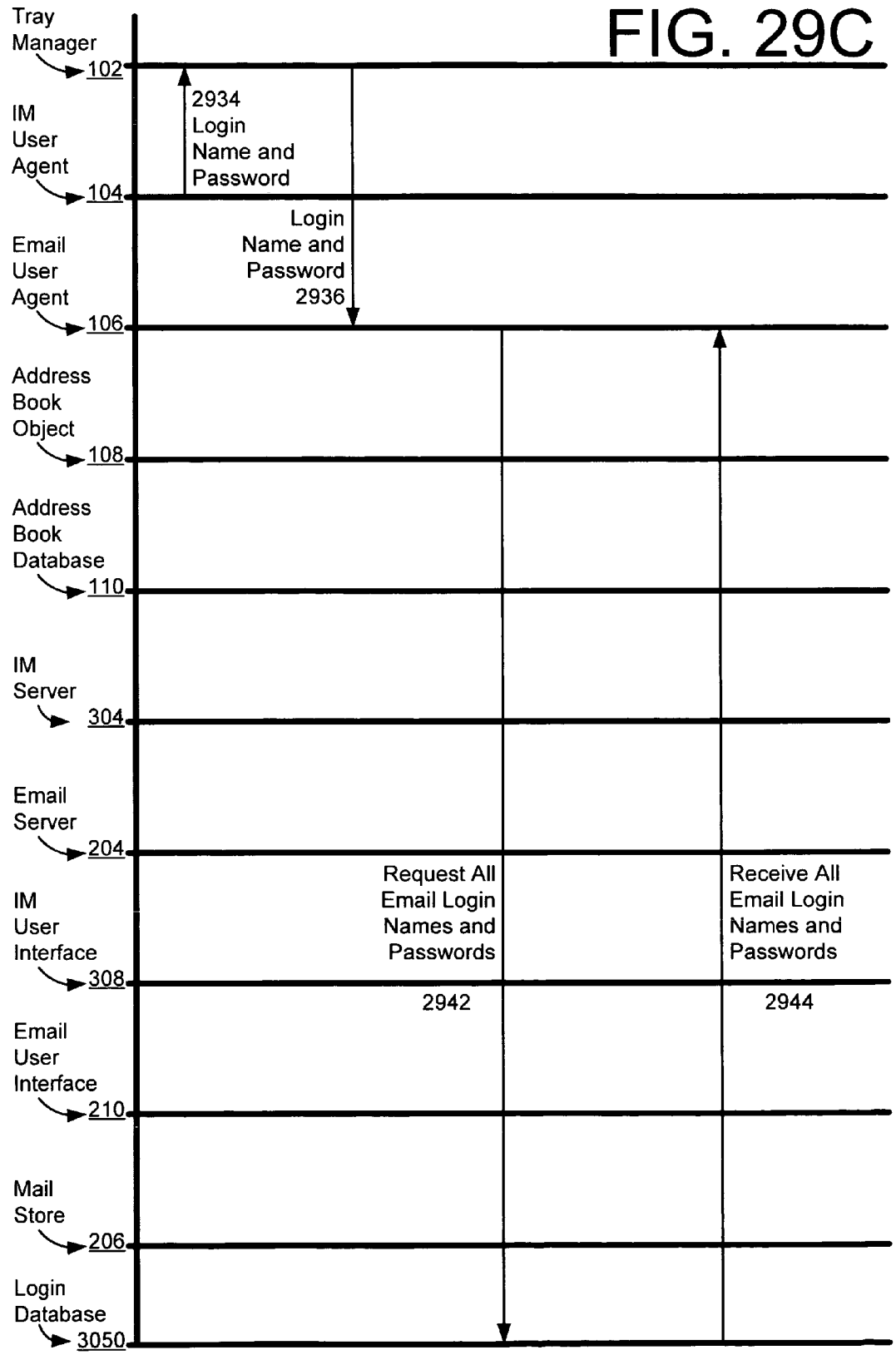

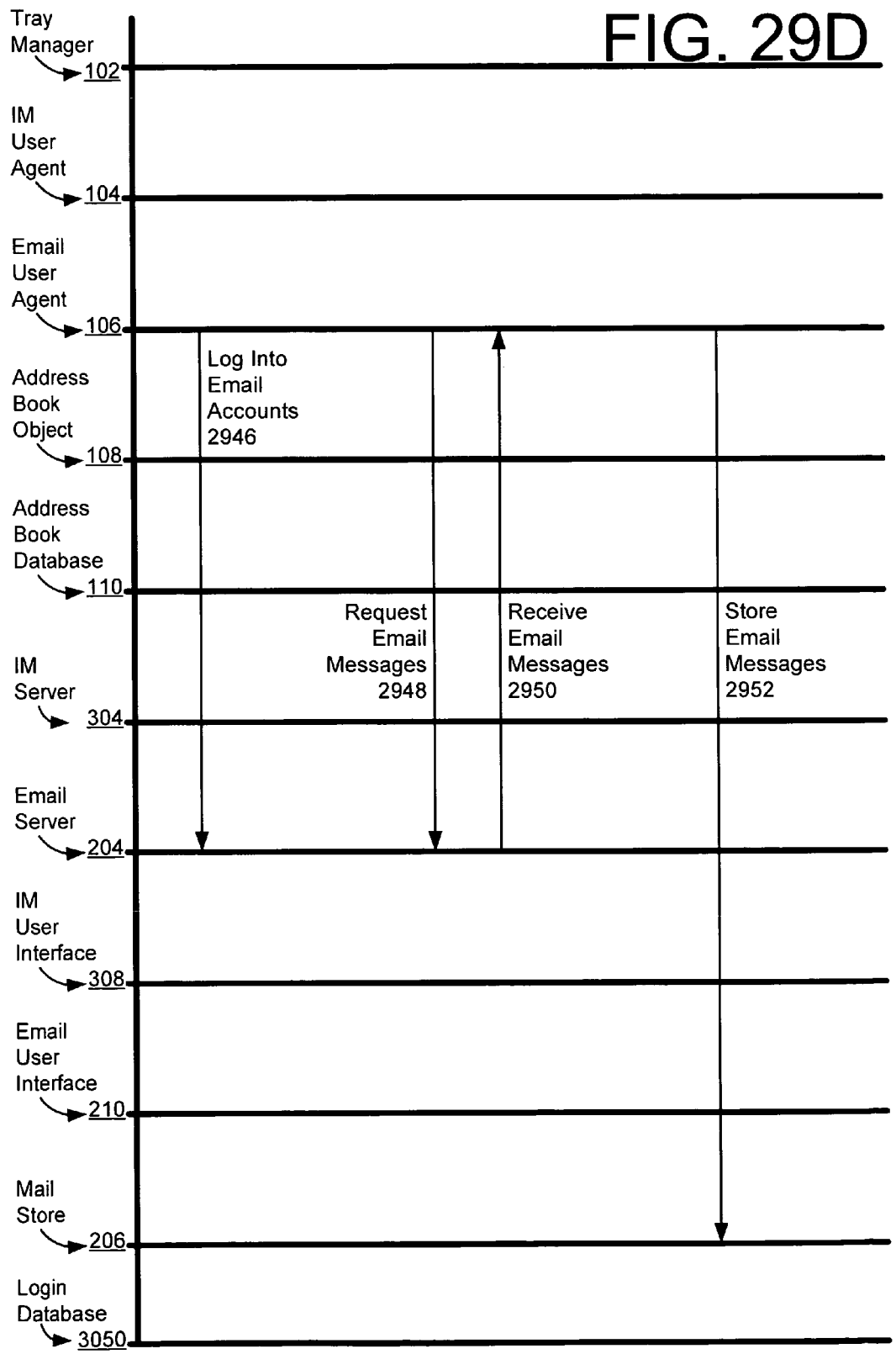

INSTANT MESSAGING (IM) INTERNET CHAT CAPABILITY FROM DISPLAYED EMAIL MESSAGES

CROSS REFERENCE TO RELATED APPLICATIONS

This application is a Continuation in Part of application Ser. No. 10/325,268, filed Dec. 19, 2002 now abandoned, which claims the benefit of provisional patent application No. 60/411,336, filed Sep. 17, 2002; provisional patent application No. 60/416,916, filed Oct. 8, 2002; provisional patent application No. 60/419,613, filed Oct. 17, 2002; Provisional patent application No. 60/426,145, filed Nov. 14, 2002; Provisional patent application No. 60/426,146, filed Nov. 14, 2002; Provisional patent application No. 60/426,422, filed Nov. 14, 2002; Provisional patent application No. 60/426,432, filed Nov. 14, 2002; and Provisional patent application No. 60/426,440, filed Nov. 14, 2002, which are all incorporated herein by reference as if set forth in their entireties.

Additionally, U.S. patent application Ser. No. 10/274,405, filed Oct. 18, 2002; Ser. No. 10/274,408, filed Oct. 18, 2002; and Ser. No. 10/274,478, filed Oct. 18, 2002 are also incorporated herein by reference as if set forth in their entireties.

TECHNICAL FIELD

The present invention relates generally to the Internet and, more particularly, to systems and methods for integrating instant messaging (IM) services and email services.

BACKGROUND

Instant messaging (IM) is a real-time based communications system while email is more of a correspondence form of messaging. Upon receiving an email message, rather than replying to the listed recipients via email, a user may wish to expedite communications by chatting via IM with the sender of the email or with other people (e.g., other contacts) addressed in the email message.

In the past, vendors have offered an IM roster as a single pane in the main email window, thereby permitting a user to launch a separate IM client to chat with a contact that is listed on the IM roster. However, this type of environment provided nothing more than a single view of two separate clients (e.g., an email client and an IM client). Additionally, current implementations fail to provide the ability to launch any of a plurality of different media types from an email window. Further, presence and location of senders and recipients of an email message has currently been unavailable.

Thus, a heretofore unaddressed need exists in the industry to address the aforementioned deficiencies and inadequacies.

SUMMARY

The present disclosure provides systems and methods for integrating instant messaging (IM) services and email services.

Briefly described, in architecture, one embodiment of a system includes an email window is configured to display an email message, the email message including a plurality of intended recipients, wherein the email window is also configured to display information about the plurality of intended recipients. At least one embodiment also includes an instant messaging (IM) option configured to begin an instant messaging session with at least two intended recipients having information displayed in the email window.

The present disclosure also provides methods for integrating instant messaging (IM) services and email services. In this regard, one embodiment of a method includes displaying a message in a first communications protocol in a message window, the message including a plurality of intended recipients, the message window being configured to display information about the at least one intended recipient and providing a second communication protocol option configured to begin a communications session with at least two intended recipients from the message window in a second protocol.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 11 is a diagram showing one embodiment of the address book user interface of FIG. 7 in greater detail.

FIG. 12 is a diagram showing one embodiment of a user interface for adding new contact information.

FIGS. 28A through 28C are data flow diagrams corresponding to FIGS. 2A through 2C.

FIGS. 29A through 29D are data flow diagrams corresponding to FIGS. 3A through 3C.

DETAILED DESCRIPTION

Figure 1:
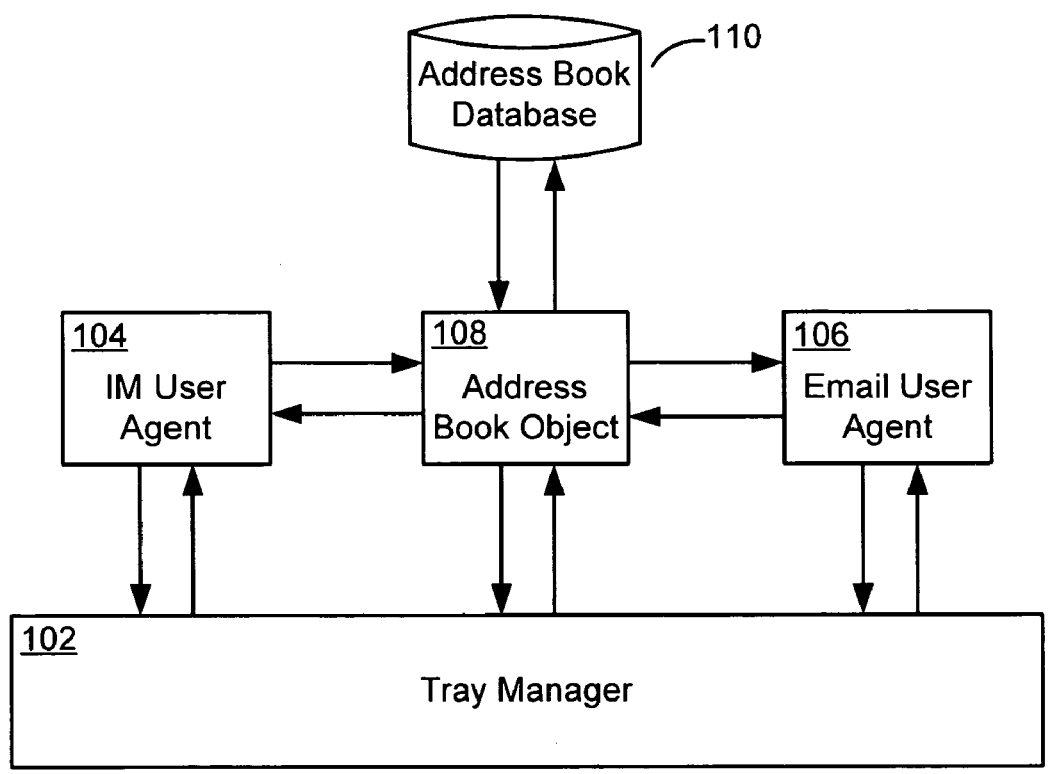
FIG. 1 is a block diagram showing one embodiment of component architecture for integrating instant messaging (IM) and email.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents. Additionally, while the following description and accompanying drawings specifically describe integration of instant messaging (IM) and email, it will be clear to one of ordinary skill in the art that the systems and methods presented herein may be extended to integrating other messaging protocols such as voice-over Internet protocol (VoIP), video conferencing, etc.

FIG. 1 is a block diagram showing one embodiment of component architecture for integrating instant messaging (IM) and email. As shown in FIG. 1, one embodiment of a system for integrating IM and email comprises a tray manager 102, an IM user agent 104, an email user agent 106, an address book object 108, and an address book database 110. In an example embodiment, the various components 102, 104, 106, 108, 110 may be seen as software modules, which are launched by a user on a personal computer (not shown) or other programmable device (not shown). In another embodiment, the various components 102, 104, 106, 108, 110 may be seen as software objects in a distributed network (not shown), which are instantiated and destroyed by appropriate software commands. Since instantiation and destruction of objects in distributed networks is well known, further discussion of object instantiation and destruction is omitted.

In one embodiment, the various components 102, 104, 106, 108, 110 of FIG. 1 are software modules on a user's personal computer (not shown). In this regard, the software modules are installed on a user's personal computer and, thereafter, are launched by the user. During installation of the software modules, the user is queried for the user's login names and passwords for all of the user's email accounts and all of the user's IM accounts. The login names and passwords for the user's email and IM accounts are stored in a login database (not shown) for subsequent use by the software modules.

Upon installation of the software modules onto the personal computer (not shown), a user launches the tray manager 102. The tray manager 102 generates commands to launch the IM user agent 104, the address book object 108, the email user agent 106, and the address book database 110 as background processes. In response to the generated commands, the various components 104, 106, 108, 110 are launched as background processes. The address book object 108 is coupled to the address book database 110 so that information may be stored to the address book database 110 by the address book object 108 or retrieved from the address book database 110 by the address book object 108. Information stored in the address book database 110 may include, for example, names and email addresses of the user's email contacts, names and IM addresses of the user's IM contacts, phone numbers for the various email and IM contacts, mailing addresses for the various email and IM contacts, business addresses for the various email and IM contacts, etc. Examples of the address book database 110 are shown in greater detail with reference to FIGS. 13A and 13B.

The IM user agent 104 and the email user agent 106 are configured to communicate with the address book object 108. In this regard, the address book object 108 functions as an interface between the IM user agent 104 and the email user agent 106. In a broader sense, the address book object 108 interfaces the entire IM system (not shown in FIG. 1) to the entire email system (not shown in FIG. 1), thereby providing integration between the email system and the IM system.

The tray manager 102 is configured to track communications between with the IM user agent 104, the address book object 108, and the email user agent 106. In this regard, the tray manager 102 receives commands from the IM user agent 104, the address book object 108, and the email user agent 106. Similarly, the tray manager 102 generates commands and directs the generated (or received) commands to the IM user agent 104, the address book object 108, and the email user agent 106. Thus, in a general sense, the tray manager 102 receives information (e.g., commands, requests, data, etc.) and directs the received information to the appropriate software module. The interplay between the various components 102, 104, 106, 108, 110 is described below in greater detail. However, it is worthwhile to note that the various launched components 102, 104, 106, 108, 110 provide a mechanism by which integration between the IM system and the email system is achieved.

In another embodiment, the various components 102, 104, 106, 108, 110 of FIG. 1 are objects in a distributed network (not shown). In this regard, subsequent to installation of the software modules, when a user launches the tray manager 102, the tray manager 102 instantiates the IM user agent 104, the address book object 108, the email user agent 106, and the address book database 110 and runs these objects on the client system (not shown) as background processes. The address book object 108 is coupled to the address book database 110 so that information may be stored to the address book database 110 by the address book object 108 or retrieved from the address book database 110 by the address book object 108. The IM user agent 104 and the email user agent 106 communicate with the address book object 108, thereby using the address book object 108 as an interface between the IM user agent 104 and the email user agent 106. As described above, the various instantiated components 104, 106, 108, 110 provide a mechanism by which integration between the IM system and the email system is achieved.

In one embodiment, the address book database 110 may be located at a client machine (not shown) with a duplicate copy (not shown) stored at a server (not shown). In that embodiment, the copy of the address book database at the server may be updated by the address book database 110 at the client machine when a user logs into the server. Similarly, the copy of the address book database at the server may be updated by the address book database 110 at the client machine when the user logs out of the server. In this regard, a user may edit contents of the address book database 110 while the user is "off line," and the updated contents may be uploaded to the copy of the address book database at the server when the user logs into the server.

Figure 2A:
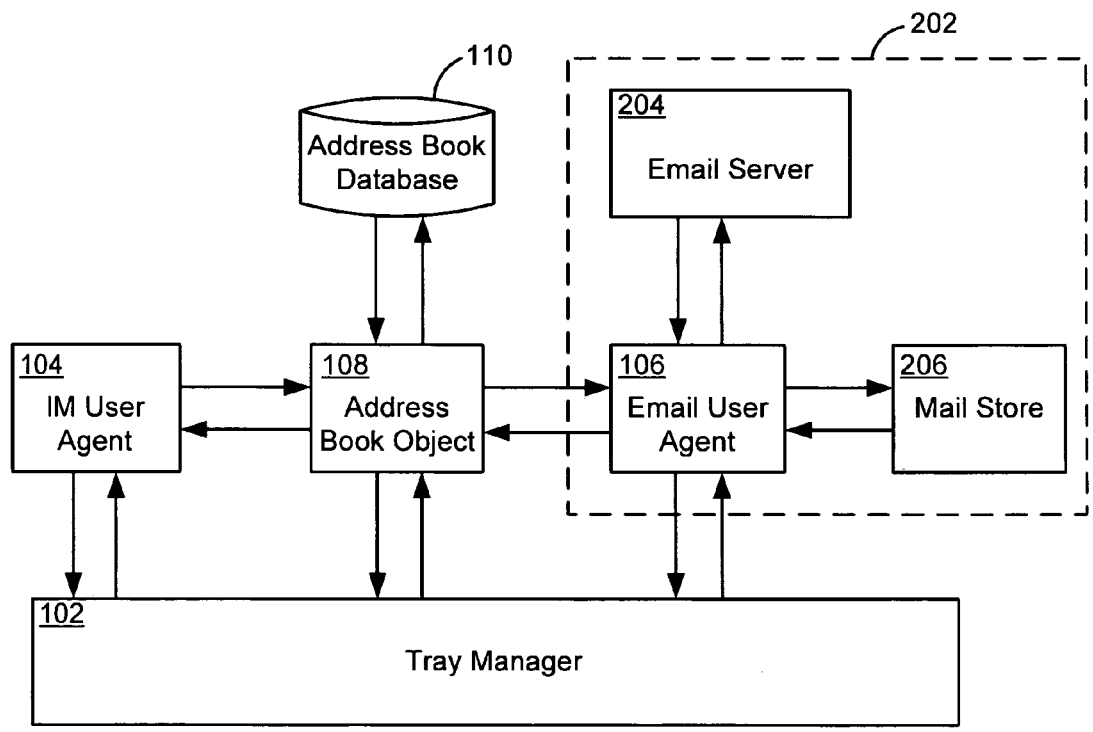
FIGS. 2A through 2C are block diagrams showing one embodiment of component architecture related to email services.
Figure 2B:
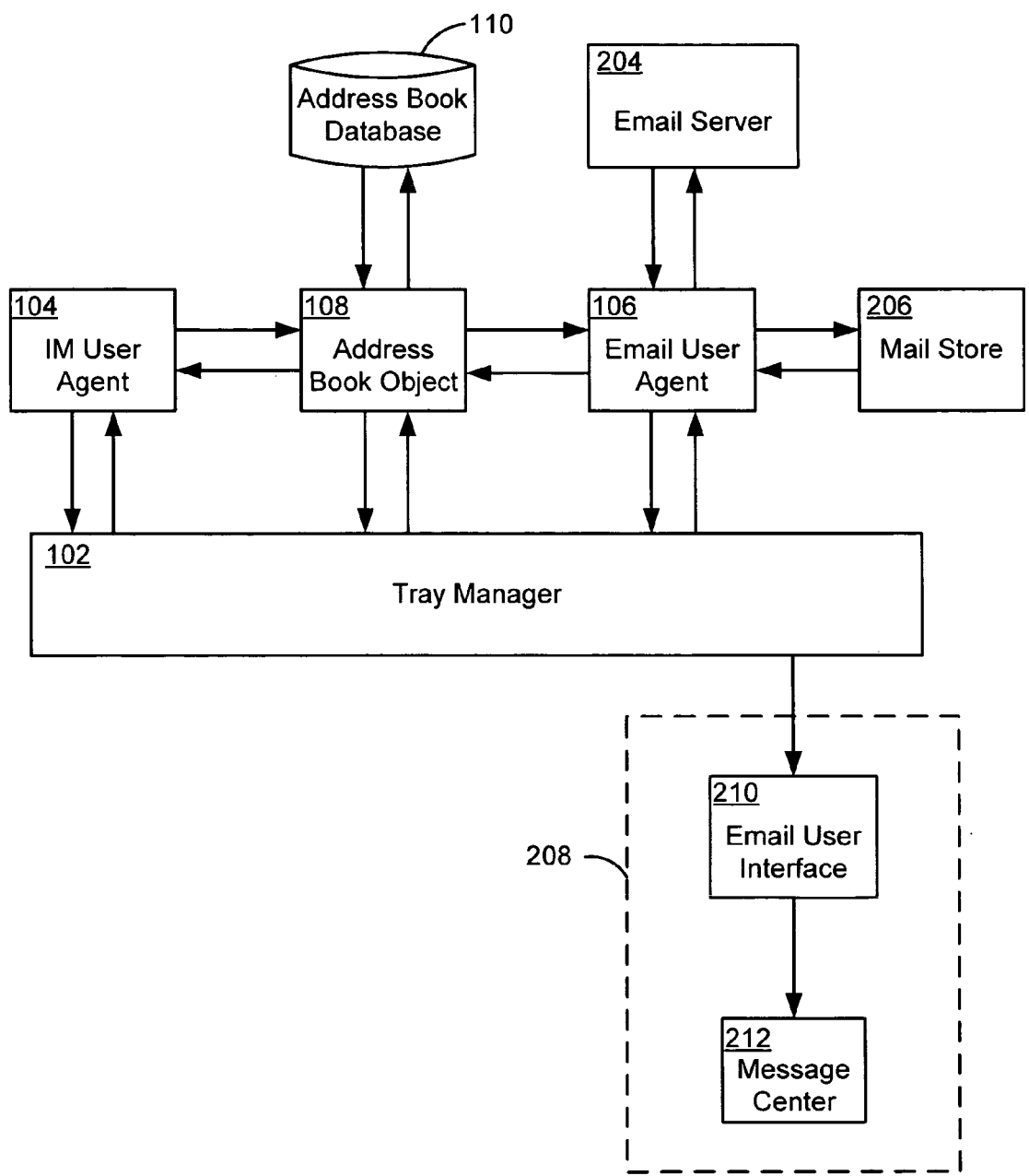
Figure 2C:
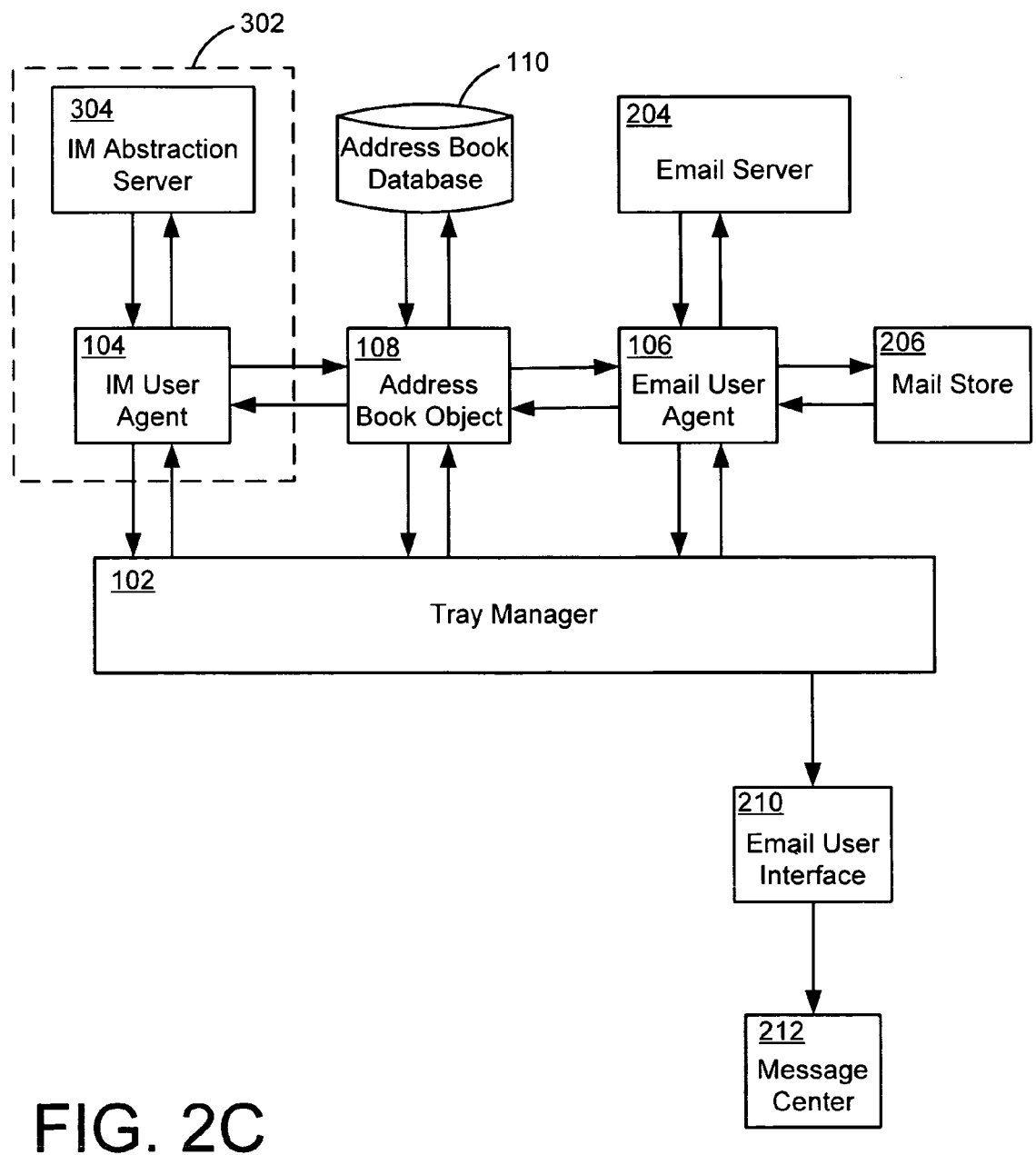
Figure 3A:
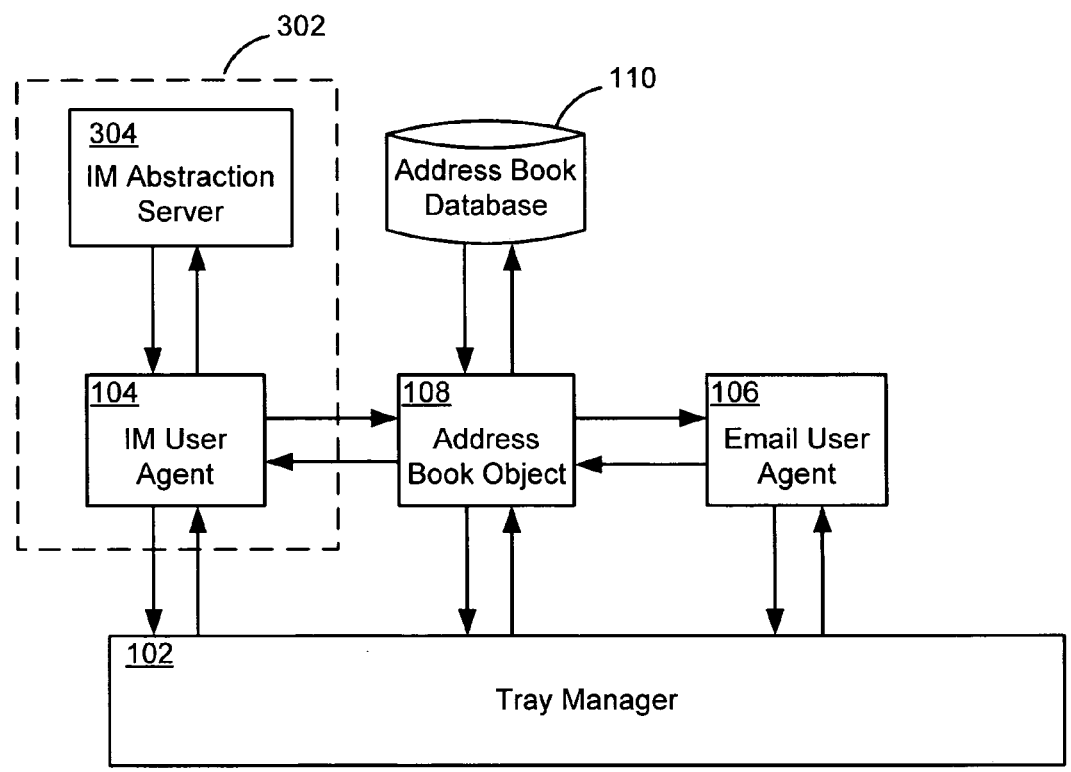
FIGS. 3A through 3C are block diagrams showing one embodiment of component architecture related to IM services.
Figure 3B:
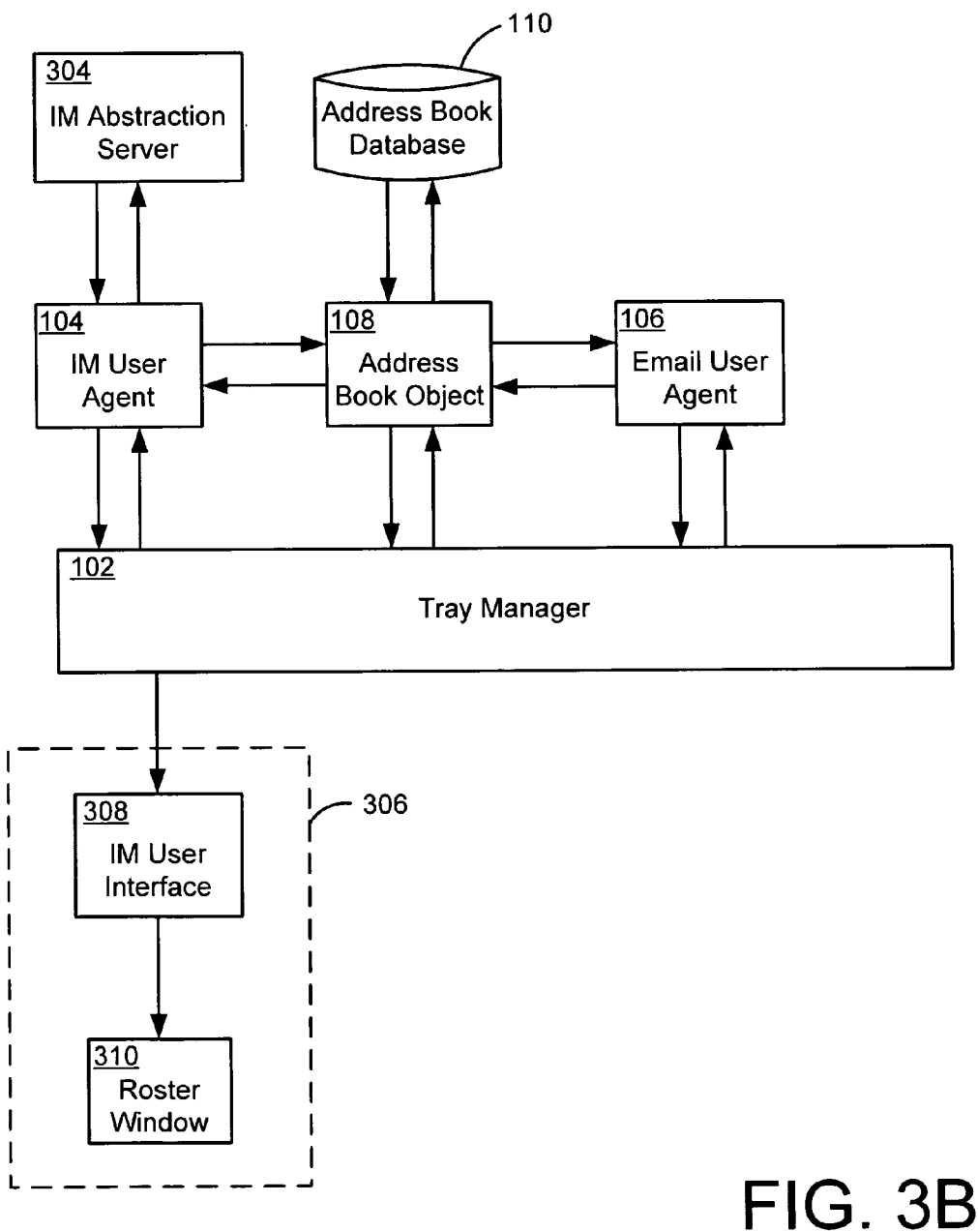
Figure 3C:
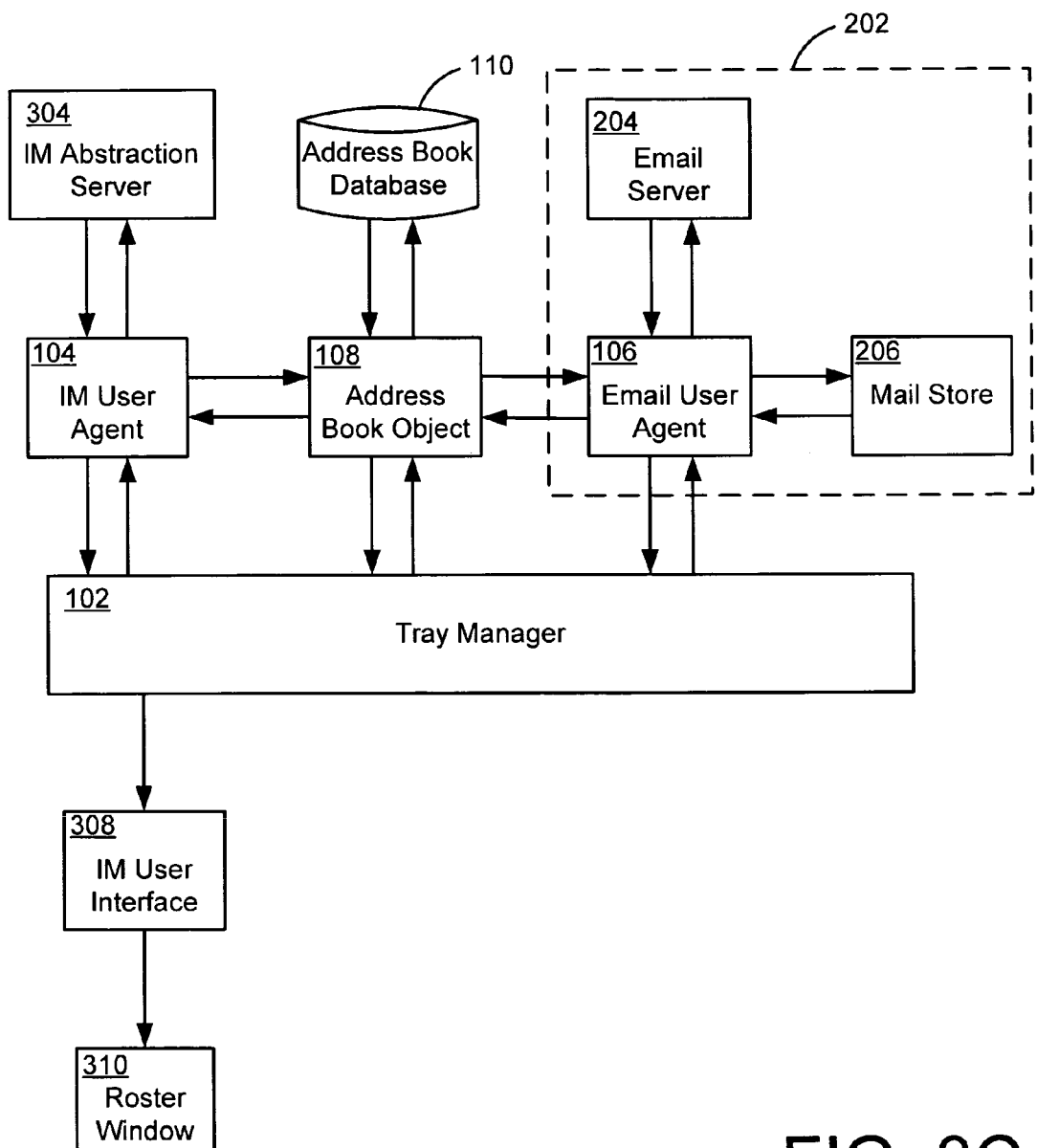

Regardless of whether the various components 104, 106, 108, 110 are launched as software modules or instantiated as distributed objects, once the various components 104, 106, 108, 110 are running as background processes, the tray manager 102 launches a user interface (not shown), which requests the user to select either an IM interface (not shown in FIG. 1) or an email interface (not shown in FIG. 1). FIGS. 2A through 2C are block diagrams showing component architecture associated with the user selecting the email interface (not shown in FIG. 1), while FIGS. 3A through 3C are block diagrams showing component architecture associated with the user selecting the IM interface (not shown in FIG. 1).

FIGS. 2A through 2C are block diagrams showing one embodiment of component architecture related to email services when the user selects the email user interface 210. As described above, the tray manager 102 queries the user for the selection of the IM or email interface. If the user selects the email interface, then the tray manager 102 receives the selection of the email user interface 210 and retrieves the login names and passwords, which were previously stored during installation of the software modules, from the login database. The email login names and passwords are conveyed to the email user agent 106, which receives the login names and passwords.

Upon receiving the login names and passwords of all of the user's email accounts, the email user agent 106 logs into each of the user's email accounts at the various email servers 204 using the respective login names and passwords. Upon logging into each of the user's email accounts, the email user agent 106 retrieves all of the email messages stored on the email accounts and stores them at a local mail store 206. In an example embodiment, the user's email accounts are simple mail transfer protocol (SMTP) email accounts. Additionally, the user's email account may be post office protocol version 3 (POP3) compatible.

Since the logging into email accounts, retrieving email messages, and storing email messages at local mail stores is discussed in greater detail with reference to FIGS. 30 and 31, further discussion of the logging into email accounts, retrieving email messages, and storing email messages is omitted here. However, it is worthwhile to note that the email user agent 106 and address book object 108 of FIG. 2A permit the automatic retrieval of multiple email messages from multiple email accounts, and the storage of the retrieved email messages according to their respective originating email accounts.

Upon retrieving multiple email messages from multiple email accounts and storing them at the mail store 206, the email user agent 106 generates a command to the tray manager 102 to launch or instantiate an email user interface 210 to display the retrieved email messages to the user. This is shown in greater detail in FIG. 2B. As shown in FIG. 2B, upon receiving the command to launch or instantiate the email user interface 210, the tray manager 102 instantiates the email user interface 210, which, in turn, instantiates a message center 212 for displaying the retrieved email messages. The email user agent 106 retrieves the stored email messages from the mail store 206 and conveys the email messages to the tray manager 102. The tray manager 102 further conveys the email messages to the email user interface 210, which displays the email messages at the message center 212. Thus, at this point, all of the email messages from all of the user's email accounts are available to the user at the message center 212. In another embodiment, the message center 212 may be instantiated with a pointer to the mail store 206, thereby permitting direct retrieval of the email messages from the mail store 206 by the message center 212.

In addition to logging into the various email accounts, the tray manager 102 initiates a login to each of the user's IM accounts. This is shown in FIG. 2C. As described above with reference to FIG. 1, the tray manager 102 retrieves the login names and passwords. The tray manager 102 conveys the IM login names and passwords to the IM user agent 104.

Upon receiving the login names and passwords of all of the user's IM accounts, the IM user agent 104 logs into each of the user's IM accounts through an IM abstraction server 304 using the respective login names and passwords. The logging into various IM accounts through the IM abstraction server 304 is described in detail in U.S. provisional patent application Ser. Nos. 60/411,336 and 60/419,613, and U.S. patent application Ser. Nos. 10/274,408, 10/274,478, and 10/274,405, which are incorporated herein by reference as if set forth in their entireties. Also, a similar login process is shown with reference to FIGS. 30 and 31 for email accounts. Thus, further discussion of logging into various IM accounts through the IM abstraction server 304 is omitted here.

Upon logging into the various IM accounts, the IM user agent 104 obtains Internet presence information for all of the user's IM contacts as described in U.S. provisional patent application Ser. Nos. 60/411,336 and 60/419,613, and U.S. patent application Ser. Nos. 10/274,408, 10/274,478, and 10/274,405.

As seen from the component architecture of FIG. 1 and FIGS. 2A through 2C, the launching of the tray manager 102 results in retrieval of all of the user's email messages and all of the contacts' IM Internet presence information.

FIGS. 3A through 3C are block diagrams showing one embodiment of component architecture related to IM services when the user selects the IM interface 308. As described above, the tray manager 102 queries the user for a selection of the IM or email interface. If the user selects the IM interface, then the tray manager 102 instantiates the IM user interface 308, which queries the user for the user's IM login name and password. Thus, unlike the email login process, which automatically retrieves login names and passwords without further input from the user, the IM login process requires, in this embodiment, the input of a user login name and password.

As shown in FIG. 3A, the IM user agent 104 receives the login name and password and looks up the login database (not shown) to determine whether or not the login name and password are valid (i.e., whether or not the login name and password are located in the login database). If the login name and password are valid, then the IM user agent 104 retrieves login names and passwords for all of the user's IM accounts.

Upon retrieving the login names and passwords of all of the user's IM accounts from the login database, the IM user agent 104 logs into each of the user's IM accounts through an IM abstraction server 304 using the respective login names and passwords for each of the user's IM accounts. The logging into various IM accounts through the IM abstraction server 304 is described in detail in U.S. provisional patent application Ser. Nos. 60/411,336 and 60/419,613, and U.S. patent application Ser. Nos. 10/274,408, 10/274,478, and 10/274,405, which are incorporated herein by reference as if set forth in their entireties. Also, similar processes related to email are described with reference to FIGS. 30 and 31. Thus, further discussion of logging into various IM accounts through the IM abstraction server 304 is omitted here.

Upon logging into the various IM accounts, the IM user agent 104 obtains Internet presence information for all of the user's IM contacts as described in U.S. provisional patent application Ser. Nos. 60/411,336 and 60/419,613, and U.S. patent application Ser. Nos. 10/274,408, 10/274,478, and 10/274,405.

Upon logging into the user's various IM accounts and retrieving the Internet presence information of the user's contacts, the IM user agent 104 generates a command to the tray manager 102 to display the retrieved IM information. This is shown in greater detail in FIG. 3B. As shown in FIG. 3B, upon receiving the command to display the retrieved IM information, the tray manager 102 requests the IM user interface 308 to instantiate a roster window 310 for displaying the user's contacts and the contacts' respective IM Internet presence information. The IM user agent 104 conveys the IM information having the contacts' names and the contacts' IM Internet presence information to the tray manager 102. The tray manager 102 further conveys the IM information to the IM user interface 104, which displays the IM contact names and their respective IM Internet presence information to the user at the roster window 310. Thus, at this point, all of the contacts and their respective IM Internet presence information is available to the user at the roster window 310.

In addition to logging into the various IM accounts, the tray manager 102 initiates a login to each of the user's email accounts. As shown in FIG. 3C, the tray manager 102 receives the login name and password from the IM user agent 104 and conveys the login name and password to the email user agent 106. The email user agent 106 receives the login name and password and looks up the login database (not shown) to determine whether or not the login name and password are valid (i.e., whether or not the login name and password are located in the login database). If the login name and password are valid, then the email user agent 106 retrieves login names and passwords for all of the user's email accounts.

Upon retrieving the login names and passwords of all of the user's email accounts from the address book database 110, the address book object 108 conveys the login names and passwords to the email user agent 106. The email user agent 106 logs into each of the user's email accounts at the various email servers 204 using the respective login names and passwords. Upon logging into each of the user's email accounts, the email user agent 106 retrieves all of the email messages stored on the email accounts and stores them at a local mail store 206. In an example embodiment, the user's email accounts are simple mail transfer protocol (SMTP) email accounts. Additionally, the user's email accounts may also be POP3 compatible.

Since the logging into email accounts, retrieving email messages, and storing email messages at local mail stores is discussed in greater detail with reference to FIGS. 30 and 31, further discussion of the logging into email accounts, retrieving email messages, and storing email messages is omitted here. However, it is worthwhile to note that the instantiating of an IM user interface results in the automatic retrieval and storage of all of the user's email messages and the storage of the retrieved email messages according to their originating email account. Additionally, as seen from the component architecture of FIG. 1 and FIGS. 3A through 3C, the input of a single login name and password to the IM user agent 104 results in retrieval of all of the user's contacts' IM Internet presence information. Furthermore, as seen from FIGS. 1 through 3C, the address book object 108 and the address book database 110 provide an interface between the IM user agent 104 and the email user agent 106, thereby providing integration of IM and email.

Figure 4A:
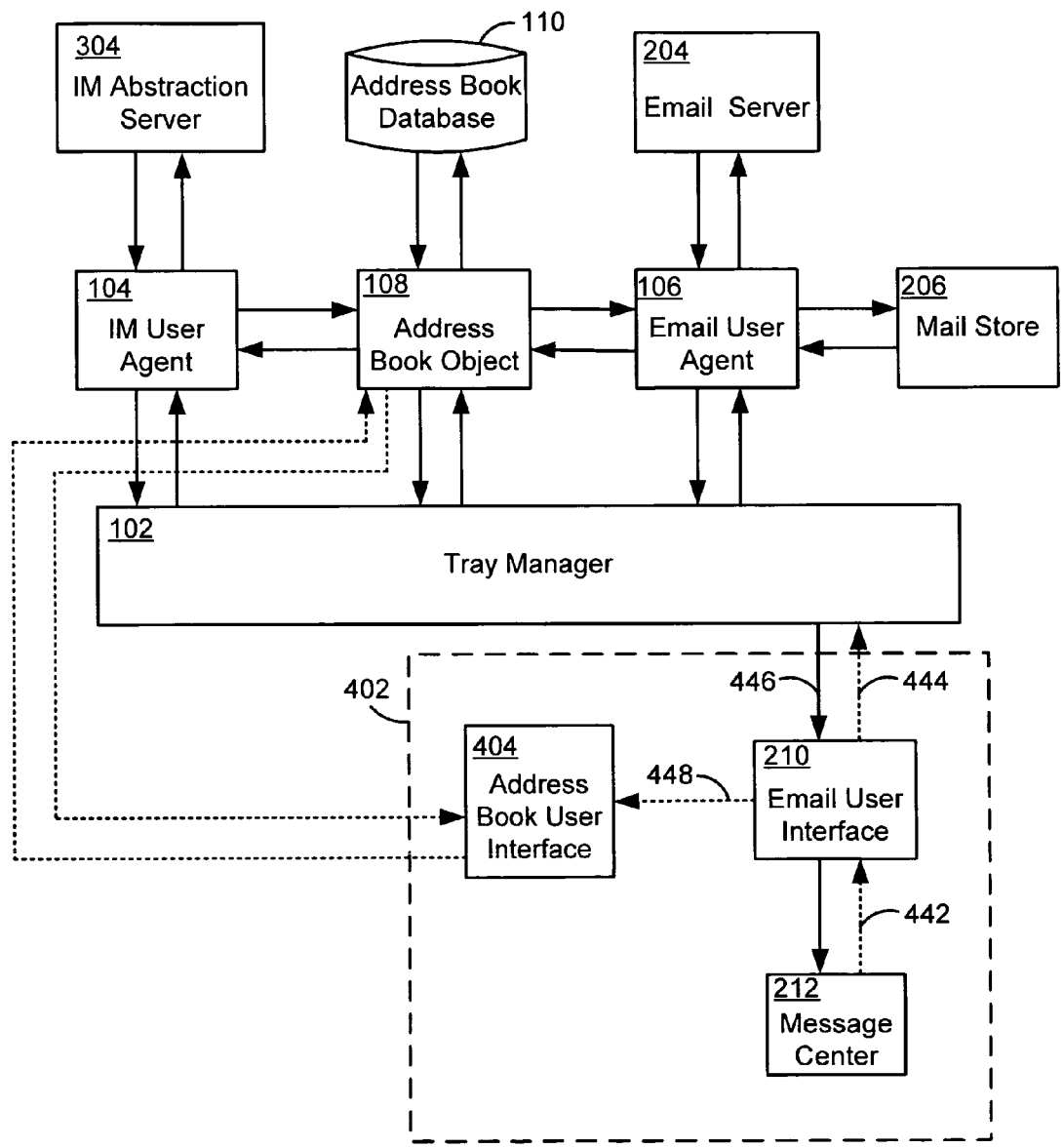
FIGS. 4A through 4C are block diagrams showing instantiation of various email components in one embodiment of the system.
Figure 4B:
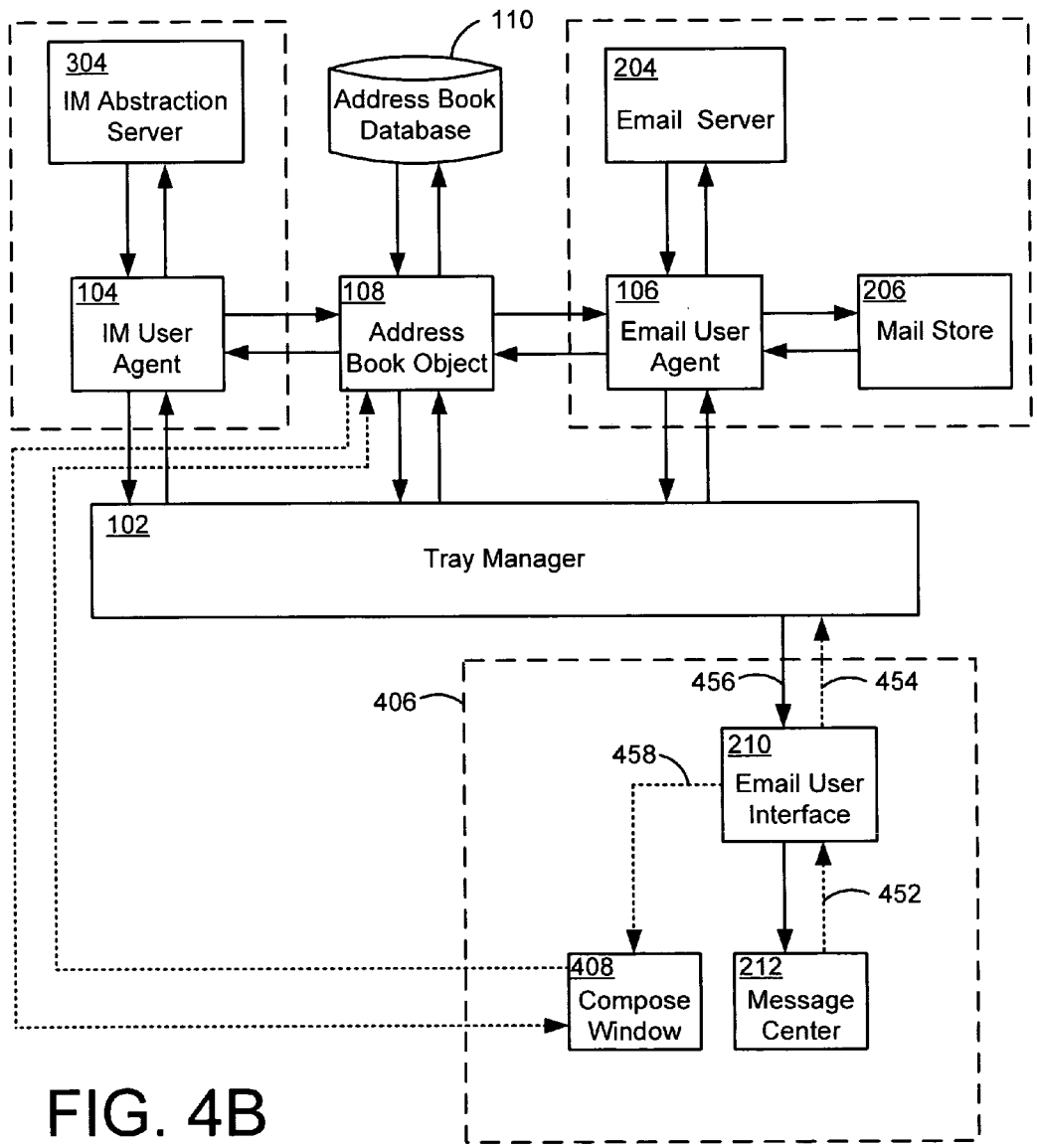
Figure 4C:
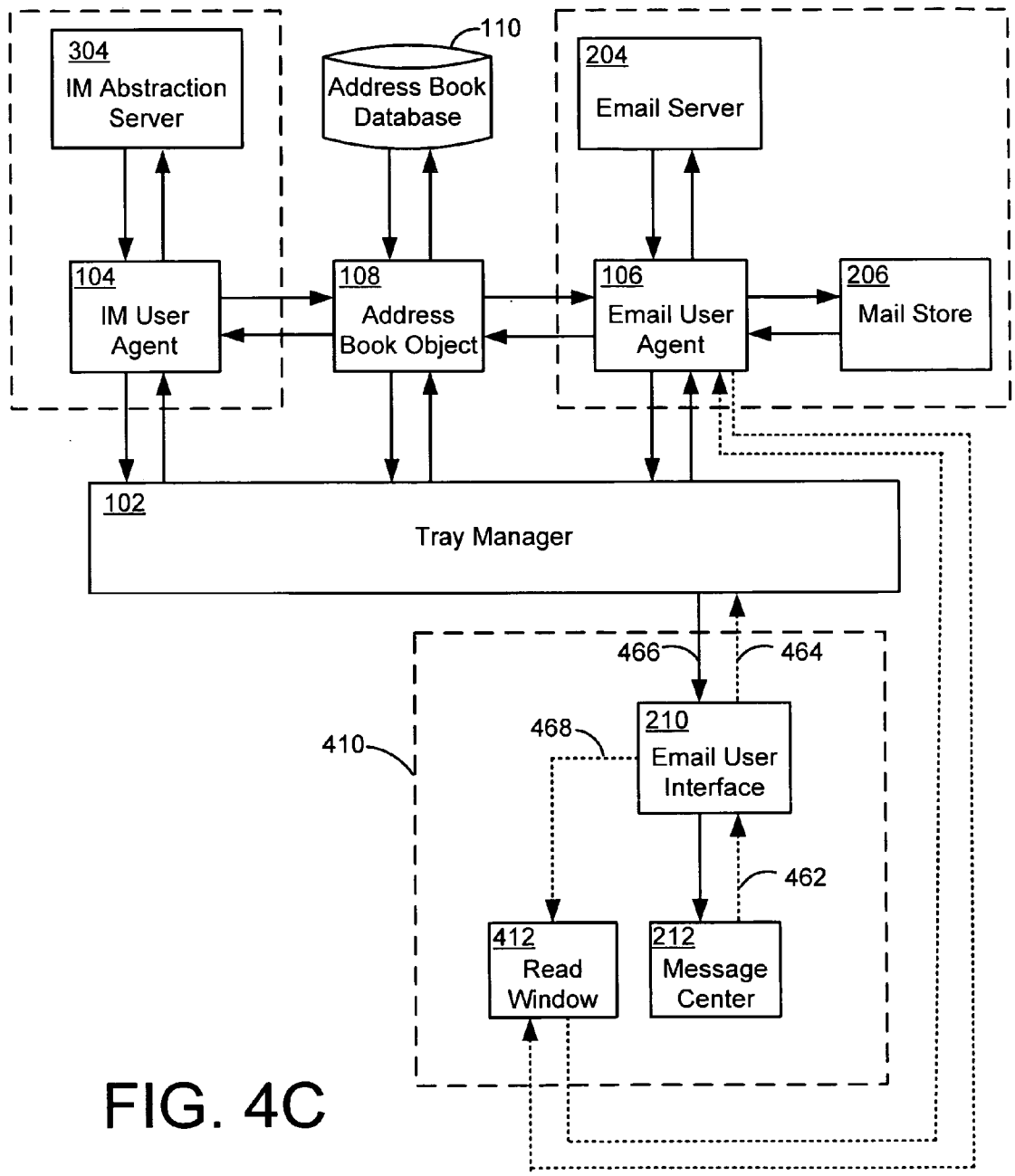

FIGS. 4A through 4C are block diagrams showing instantiation of various email components in one embodiment of the system. While one embodiment of the message center 212 is shown in greater detail with reference to FIG. 9, a discussion of the functionality of the message center 212 is described below with reference to FIGS. 4A through 4C. As described with reference to FIGS. 2A through 2C, upon receiving a single login name and password, the tray manager 102 automatically logs the user into all of the user's IM accounts as well as all of the user's email accounts.

One option that is provided to the user at the message center 212 is the option to edit entries in the address book database 110. This is shown in FIG. 4A. If the user selects the option to edit the address book database 110, then the message center 212 generates a request 442 to the email user interface 210 to generate an address book user interface 404. The email user interface 210 conveys the request 444 to the tray manager 102, which receives the request and generates a command 446 to the email user interface 210 to instantiate the address book user interface 404. The command 446 includes a pointer to the address book object 108, which eventually permits the address book user interface 404 to modify the address book database 110 through the address book object 108. The email user interface 210, in response to the command 446 from the tray manager 102, instantiates the address book user interface 404 with direct access to the address book object 108. Since editing of address book databases are well known in the art, further discussion of editing address book databases is omitted here. However, it is worthwhile to note that, unlike prior systems, the address book user interface 404 permits a user to edit the address book database 110 by adding and removing both email and IM contact information for contacts having various IM and email accounts (e.g., America On-Line (AOL), Microsoft Network (MSN), Yahoo, BellSouth, etc.).

Another option that is provided to the user at the message center 212 is the option to compose a new email message to a contact. This is shown in FIG. 4B. If the user selects the option to compose a new email message, then the message center 212 generates a request 452 to the email user interface 210 to generate a compose window 408. The email user interface 210 conveys the request 454 to the tray manager 102, which receives the request and generates a command 456 to the email user interface 210 to instantiate the compose window 408. The command 456 includes a pointer to the address book object 108, which eventually permits the compose window 408 to access the address book database 110 through the address book object 108, thereby permitting retrieval of email addresses of contacts. The email user interface 210, in response to the command 456 from the tray manager 102, instantiates the compose window 408 with direct access to the address book object 108. Since composing new messages is well known in the art, further discussion of composing new messages is omitted here.

Yet another option that is provided to the user at the message center 212 is the option to read an email message from a contact. This is shown in FIG. 4C. In operation, all of the user's email messages are displayed to the user at the message center 212. Upon receiving a selection of one of the displayed email messages for reading by the user, the message center 212 generates a request 462 to the email user interface 210 to generate a read window 412. The request 462 includes information related to the selected email message, such as a globally-unique identifier (GUID) associated with the selected email message. The email user interface 210 conveys the request 464 to the tray manager 102, which receives the request 464 and generates a command 466 to the email user interface 210 to instantiate the read window 412. The command 466 includes a pointer to the address book object 108 and a pointer to the email user agent 106. The pointer to the address book object 108 eventually permits the read window 412 to access the address book database 110 through the address book object 108. This is shown in greater detail with reference to FIG. 5. The email user interface 210, in response to the command 466 from the tray manager 102, instantiates the read window 412. Upon being instantiated, the read window 412 issues a request to the email user agent 106 to retrieve the selected email message. The email user agent 106 receives the request and retrieves the selected email message from the mail store 206. The retrieved email message is conveyed from the email user agent 106 to the read window 412 and displayed to the user at the read window 412. While reading of email messages is well known in the art, it is worthwhile to note that, unlike prior systems, the system of FIG. 4C permits a user to read email messages from any of the user's email accounts (e.g., a BellSouth email account, an AOL email account, a Yahoo email account, an MSN email account, etc.).

Figure 5:
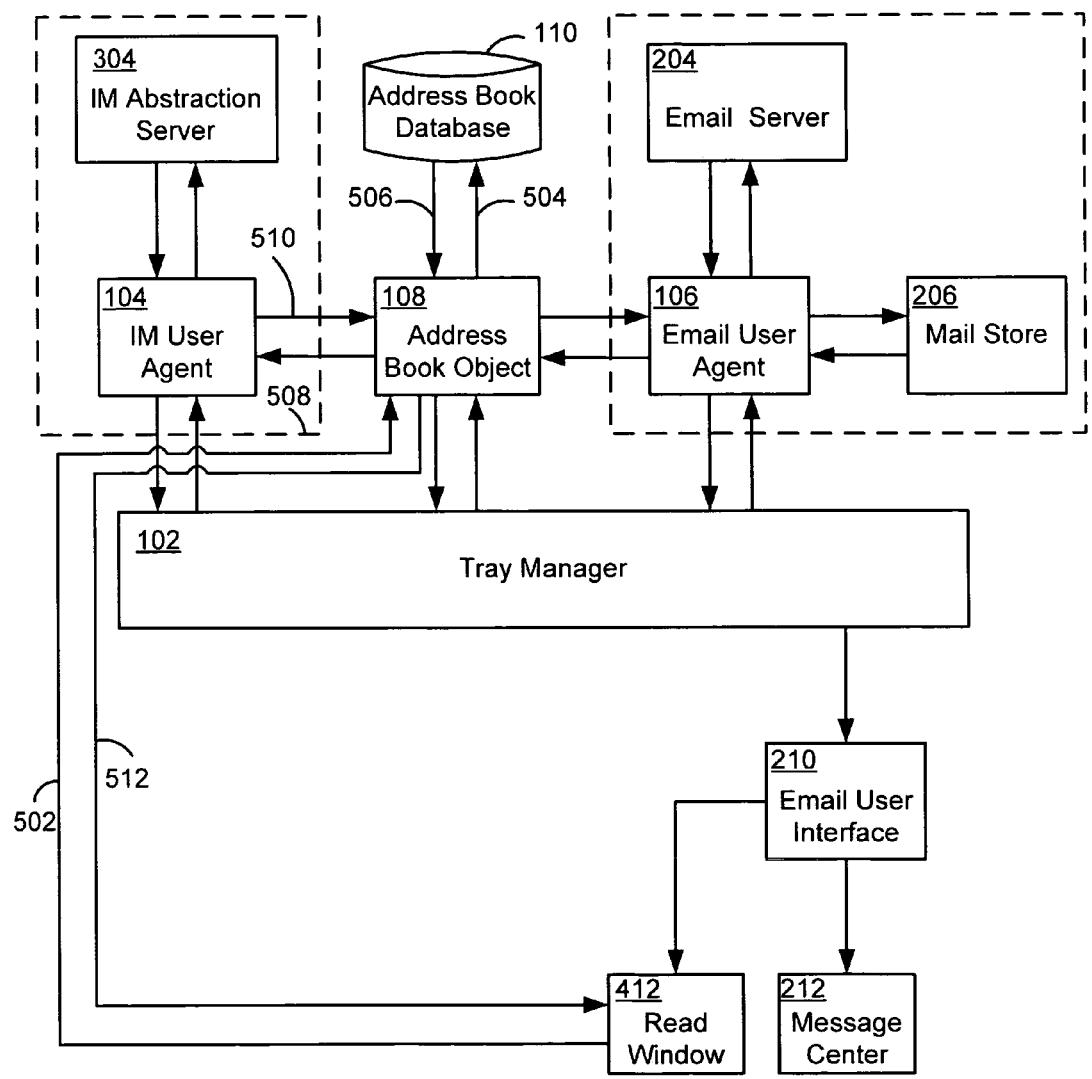
FIG. 5 is a block diagram showing functionality of the read window of FIG. 4C.

FIG. 5 is a block diagram showing another aspect of the read window of FIG. 4C. While one embodiment of the read window 412 is shown in detail with reference to FIG. 10, the functionality of the read window 412 is described below with reference to FIG. 5. As shown in FIG. 5, the read window 412 is instantiated by the email user interface 210 so that the read window 412 has direct access to the address book object 108. In this regard, any information that is available to the address book object 108 may also be available to the read window 412. In operation, upon receiving the selected email message from the email user agent 106, the read window 412 extracts all of the email addresses in the email message. For example, the sender's email address is extracted from the email message. Similarly, if courtesy copies (cc) of the email message were sent to other recipients, then the email addresses of the other recipients are also extracted from the email message. Upon extracting all of the email addresses from the email message, the read window 412 generates a request 502 to the address book object 108 for IM Internet presence information of the contacts at the extracted email addresses. In this regard, the request 502 includes the extracted email addresses.

Upon receiving the request 502, the address book object 108 generates a query 504 to the address book database 110 to request all IM addresses that are correlated to the extracted email addresses. If an extracted email address is not found in the address book database 110, then an error message is returned to the address book object 108 to indicate that no IM Internet presence information is available for that email address. Similarly, if an extracted email address is not correlated to any IM address, then an error message is returned to the address book object 108 to indicate that no IM Internet presence information is available for that email address. If, on the other hand, the extracted email address is found in the address book database 110, and the extracted email address is correlated to at least one IM address, then the IM address associated with the extracted email address is retrieved from the address book database 110 by the address book object 108. This process is repeated for each of the extracted email addresses until either an error message or at least one IM address is returned for each of the extracted email addresses.

If an error message is returned to the address book object 108 for an extracted email address, then the error message is conveyed by the address book object 108 to the read window 412, which displays to the user that no IM Internet presence information is available for that extracted email address. If, on the other hand, an IM address is returned, then the address book object 108 queries the IM user agent 104, using the IM address, for IM Internet presence information of the contact at the retrieved IM address. The IM user agent 104, already having the IM Internet presence information of all of the user's contacts (see FIGS. 2A through 3C), receives the query 508 and returns IM Internet presence information for the retrieved IM address to the address book object 108. The IM Internet presence information 512 is then conveyed by the address book object 108 to the read window 412. The read window 412 subsequently displays the IM Internet presence information next to its respective email address, thereby providing the user with a contact's IM Internet presence information at the email read window 412.

As seen from the embodiment of FIG. 5, by having the address book object 108 interface the IM user agent 104, the address book database 110, and the email read window 412, the embodiment of FIG. 5 permits a user to determine IM Internet presence information directly from an email read window 412. Also, since IM is integrated with email, it is now possible to launch an IM chat session with an email contact directly from the read window 412. This is described in greater detail with reference to FIG. 10.

Figure 6A:
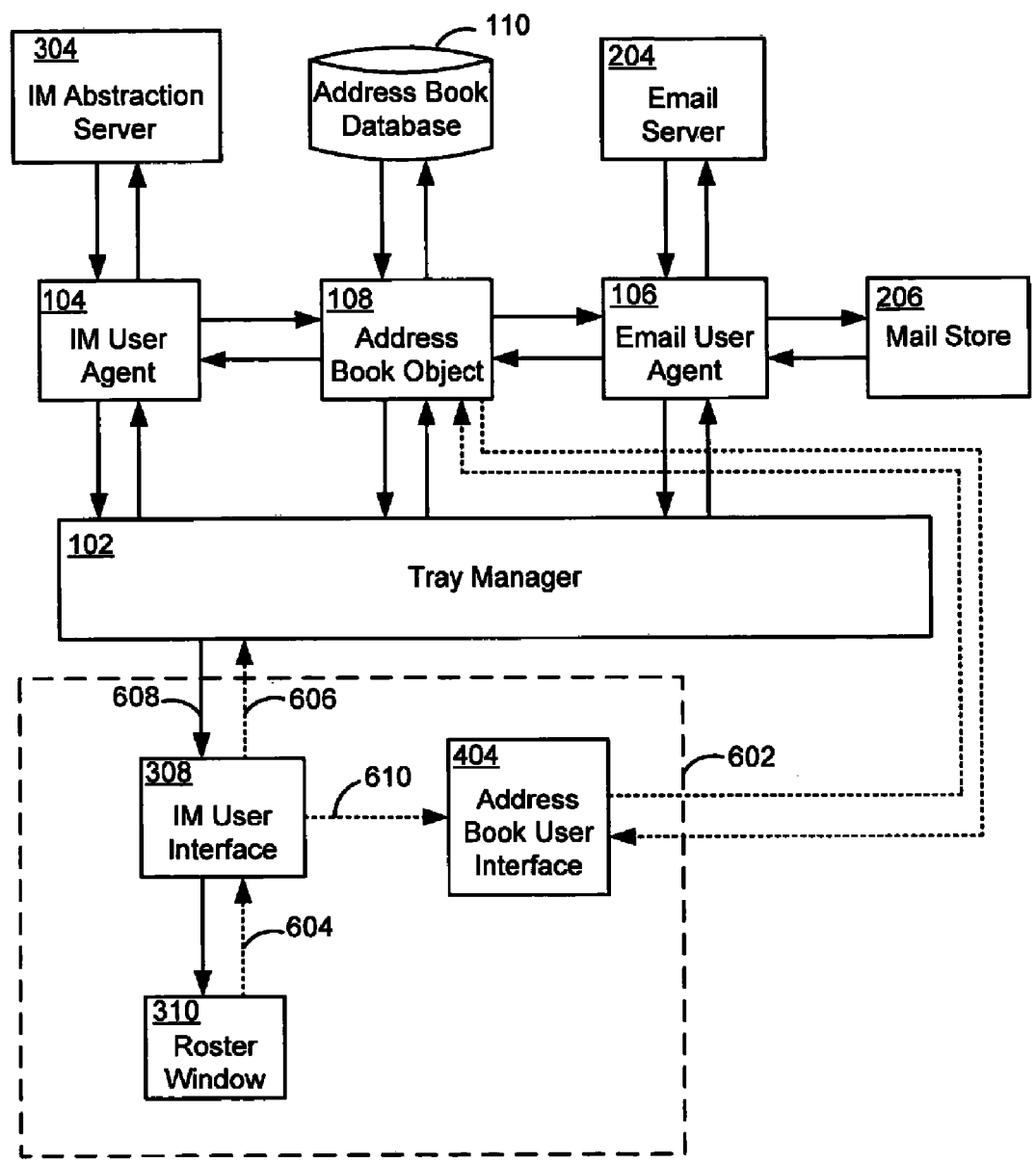
FIGS. 6A through 6C are block diagrams showing instantiation of various IM components in one embodiment of the system.
Figure 6B:
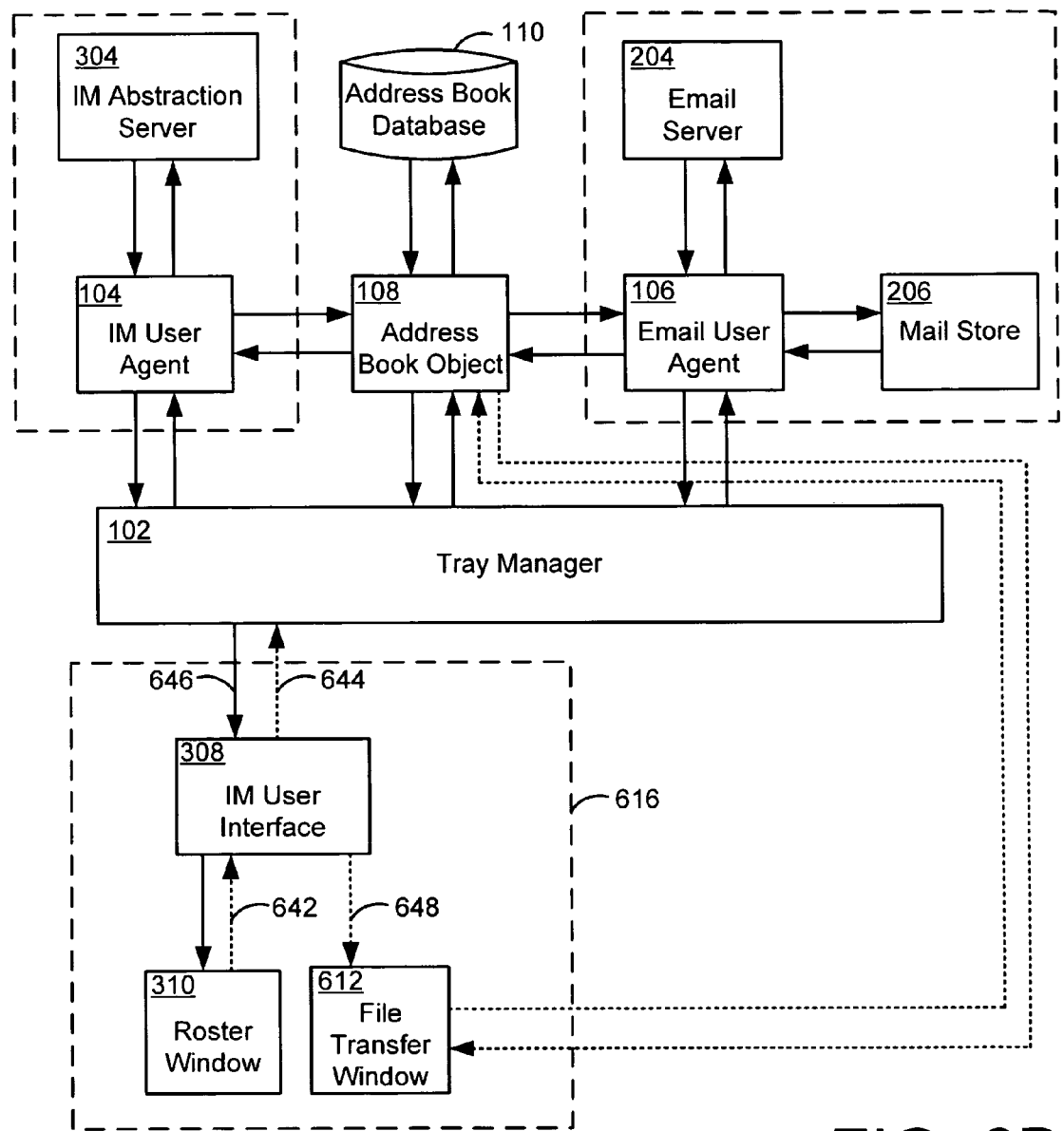
Figure 6C:
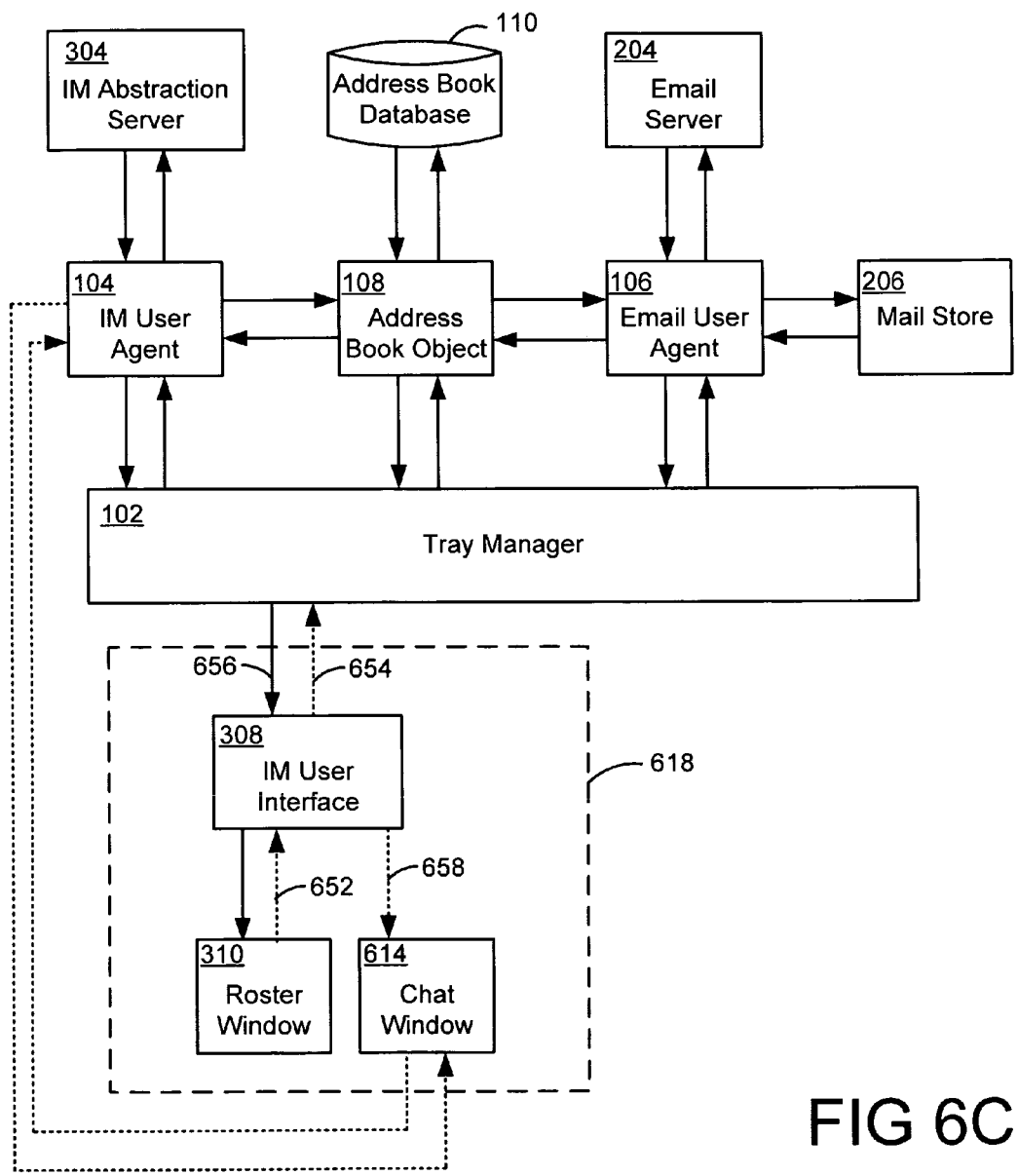

FIGS. 6A through 6C are block diagrams showing instantiation of various IM components in one embodiment of the system. While the roster window 310 is shown in greater detail with reference to FIG. 14, the functionality of the roster window 310 is described with reference to FIGS. 6A through 6C. As shown in FIG. 6A, one option that is provided to the user at the roster window 310 is the option to edit entries in the address book database 110. If the user selects the option to edit the address book database 110, then the roster window 310 generates a request 604 to the IM user interface 308 to generate an address book user interface 404. The IM user interface 308 conveys the request 606 to the tray manager 102, which receives the request and generates a command 608 to the IM user interface 308 to instantiate the address book user interface 404. The command 608 includes a pointer to the address book object 108, which eventually permits the address book user interface 404 to modify the address book database 110 through the address book object 108. The IM user interface 308, in response to the command 608 from the tray manager 102, instantiates the address book user interface 404, which is instantiated with direct access to the address book object 108. Since editing of address book databases are well known in the art, further discussion of editing address book databases is omitted here. However, it is worthwhile to note that, unlike prior systems, the address book user interface 404 permits a user to edit the address book database 110 by adding and removing both email and IM contact information for contacts having various IM and email accounts (e.g., AOL, MSN, Yahoo, BellSouth, etc.).

As shown in FIG. 6B, another option that is provided to the user at the roster window 310 is the option to transfer files to a contact. If the user selects the option to transfer a file, then the roster window 310 generates a request 642 to the email user interface 210 to generate a file transfer window 612. The email user interface 210 conveys the request 644 to the tray manager 102, which receives the request and generates a command 646 to the email user interface 210 to instantiate the file transfer window 612. The command 646 includes a pointer to the address book object 108, which eventually permits the file transfer window 612 to access the address book database 110 through the address book object 108, thereby permitting retrieval of email addresses and IM addresses of the contacts. The email user interface 210, in response to the command 646 from the tray manager 102, instantiates the file transfer window 612 with direct access to the address book object 108. Since transferring files from IM roster windows is well known in the art, further discussion of transferring files from IM roster windows is omitted here. However, it is worthwhile to note that, unlike prior systems, the system of FIG. 6B permits file transfers to contacts at various IM services (e.g., AOL IM, MSN IM, Yahoo IM, BellSouth IM, etc.) and at various email services (e.g., AOL email, MSN email, Yahoo email, BellSouth email, etc.), regardless of the contacts' IM or email service provider.

As shown in FIG. 6C, yet another option that is provided to the user at the roster window 310 is the option to chat with a contact. In operation, all of the user's IM contacts and their respective IM Internet presence information are displayed to the user at the roster window 310. Upon receiving a selection of one of the IM contacts by the user, the roster window 310 generates a request 652 to the email user interface 210 to generate a chat window 614. The request 652 includes information related to the selected contact. The email user interface 210 conveys the request 654 to the tray manager 102, which receives the request 654 and generates a command 656 to the IM user interface 308 to instantiate the chat window 614. The command 656 includes a pointer to the IM user agent 104. The IM user interface 308, in response to the command 656 from the tray manager 102, instantiates the chat window 614. Upon being instantiated, the chat window 614 issues a request to the IM user agent 104 to establish a chat session with the selected contact. Since the initiation of chat sessions at chat windows is well known in the art, further discussion of initiating chat sessions at chat windows is omitted. However, it is worthwhile to note that, unlike prior systems, the system of FIG. 6C permits a user to initiate a chat session and engage in a chat session with any of the contacts regardless of the contacts' IM account (e.g., BellSouth IM account, AOL IM account, Yahoo IM account, MSN IM account, etc.). Greater details related to IM chatting with various contacts at various IM accounts may be found in U.S. provisional patent application Ser. Nos. 60/411,336 and 60/419,613, and U.S. patent application Ser. Nos. 10/274,408, 10/274,478, and 10/274,405, which are incorporated herein by reference in their entireties.

As seen from the embodiments of FIGS. 6A through 6C, by having the address book object 108 interface the IM user agent 104, the address book database 110, and the email user agent 106, greater integration between IM and email is provided.

Figure 7:
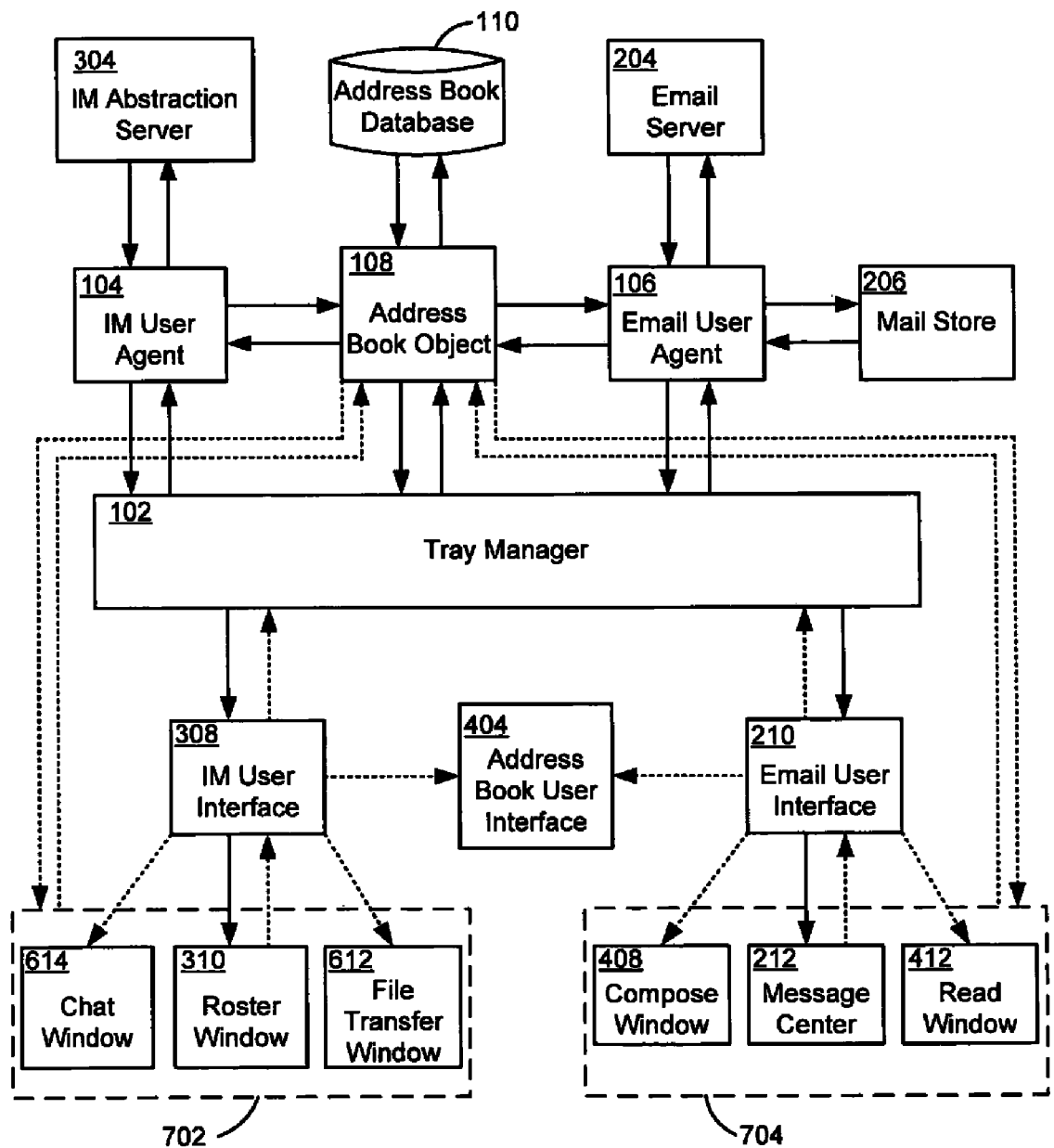
FIG. 7 is a block diagram showing an overview of component architecture related to both IM and email services.

FIG. 7 is a block diagram showing an overview of component architecture related to both IM and email services. Since the various components have been described in detail with reference to FIGS. 1, 2A through 2C, 3A through 3C, 4A through 4C, 5, and 6A through 6C, only a truncated discussion of each of the IM and email components is presented here. As shown in FIG. 7, the address book object 108, the address book database 110, the address book user interface 404, and the tray manager 102 provide an interface between the various email components 106, 204, 206, 210, 212, 412, 408 and the various IM components 104, 304, 308, 310, 614, 612. In other words, integration of email and IM may be achieved by having a central address book database 110 that is accessible through an address book object 108 to both the various IM components 104, 304, 308, 310, 614, 612 and the various email components 106, 204, 206, 210, 212, 412, 408. The mechanism for sorting the various email messages into their respective folders is shown with reference to FIGS. 30 and 31.

Figure 8:
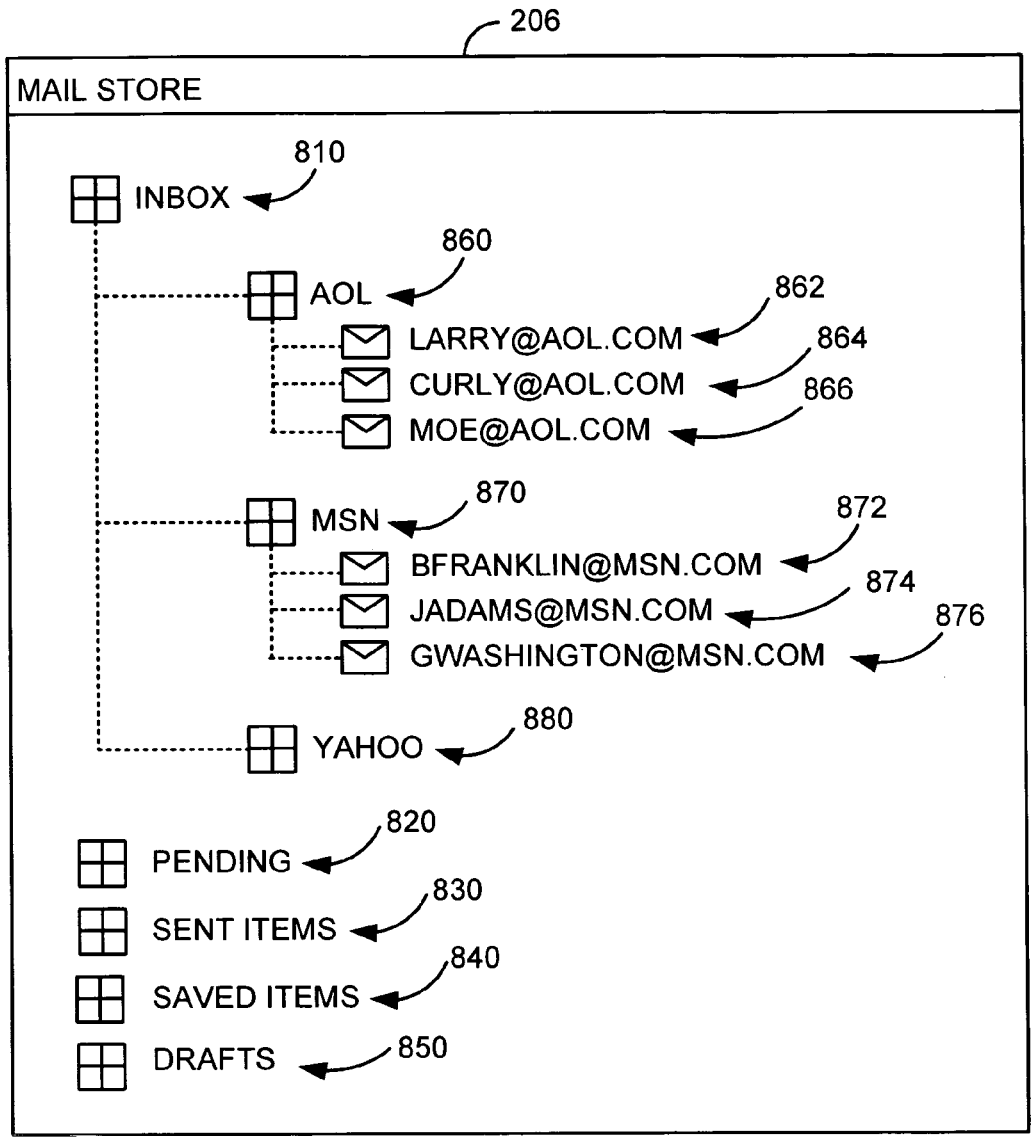
FIG. 8 is a diagram showing one embodiment of the mail store of FIG. 7 in greater detail.

FIG. 8 is a diagram showing one embodiment of the mail store 206 of FIG. 7 in greater detail. As shown in FIG. 8, the mail store 206 comprises several folders such as, for example, an inbox folder 810, a pending email folder 820, a sent items folder 830, a saved items folder 840, and a drafts folder 850. As described with reference to FIGS. 1 through 3C, email messages from all of the user's email accounts are retrieved and stored at the mail store 206. The inbox folder 810 stores all of the received email messages from the various email accounts. Thus, for example, if a user has an AOL email account, an MSN email account, and a Yahoo email account, then the received email messages are retrieved from these various accounts and stored at the mail store 206. In an example embodiment, all of the email messages that are retrieved from the user's AOL email account are stored in an AOL folder 860; all of the email messages that are retrieved from the user's MSN account are stored in an MSN folder 870; and all of the email messages that are retrieved from the user's Yahoo account are stored in a Yahoo folder 880. Similarly, any pending email, sent item, saved item, or drafts of emails may be saved in similar sub-folders (not shown) in their respective folders 820, 830, 840, 850.

In another embodiment, if the user receives an email message from an AOL contact, then the system 202 (FIG. 2A) is configured so that any reply to that AOL contact is directed through the user's AOL account. Similarly, if the user receives an email message from an MSN contact, then the system is configured so that any reply to that MSN contact is directed through the user's MSN account. Thus, for example, if an email message 862 from Larry@AOL.com is retrieved from the user's AOL email account, then any reply to that email from the user will be, by default, directed through the user's AOL email account. Thus, when Larry@AOL.com receives a reply from the user, the reply will appear to Larry@AOL.com as if it was sent from the user's AOL email account. Similarly, if an email message 874 from JAdams@MSN.com is retrieved from the user's MSN email account, then any reply to that email from the user will be, by default, directed through the user's MSN email account. Thus, when JAdams@MSN.com receives a reply from the user, the reply will appear to JAdams@MSN.com as if it was sent from the user's MSN email account. In another embodiment, the user may override the default settings and select a different mail server through which to send an email message. This process is described in greater detail with reference to FIGS. 30 and 31.

The mail store 206 of FIG. 8, unlike prior systems, comprises email messages from various email accounts (e.g., AOL, MSN, Yahoo), which are now accessible to the user through a single consolidated mail store 206. This permits the user to access all of the user's emails from all of the user's various email accounts without the inconvenience of having to manually access multiple separate email accounts.

Figure 9:
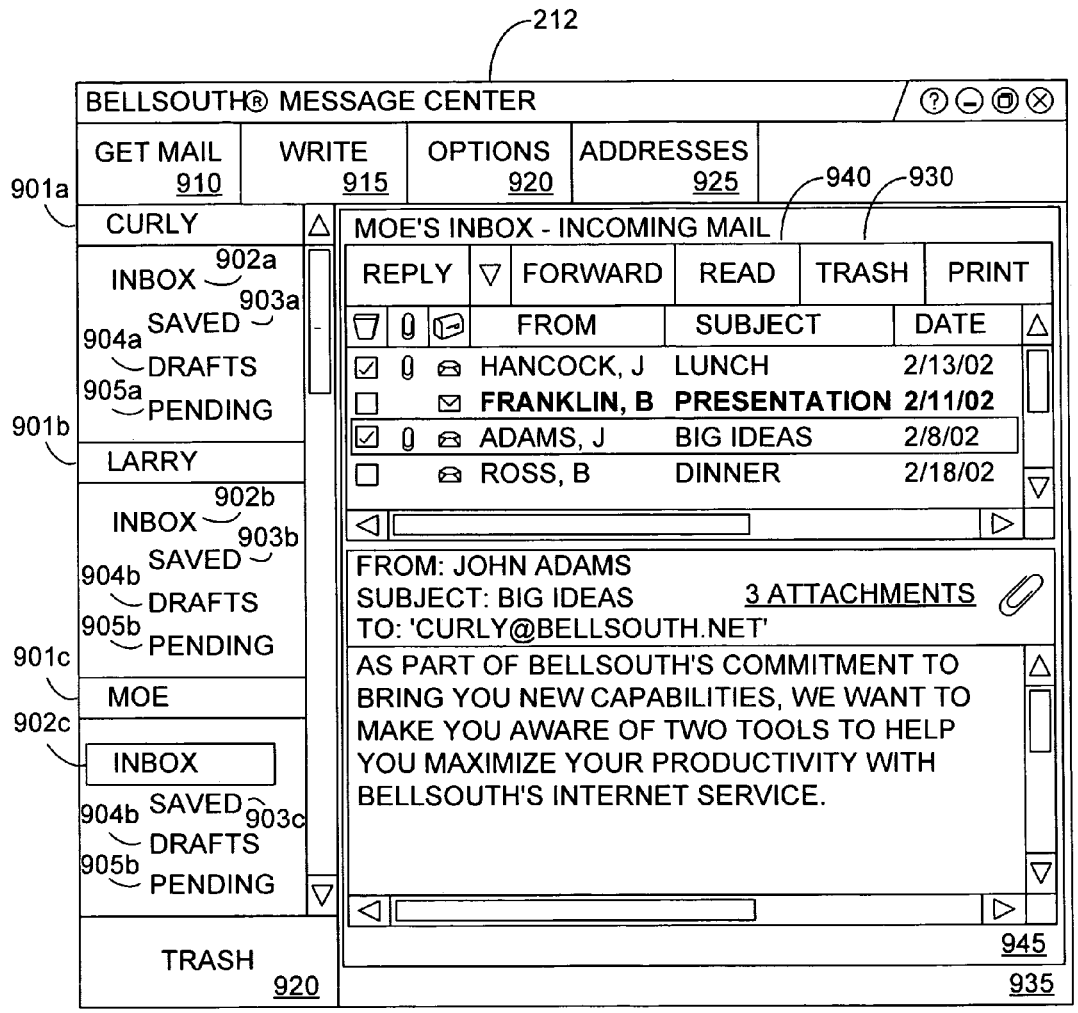
FIG. 9 is a diagram showing one embodiment of a user interface for the message center of FIG. 7 in greater detail.

FIG. 9 is a diagram showing one embodiment of a user interface 935 for the message center 212 of FIG. 7 in greater detail. As shown in FIG. 9, the user interface 935 comprises a get mail (or read) selection button 910, a write (or compose) selection button 915, an options selection button 920, and an address book database selection button 925. If a user selects the address book database selection button 925, then an address book user interface 404 is launched or instantiated as described with reference to FIG. 4A. If the user selects the write (or compose) selection button 915, then a compose window 408 is launched or instantiated as described with reference to FIG. 4B. Similarly, if the user selects the get mail (or read) selection button 910, then a read window 412 is launched or instantiated as described with reference to FIG. 4C.

In addition to the selection buttons 910, 915, 920, 925, the message center 212 includes a display screen 945, which displays received email messages and displays a preview pane having a preview of a selected email message. The display screen 945 also includes message response options such as replying to the email, forwarding the email, reading the full email (rather than merely previewing the email in the preview pane), deleting the email, or printing the email. Also, the message center 212 includes a folder list having a plurality of folders 901a, 901b, 901c, 920, which have various email messages that are organized in similar fashion to the mail store 206 of FIG. 8. Thus, for example, the folders may be organized according to the user's various email accounts (e.g., MSN, AOL, Yahoo, etc.), and each of these folders may be further organized into sub-folders such as, for example, inbox sub-folders 902, saved items sub-folders 903, drafts sub-folders 904, pending items sub-folders 905, etc.

In an example embodiment, the user may organize the various folders and sub-folders according the user's particular needs or desires. Since the organization and display of folders is well known in the art, further discussion of organization and display of folders is omitted here. However, it is worthwhile to note that, unlike prior systems, the message center 212 of FIG. 9 permits a user to view a listing of all of the user's email messages from all of the user's email accounts at a single central location. Thus, the message center 212 removes the inconvenience of manually accessing multiple email accounts to retrieve all of the user's email messages.

Figure 10:
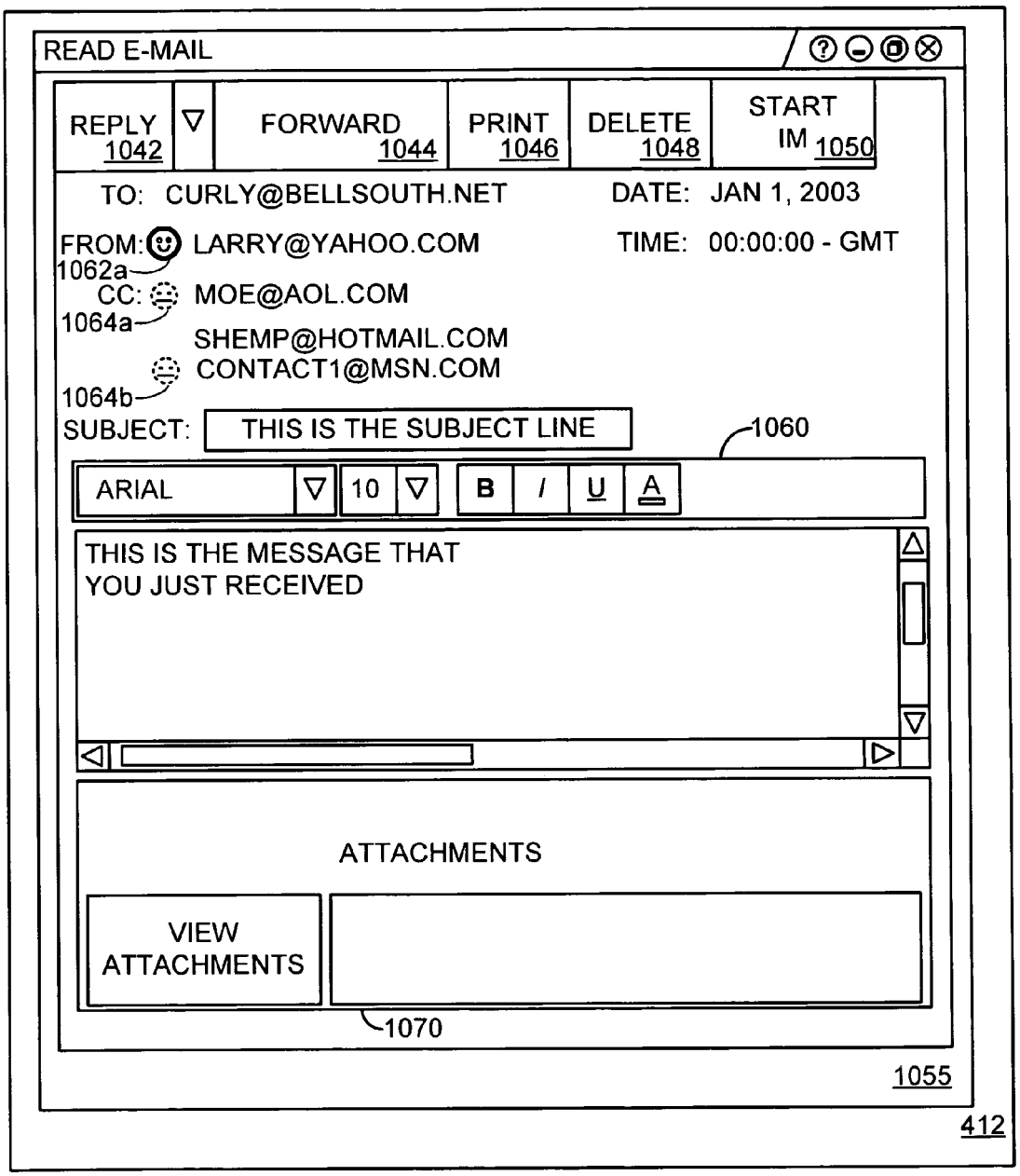
FIG. 10 is a diagram showing one embodiment of a user interface for the read window of FIG. 7 in greater detail.

FIG. 10 is a diagram showing one embodiment of a user interface 1055 for the read window 412 of FIG. 7 in greater detail. As shown in FIG. 10, one embodiment of the read window 412 comprises several selection options that a user may select. For example, a user may select an email reply button 1042, an email forward button 1044, a print button 1046, a delete button 1048, or an IM start button 1050 from the email read window 412. If the user selects the email reply button 1042 or the email forward button 1044, then an email compose window 408 is launched or instantiated as described with reference to FIG. 4B. If the user selects the print button 1046, then the email is printed to a local or network printer (not shown). If the user selects the delete button 1048, then the email message is deleted. Since these functions are well known in the art, further discussion of email reply, email forward, print, and delete functions are omitted here. However, it is worthwhile to note that, unlike prior systems, the selection of the reply button 1042, in one embodiment, permits the user to reply to the email message using the particular email account through which the email message was received. Thus, for example, if the email message is received through the user's BellSouth email account, then the reply to the email would be transmitted through the user's BellSouth email account. This is discussed in greater detail with reference to FIGS. 30 and 31.

In addition to the conventional selection buttons 1042, 1044, 1046, 1048, the read window 412 comprises an IM start button 1050. The IM start button 1050 permits a user to launch an IM session with various contacts from the read window 412. As described with reference to FIG. 5, the read window 412 provides IM Internet presence information for each of the email addresses shown on the read window 412. Thus, for example, if a user receives an email message from Larry@yahoo.com, and the email message is cc'd to Moe@AOL.com, Shemp@hotmail.com, and contact1@MSN.com, then an IM Internet presence indication is displayed by each of the email addresses. Thus, for the contacts shown in FIG. 10, the email address and at least one corresponding IM address was found in the user's address book database 110 for Larry@Yahoo.com, Moe@AOL.com, and contact1@MSN.com. Conversely, either the email address or a corresponding IM address was not found for Shemp@hotmail.com. Additionally, as shown in FIG. 10, the retrieved IM Internet presence information for Larry@Yahoo.com, Moe@AOL.com, and contact1@MSN.com indicated that Larry@Yahoo.com was present while Moe@AOL.com and contact1@MSN.com were not present.

Thus, as shown in the read window 412, an icon 1062 is displayed next to Larry@Yahoo.com to indicate that Larry@Yahoo.com is present; a different icon 1064 is displayed next to Moe@AOL.com and contact1@MSN.com to indicate that Moe@AOL.com and contact1@MSN.com are not present; and no icon is displayed next to Shemp@hotmail.com to indicate that no IM Internet presence information could be obtained for Shemp@hotmail.com. As shown in FIG. 10, the read window 412 displays the IM Internet presence information for all of the email addresses shown in the email message.

Since it is indicated that Larry@Yahoo.com is present, if the user selects Larry@Yahoo.com and selects the IM start button 1050, then an IM session with Larry@AOL.com is launched from the user's read window 412. On the other hand, if the user selects Moe@AOL.com, Shemp@hotmail.com, or contact1@MSN.com and selects the IM start button 1050, then an error message is displayed to the user to indicate that the selected contacts are either not present, or that no IM session may be initiated with the selected contacts (e.g., no email address found in the address book database 110, or no corresponding IM address found in the address book database 110).

If a contact is present, and the user has selected to initiate an IM session with the contact, then the read window 412 generates a request to the address book object 108 to initiate an IM session with the selected contact. The address book object 108 receives the request and forwards the request to the IM user agent 104. The IM user agent 104 receives the request and instantiates an IM session between the user and the selected contact. In this regard, the IM user agent 104 issues an IM session invitation to the selected contact, and awaits an IM session acceptance of the IM session invitation. Upon receiving the IM session acceptance, the IM session is established. Since the initiation of IM sessions is described in detail in U.S. provisional patent application Ser. Nos. 60/411,336 and 60/419,613, and U.S. patent application Ser. Nos. 10/274,408, 10/274,478, and 10/274,405, further discussion of IM session instantiation is omitted here. However, it is worthwhile to note that, unlike prior systems, the read window 412 of FIG. 10 permits a user to directly launch or initiate an IM session with a contact from the read window 412, thereby providing greater integration between email and IM.

As shown with reference to FIG. 10, the read window 412 displays to the user a received email message from a contact having IM Internet presence information related to that contact. Similarly, the read window 412 displays to the user the IM Internet presence information related to any other contact that may have been cc'd on the displayed email message. Furthermore, if it is indicated that the contact is present, then the read window 412 permits a user to launch or initiate an IM session with the contact. Thus, by providing IM Internet presence information and the ability to initiate an IM session, the email read window 412 of FIG. 10 provides for greater IM and email integration. In another embodiment, the IM Internet presence information and the launching of the IM session may be available to the user at the preview pane of FIG. 9.

FIG. 11 is a diagram showing one embodiment of the address book user interface 404 of FIG. 7 in greater detail. As shown in FIG. 11, the address book user interface 404 comprises a list of contacts 1110. In an example embodiment, the list of contacts comprises the first and last names of the contacts. If the contact has an email address 1115, then this email address 1115 is listed beside its respective contact 1110. Additional details 1120 are also available for each contact 1110. In addition to having the list of contacts 1110, the list of email addresses 1115, and corresponding detailed information 1120 for the contacts, the address book user interface 404 also comprises a write (or compose) selection button 1125, a new contact selection button 1130, an new email list selection button 1135, a delete selection button 1140, an edit selection button 1145, and a cancel selection button 1150.

The write (or compose) selection button 1125 permits the user to compose an email message to a selected contact. Thus, in operation, if the user selects a contact from the list of contacts 1110 and selects the write (or compose) selection button 1125, then the address book user interface 404 issues a request to the address book object 108 to launch or instantiate a compose window 408. Since the launching or instantiating of the compose window 408 is described with reference to FIG. 4B, further discussion of launching or instantiating the compose window 408 is omitted here.

The new contact selection button 1130 permits the user to add new contact information to the address book database 110. Thus, in operation, if the user selects the new contact selection button 1130, the address book user interface 404 issues a request to the address book object 108 to launch or instantiate a user interface for adding new contact information. The user interface for adding new contact information is discussed in greater detail with reference to FIG. 12. Similarly, the selection of the new email list selection button 1135 launches or instantiates a user interface for creating a new email list.

If the user selects a contact or a group of contacts from the list of contacts 1110 and selects the delete selection button 1140, then the delete selection is conveyed from the address book user interface 404 to the address book object 108. Upon receiving the delete selection, the address book object 108 deletes the selected contact or group of contacts from the address book database 110.

The edit selection button 1145 is similar to the new contact selection button 1130 in that a user interface for editing a contact is launched or instantiated in response to the selection of the edit selection button 1145. Thus, in operation, if a user selects a contact or a group of contacts from the list of contacts 1110 and selects the edit selection button, then the address book user interface 404 issues a request to the address book object 108 to retrieve information related to the contact or the group of contacts from the address book database 110. Upon retrieving the information, the address book object 108 launches or instantiates an edit window (not shown) having the contact information, thereby permitting the user to edit the information. Once the information has been edited, the address book user interface 404 conveys the changes to the address book object 108, which stores the changes in the address book database 110.

The cancel selection button 1150 closes the address book user interface 404.

As shown with reference to FIG. 11, the address book user interface 404 permits a user to add new contact information and edit presently existing contact information. Since adding new contact information and editing contact information are well known in the art, further discussion of adding new contact information and editing new contact information is omitted here. However, it is worthwhile to note that, unlike prior systems, the address book user interface 404 permits the user to add and edit information related to both email and IM from a single address book user interface 404.

FIG. 12 is a diagram showing one embodiment of a user interface 1235 for adding new contact information. As shown in FIG. 12, the user interface 1235 comprises a name input box 1260, which permits a user to input a name of a contact. In addition to the name input box 1260, the user interface 1235 comprises an email address input box 1265, which permits a user to input one or more email addresses associated with the contact. The user interface 1235 further comprises an email list input box 1270, which permits the user to place the contact in a specified email list created by the user. Similarly, the user interface 1235 comprises an IM address input box 1280, which permits the user to input one or more IM addresses associated with the contact. In an example embodiment, the email addresses and IM addresses are sorted according to priority. The priority sorting of IM addresses and email addresses is shown in greater detail with reference to FIGS. 13A and 13B.

Likewise, street addresses, phone numbers, and other detailed information may be entered at the user interface 1235 at the address input box 1285, the phone number input box 1275, and the description input box 1290, respectively. Once the user has entered information related to the contact into their respective boxes 1260, 1265, 1270, 1275, 1280, 1285, 1290, the user interface 1235 conveys the information to the address book object 108, which stores the information in the address book database 110.

Figure 13A:
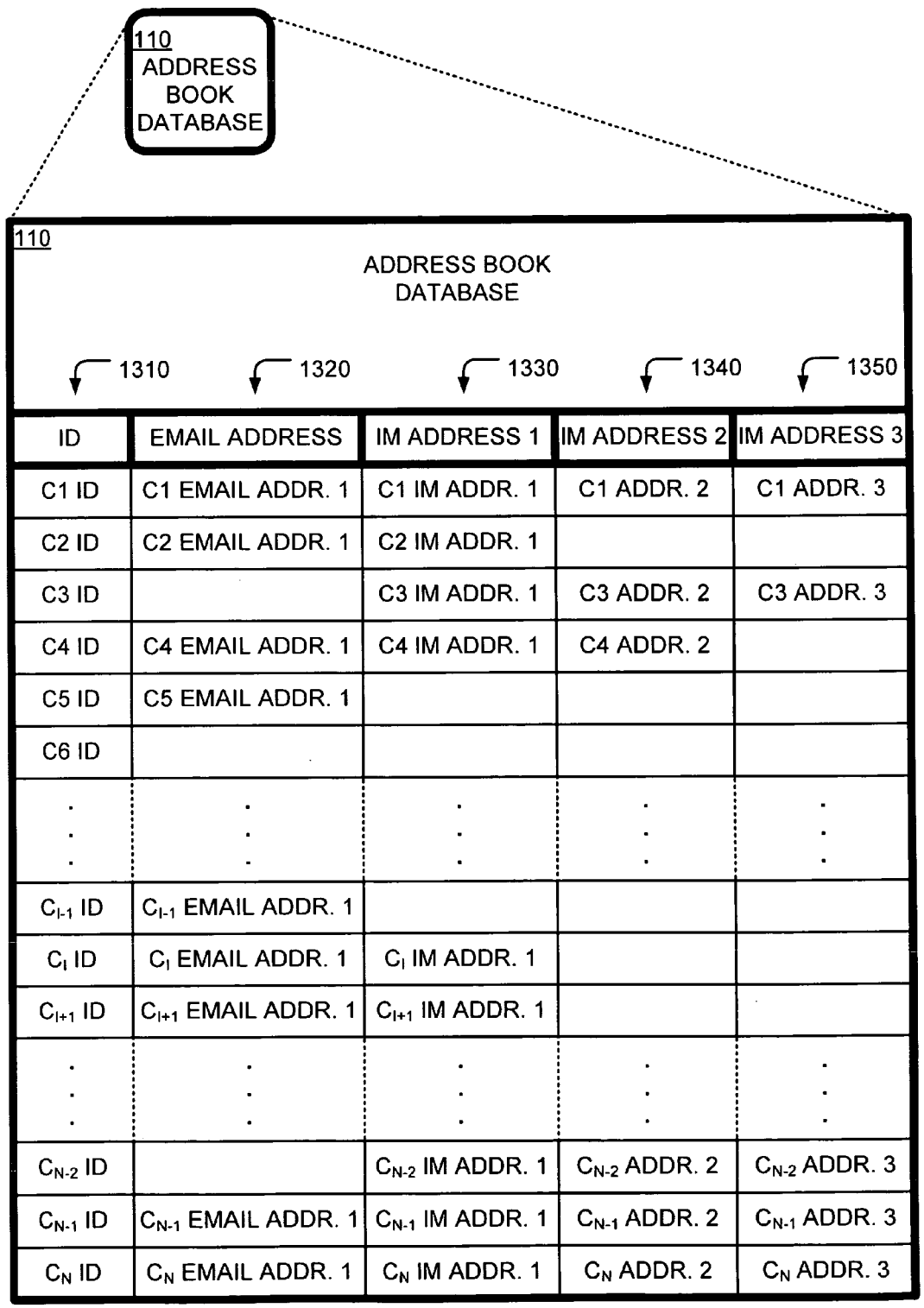
FIGS. 13A and 13B are diagrams showing one embodiment of the address book database of FIG. 7 in greater detail.
Figure 13B:
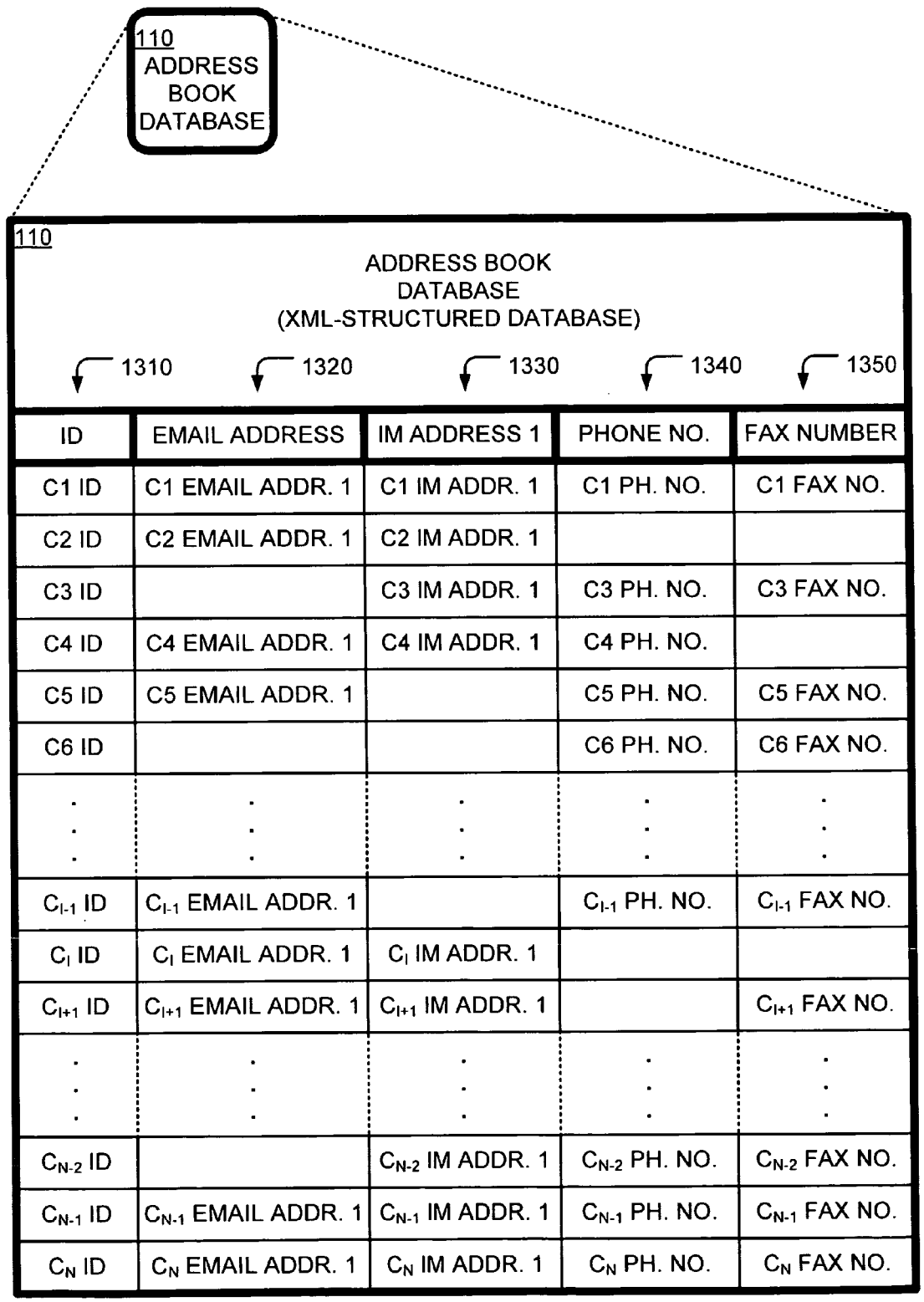

FIGS. 13A and 13B are diagrams showing one embodiment of the address book database 110 of FIG. 7 in greater detail. As described with reference to FIG. 10, once information associated with a contact has been entered by the user, this information is stored in the address book database 110. As described with reference to FIGS. 1 through 3C, the address book database 110 is one component through which email and IM integration is achieved.

The address book database 110 comprises entries that are sorted according to contact identifiers 1310. In one embodiment, the contact identifier 1310 is an identification number that is unique to each contact. Thus, no two contacts share the same contact identifier 1310. In another embodiment, the contact identifier 1310 is the name of the contact.

In any event, every piece of information related to a specific contact is correlated to the contact identifier 1310, thereby permitting a lookup of information based on the contact identifier 1310. Thus, as shown in FIGS. 13A and 13B, if an email address for a contact is entered as described with reference to FIG. 12, then this email address 1320 is stored in the address book database 110 so that it is correlated to the contact identifier 1310 for that contact. Similarly, if an IM address 1330, 1340, 1350 is entered for the contact, then the IM address 1330, 1340, 1350 is stored in the address book database 110 so that it is correlated to the contact identifier 1310 for that contact. Phone numbers 1340, fax numbers 1350, etc. are similarly stored in the address book database 110. Thus, the address book object 108 may determine any information associated with a particular contact by accessing the address book database 110 and looking up the contact identifier 1310 of the contact.

For example, in operation, if the address book object 108 is provided an email address, as described with reference to FIG. 5, the address book object 108 may access the address book database 110 using the email address to determine a corresponding contact identifier 1310 for that email address. Once the corresponding contact identifier 1310 is determined, the address book object 108 may retrieve the IM address of the contact from the address book object 108 using the contact identifier 1310. Thus, as described with reference to FIG. 5, if the email address corresponds to one or more IM addresses, then these IM addresses may be returned to the address book object 108, thereby permitting the address book object 108 to query the IM user agent 104 for IM Internet presence information associated with the contact identifier.

In an example embodiment, the IM addresses 1330, 1340, 1350 are stored in order of priority. In other words, if a user prefers to engage in an IM session with a contact at a particular IM address (e.g., Yahoo IM address, AOL IM address, MSN IM address, BellSouth IM address, etc.), then the particular IM address is stored as the first IM address 1330. Similarly, if the contact has multiple IM addresses, then the user may arrange each IM address in the order of the user's preference. Thus, in operation, if a user launches an IM session with a contact from the read window 412, as described with reference to FIGS. 5 and 9, then the address book object 108 issues an IM session invitation to the first IM address 1330 stored in the address book database 110. If the contact is not present at the first IM address 1330, then the address book object 108 issues an IM session invitation to the second IM address 1340. The address book object 108 continues in a "round-robin" fashion until an IM session acceptance is received from one of the IM addresses. Since the address book object 108 issues invitations in order of priority as stored in the address book database 110, an IM session will be established using a higher priority IM address or a more preferred IM address before being established using a lower priority IM address.

Figure 14:
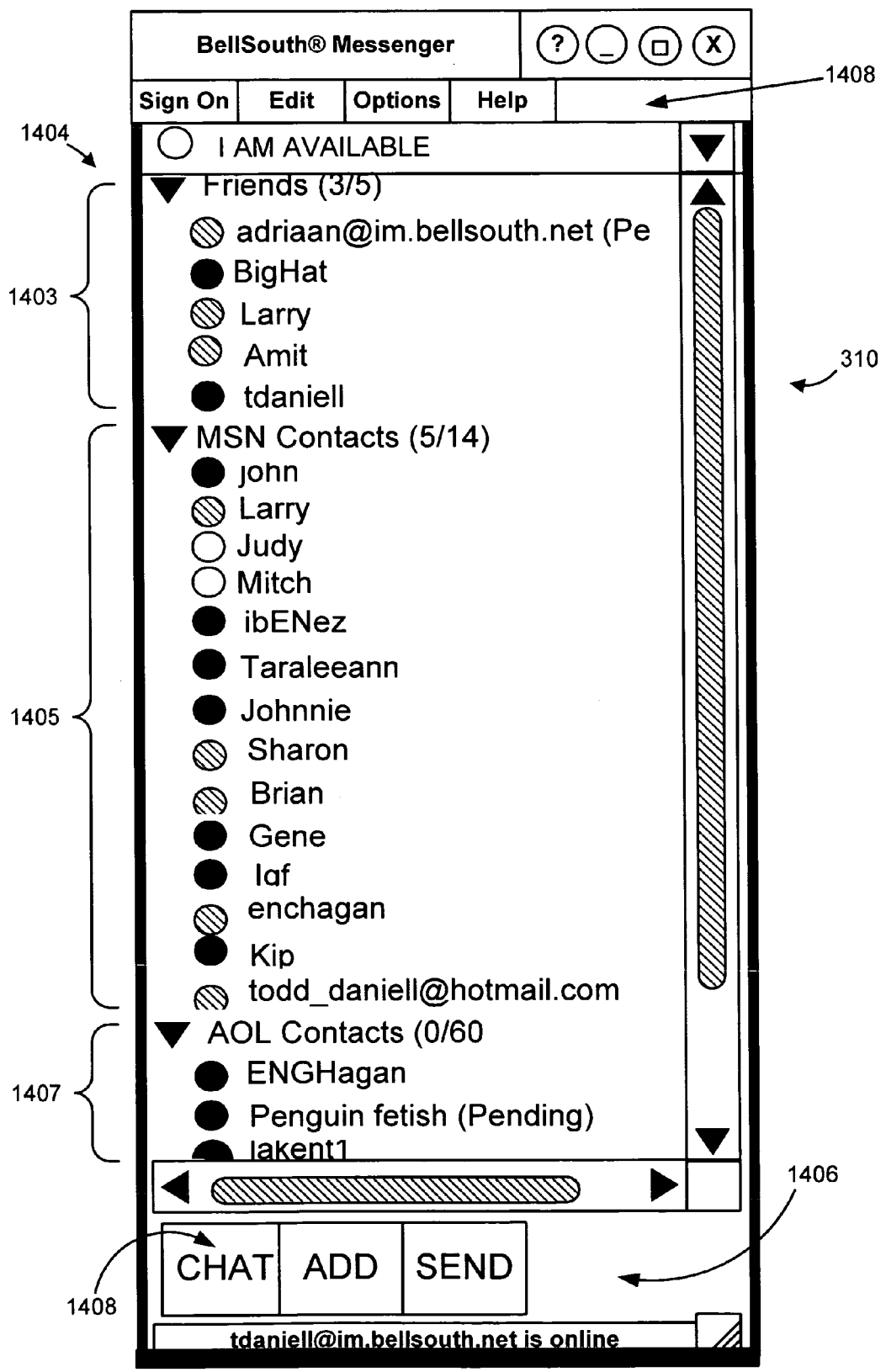
FIG. 14 is a diagram showing one embodiment of the roster window of FIG. 7 in greater detail.

FIG. 14 is a diagram showing one embodiment of the roster window 310 of FIG. 7 in greater detail. As shown in FIG. 7, the roster window 310 comprises a list of contacts 1404, which may be sub-divided according to their respective IM accounts. Thus, for example, if the user's contacts have MSN IM accounts and AOL IM accounts, then the contacts having MSN accounts 1405 are grouped together while the contacts having AOL accounts 1407 are grouped together. Since the roster window 310 is described in detail in U.S. provisional patent application Ser. Nos. 60/411,336 and 60/419,613, and U.S. patent application Ser. Nos. 10/274,408, 10/274,478, and 10/274,405, further discussion of the roster window 310 is omitted here. However, it is worthwhile to note that, unlike prior systems, the roster window 310 of FIG. 14 permits a user to initiate an IM session with contacts at various IM addresses without manually logging into multiple IM accounts.

Figure 15:
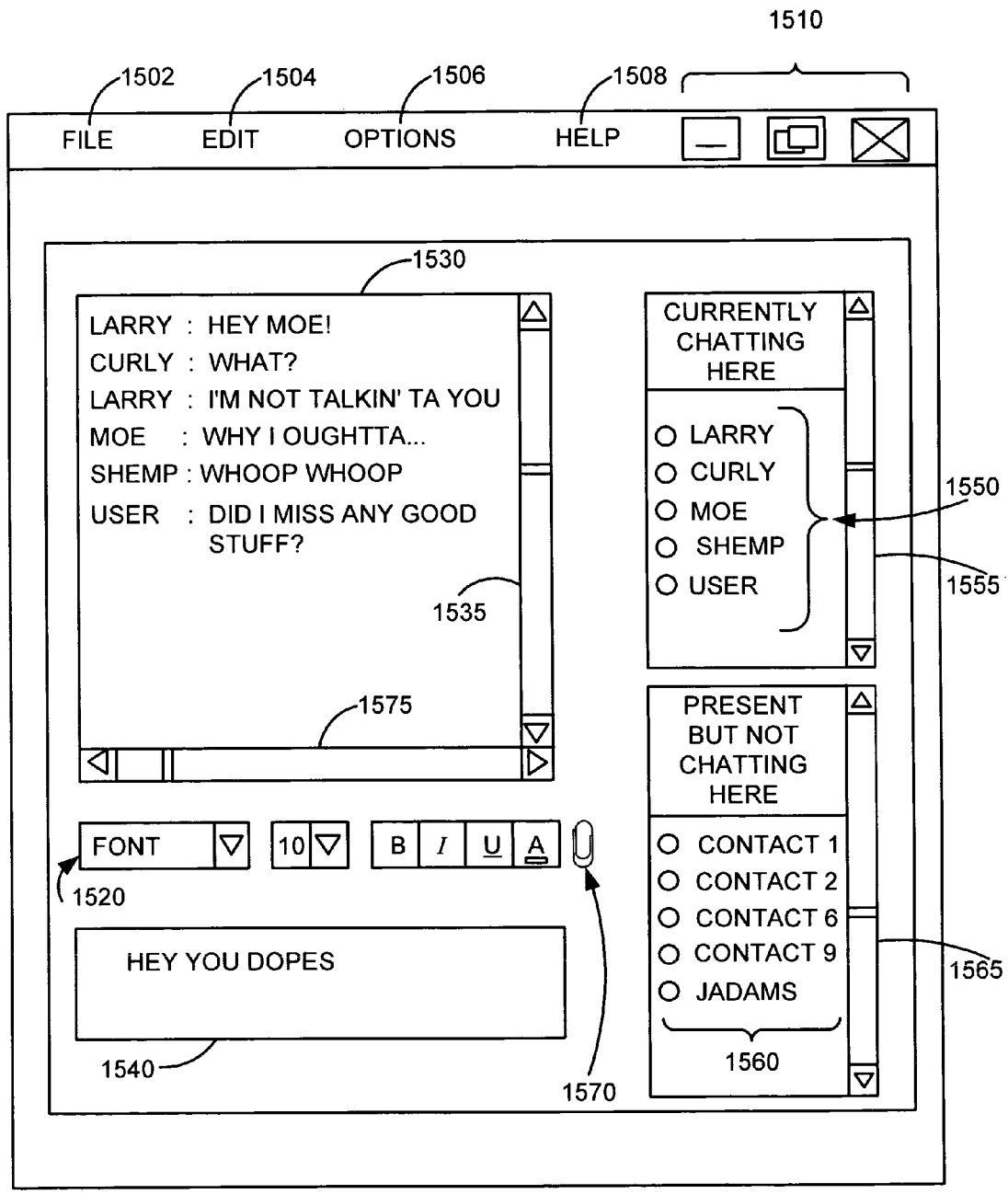
FIG. 15 is a diagram showing one embodiment of the chat window of FIG. 7 in greater detail.

FIG. 15 is a diagram showing one embodiment of the chat window 614 of FIG. 7 in greater detail. As shown in FIG. 15, the chat window 614 comprises a transcript display window 1530, a user input window 1540, a first roster window 1555, and a second roster window 1565. The transcript display window 1530 displays IM messages that are typed by all of the participants in the IM chat session. Thus, if Larry, Curly, Moe, Shemp, and the user are engaged in an IM chat session, then each of the messages typed by the participants is displayed in the transcript display window 1530. The user input window 1540 displays the IM messages that are being typed by the user.

The first roster window 1555 shows all of the contacts that are currently chatting in the chat window 614, while the second roster window 1565 displays all of the contacts that are present on the Internet but not chatting in the chat window 614. If the user chooses to invite a contact from the second roster window 1565 to the current chat session in the chat window 614, then the user may select the contact from the second roster window 1565 and "drag and drop" that contact into the first roster window 1555, thereby effectively inviting that contact into the current chat session. Similarly, if the user wishes to remove a currently chatting contact from the IM chat session, then the user may "drag and drop" that contact from the first roster window 1555 to the second roster window 1565. Thus, as shown with reference to FIG. 15, each of the participants of the IM session may invite or remove participants from the current IM chat session by moving the contacts from one roster window to the other roster window.

Although chatting between multiple participants from a common IM service is known in the art, the embodiment of FIG. 15 permits chatting between multiple participants from different IM services. Thus, for example, Larry (in FIG. 15) may be using a Yahoo IM service, while Curly is using an AOL IM service, while Moe and Shemp may each be using an MSN IM service.

In operation, when the user types an IM message at the user input window 1540, the typed message is translated into the native protocol associated with each of the other participants' IM services. Thus, any message typed by the user is displayed to each of the other participants in the IM chat session. Similarly, when the other participants type messages from their native IM windows, these messages are translated from the native protocols to an abstraction protocol, and the translated messages are displayed to the user at the IM chat window 614. Since translations to and from native protocols is described in detail in U.S. provisional patent application Ser. Nos. 60/411,336 and 60/419,613, and U.S. patent application Ser. Nos. 10/274,408, 10/274,478, and 10/274,405, further discussion of translations into native protocols is omitted here.

Additionally, one embodiment of the system of FIG. 15 provides a mechanism by which the other participants from the various other IM services may also engage in the IM session with the other participants. In other words, even if Larry only has a Yahoo IM account and Moe only has an MSN account, it is possible for Larry to engage in an IM chat session with Moe through the user's IM chat window 614.

In this regard, the system of FIG. 15 is configured so that when Larry sends an IM message to the user, the message is received by the user's system, reformatted for Moe's IM service, and conveyed to Moe. Ordinarily, if the user's system merely conveys the message to Moe, then Moe will see that the message originates from the user, rather than from Larry. Thus, in order to seamlessly provide Moe with Larry's IM message, the user's system removes the user's information for all of Larry's IM messages, and substitutes Larry's information in place of the user's information. In this regard, when Moe receives an IM message from Larry through the user's IM account, the message will appear as if it were directly sent to Moe, rather than being cascaded through the user's IM account.

In one embodiment, the user's IM address is removed from the IM message by inserting an appropriate number of delete characters into the text stream adjacent to the user's IM address. Thus, for example, if the user's IM address is ten characters in length, then, by inserting ten delete characters adjacent to the user's IM address, the user's IM address will be deleted from the text stream. Similarly, if the user's IM address is 25 characters, then the insertion of 25 delete characters effectively removes the user's IM address from the forwarded text stream. Thus, regardless of the originator of the IM message, the user's system may remove the user's information from the IM message prior to forwarding the IM message to the other IM participants, thereby seamlessly interfacing the various IM services to one another through the user's IM account.

As described with reference to FIG. 15, one embodiment of the system provides for an IM session with multiple participants from multiple different IM services. Thus, in addition to seamlessly integrating email and IM, one embodiment of the system permits seamless integration of IM services across multiple different IM platforms.

Figure 16:
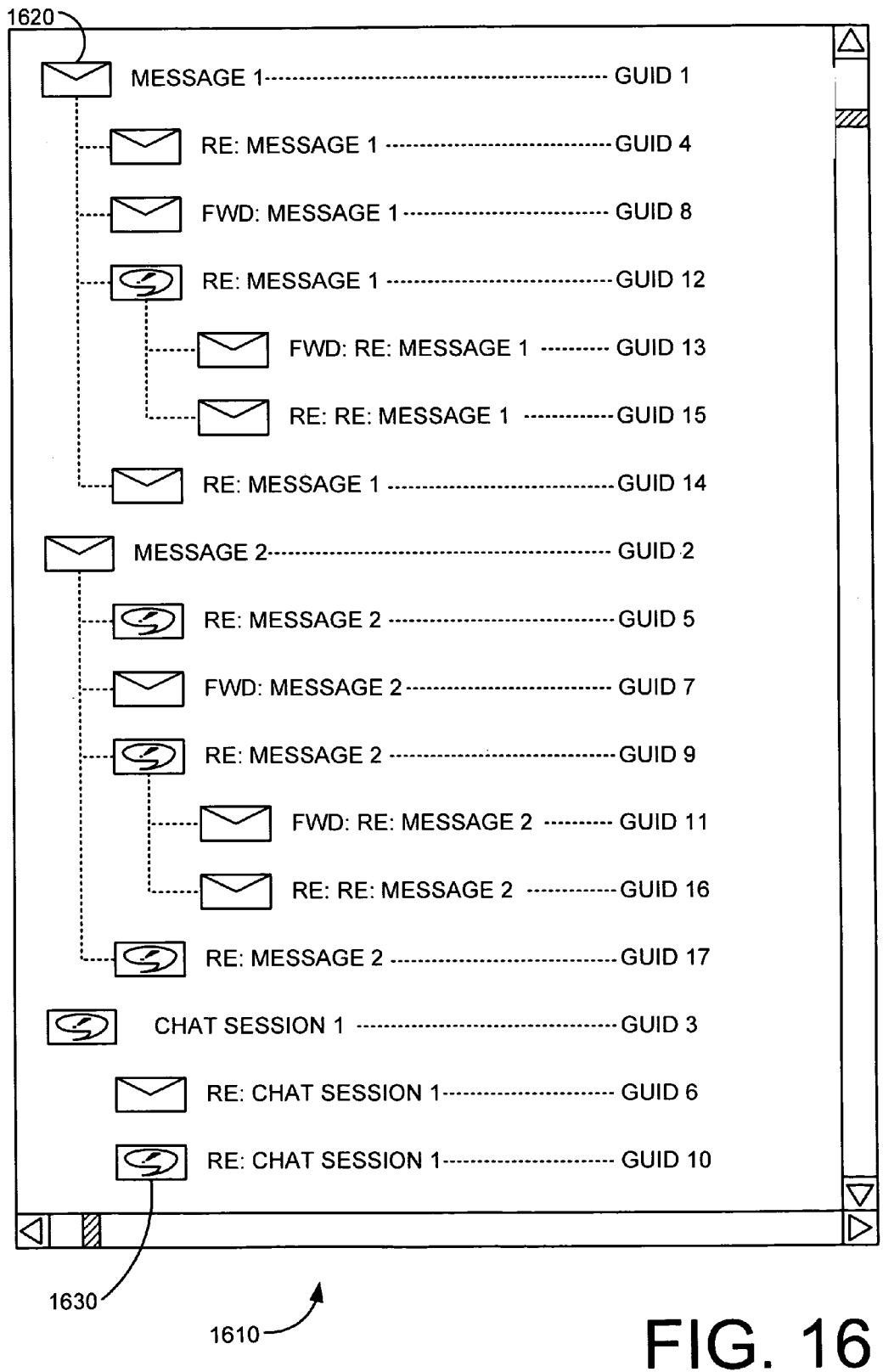
FIG. 16 is a diagram showing a thread history database in accordance with one embodiment of the invention.

FIG. 16 is a diagram showing a thread history database 1610 in accordance with another embodiment of the invention. As described with reference to FIGS. 5 and 10, a user may launch an IM session directly from an email read window 412. Thus, unlike prior systems, an email message may be threaded to an IM chat session. In this regard, when an IM chat session is launched from an email read window, the IM chat session is tagged with a pointer to the email message.

Similarly, a participant in a chat session may email another participant in the chat session, thereby threading an email message to a chat session. In this regard, when an email message is launched from an IM chat session, the email message is tagged with a pointer to the IM chat session. In order to track threads across IM and email, a thread history database 1610 is maintained. For simplicity, the email message or IM session from which a subsequent email message or IM session is launched is referred to as the "parent," and the email message or IM session that is launched from the parent is referred to as the "child."

In operation, when a child email message is generated from a parent IM chat window 614 (or a parent compose window 408), a globally unique identifier (GUID) is generated along with the child email message. Similarly, for each reply or forwarded email message, a GUID is generated. A pointer to the generated GUID is also created in the parent IM chat window, thereby linking the parent IM chat session to the child email message. Similarly, a pointer to the GUID of the parent IM chat session is created in the child email message, thereby linking the child email message to the parent IM chat session. In an example embodiment, the GUID is a 128-bit number that is unique to that message. Since GUID generation is well known in the art, further discussion of GUID generation is omitted here.

Likewise, when an IM chat session is established (see FIG. 6C), a corresponding chat session transcript is generated for that IM chat session. Similar to the generation of GUIDs for email messages, a GUID is generated for each chat session transcript. Thus, regardless of whether an email message is generated or whether a chat session is initiated, each message or transcript is associated with a GUID. Additionally, when a child IM chat session is established or launched from a parent email window, a pointer to the GUID of the child IM chat session is created in the parent email message, thereby linking the child IM chat session to the parent email message. Similarly, a pointer to the GUID of the parent email message is created in the child IM chat session, thereby linking the child IM chat session to the parent email message.

Each of the email messages or chat transcripts are stored in the thread history database 1610, along with its GUID, in a tree structure. As shown in FIG. 16, each email message is displayed with an email icon 1620, while each IM chat transcript is displayed with an IM icon 1630, thereby distinguishing email threads from chat threads.

In operation, when a user selects one of the email messages in the thread history, the selected email message is displayed to the user in an email read window 412. The email read window 412 also includes the pointer to the parent email message (or parent IM chat session) so that the user may track the history of the message. Similarly, the email read window 412 includes the pointer to any child email message (or child IM chat session) so that the user may track subsequent email messages (or subsequent IM chat sessions) that were launched from the displayed email message.

Likewise, when the user selects one of the IM chat sessions in the thread history, a transcript of the selected IM chat session is displayed to the user in an IM chat window 614. The IM chat window 614 also includes a pointer to the parent email message (or parent IM chat session) so that the user may track the history of the IM chat session. Similarly, the IM chat window 614 includes the pointer to any child email message (or child IM chat session) so that the user may track subsequent email messages (or subsequent IM chat sessions) that were launched from the displayed IM chat session transcript.

Since storing of thread histories, generally, is known in the art, further discussion of storing thread histories is omitted here. However, it is worthwhile to note that, unlike prior systems, the integration of email and IM as shown in the embodiments of FIGS. 1 through 15 permits threading of both email and IM messages.

In another embodiment, the thread history database 1610 permits the user to access any related message, whether email-related or IM-related, from the tree-structure. Thus, for example, if a user wishes to view an IM chat transcript associated with a particular email message, then the user may select the IM chat transcript from the thread history database 1610 and open the IM chat transcript for viewing. Similarly, if the user wishes to view an email message associated with a particular IM chat session, the email message may be selected from the thread history database 1610 for viewing by the user.

As shown with reference to FIG. 16, by having a thread history database 1610 having both IM-related transcripts and email-related messages, a user may track each message or transcript according to its respective thread history.

As shown in FIGS. 1 through 16, several embodiments of systems for integrating email and IM services is shown. The invention, however, may also be seen as providing methods for integrating email and IM services. Several embodiments of methods for integrating email and IM services is shown with reference to FIGS. 17 through 27.

Figure 17:
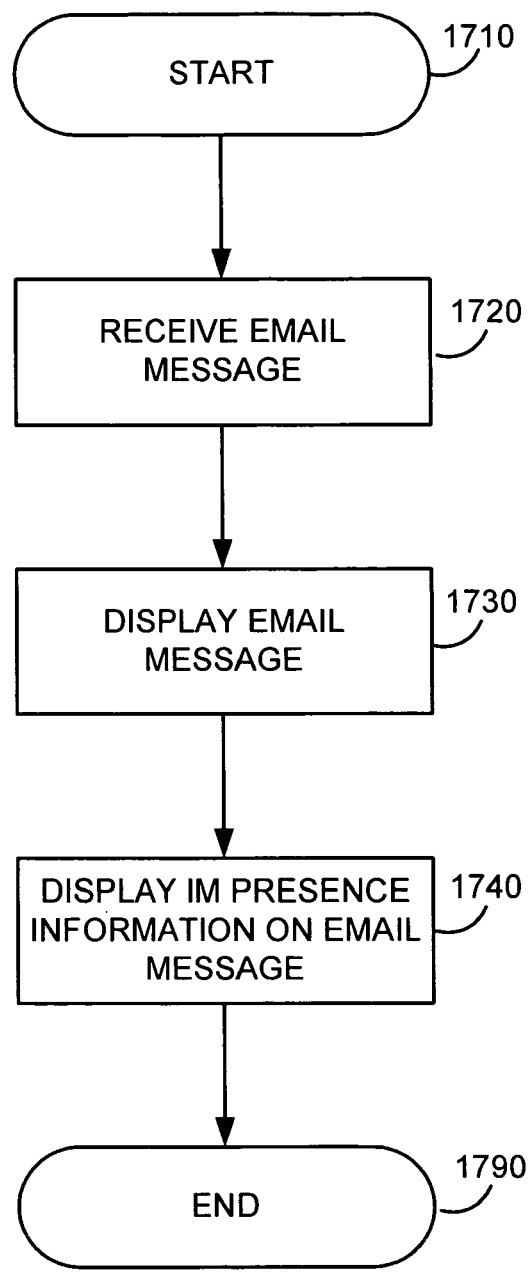
FIG. 17 is a flowchart showing one embodiment of a method for integrating email and IM services in which IM Internet presence information is displayed on an email read window.

FIG. 17 is a flowchart showing one embodiment of a method for integrating email and IM services in which IM Internet presence information is displayed on an email read window. As shown in FIG. 17, one embodiment of the method begins when an email message is received (1720) from a contact. The received (1720) email message has an email address of the contact. The received (1720) email message is displayed (1730) to a user. Additionally, IM presence information is displayed (1740) on the email message. In an example embodiment, the method of FIG. 17 may be performed by the system as described with reference to FIGS. 1 through 5 and FIGS. 9 and 10. Thus, in an example embodiment, the IM presence information is displayed (1740) adjacent to the email address of the contact. In another embodiment, the email message has email addresses of multiple contacts to whom the email message was directed. In that embodiment, the IM presence information is displayed (1740) on the email message adjacent to each of the contacts' email addresses.

Figure 18:
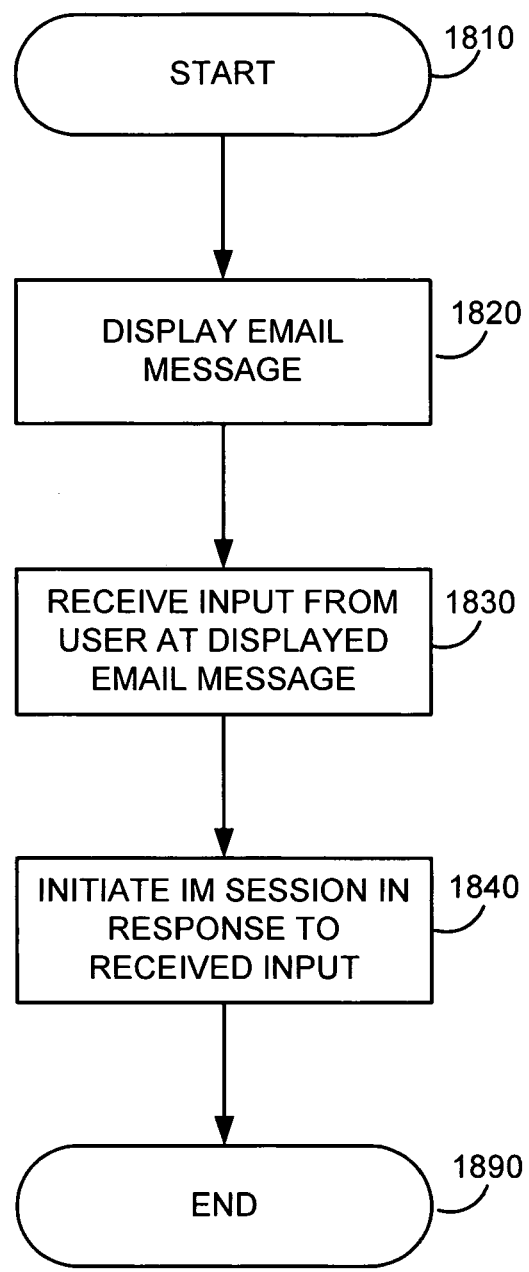
FIG. 18 is a flowchart showing another embodiment of a method for integrating email and IM services in which an IM session may be initiated from an email read window.

FIG. 18 is a flowchart showing another embodiment of a method for integrating email and IM services in which an IM session may be initiated from an email read window. As shown in FIG. 18, another embodiment of the method begins when an email message from a contact is displayed (1820) to the user at an email read window. The email message includes an email address of the contact. Upon displaying (1820) the email message to the user, the system awaits user input. When the user provides the user input, the user input is received (1830) at the displayed email message. In response to the received (1830) user input, an IM session is initiated (1840) between the user and the contact. In another embodiment, the email message includes email addresses of multiple contacts to whom the email message was directed. In that embodiment, the user input is a selection of one or more of the email addresses of the multiple contacts. Thus, for that embodiment, an IM session is initiated (1840) between the user and one or more of the multiple contacts. In an example embodiment, the method of FIG. 18 may be performed by the systems described with reference to FIGS. 1 through 5 and FIGS. 9 and 10.

Figure 19:
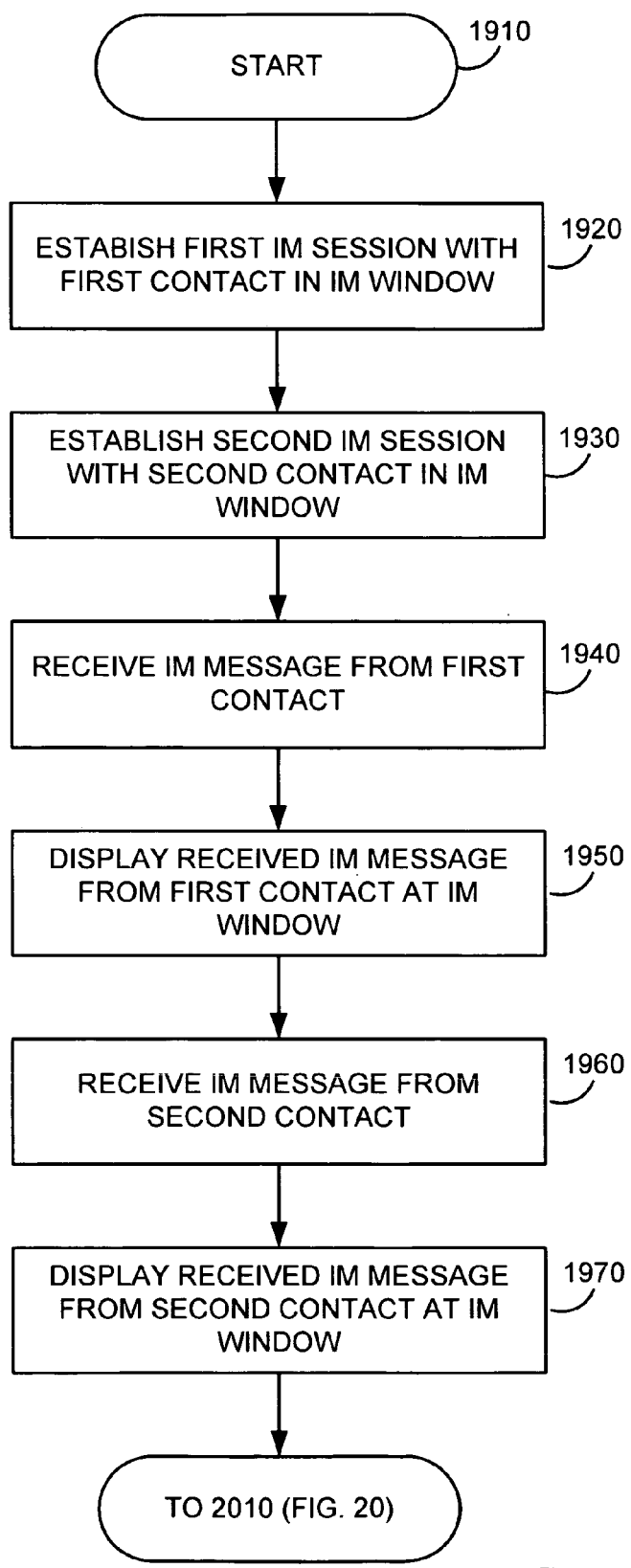
FIGS. 19 and 20 are flowcharts showing another embodiment of a method for integrating email and IM services in which IM sessions with multiple contacts is established at a single IM window.
Figure 20:
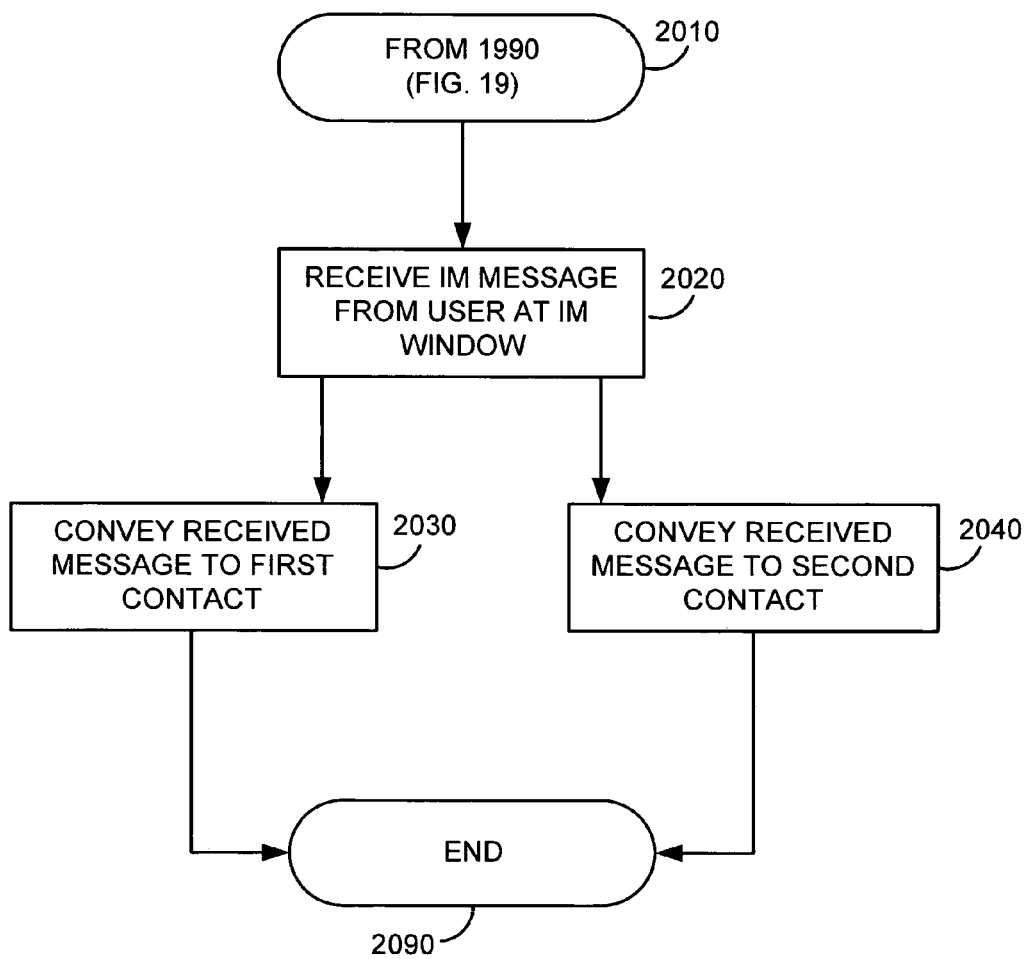

FIGS. 19 and 20 are flowcharts showing another embodiment of a method for integrating email and IM services in which IM sessions with multiple contacts is established at a single IM window. As shown in FIG. 19, a first IM session is established (1920) between the user and a first contact at an IM window. Upon establishing (1920) the first IM session with the first contact in the IM window, a second IM session is established (1930) with a second contact in the same IM window. Once the first IM session with the first contact is established (1920), the user receives (1940) IM messages from the first contact. The received (1940) IM messages are displayed (1950) to the user at the IM window. Similarly, once the second IM session with the second contact is established (1930), the user receives (1960) IM messages from the second contact. The received (1960) messages are displayed (1970) to the user at the IM window.

When the user types an IM message to the first and second contacts, this IM message is received (2020) at the IM window. After receiving (2020) the IM message typed by the user, the IM message is conveyed (2030) to the first contact. Similarly, the IM message is also conveyed (2040) to the second contact. In an example embodiment, the method of FIGS. 19 and 20 may be performed by the systems described in FIGS. 1 through 5 and FIG. 15.

Figure 21:
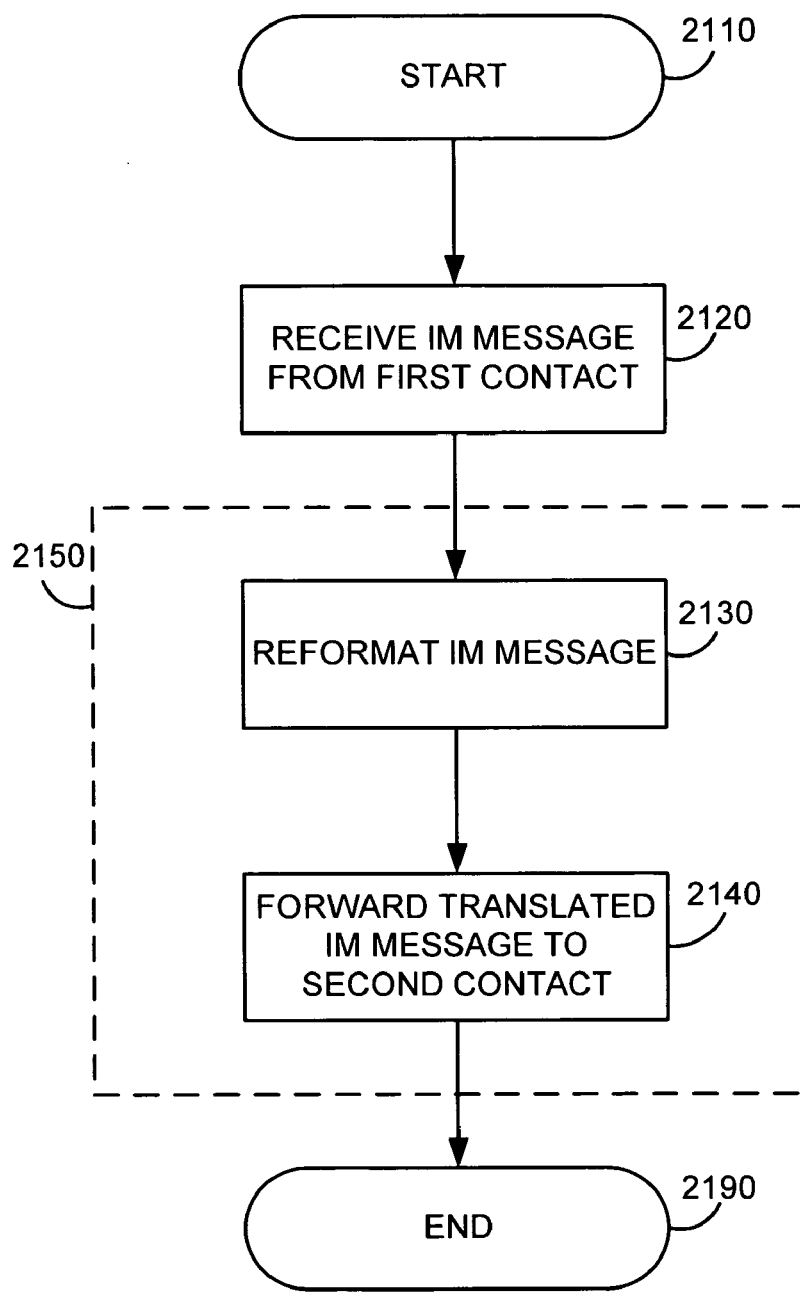
FIG. 21 is a flowchart showing another embodiment of a method for integrating email and IM services in which IM messages from two disparate IM services is bridged by the user's IM service.

FIG. 21 is a flowchart showing another embodiment of a method for integrating email and IM services in which IM messages from two disparate IM services is bridged by the user's IM service. As shown in FIG. 21, an IM message is received (2120) from a first contact. The IM message received (2120) from the first contact is transmitted by the first contact using a first IM protocol. Upon receiving (2120) the IM message, the IM message is reformatted (2130) and forwarded (2140) to a second contact. The second contact receives the IM message using a second IM protocol. The reformatting (2130) and forwarding (2140) of the IM message may be seen, in the aggregate, as a conveying (2150) of the IM message to the second contact. In an example embodiment, the method of FIG. 21 may be performed by the systems described in FIGS. 1 through 5 and FIG. 15.

Figure 22:
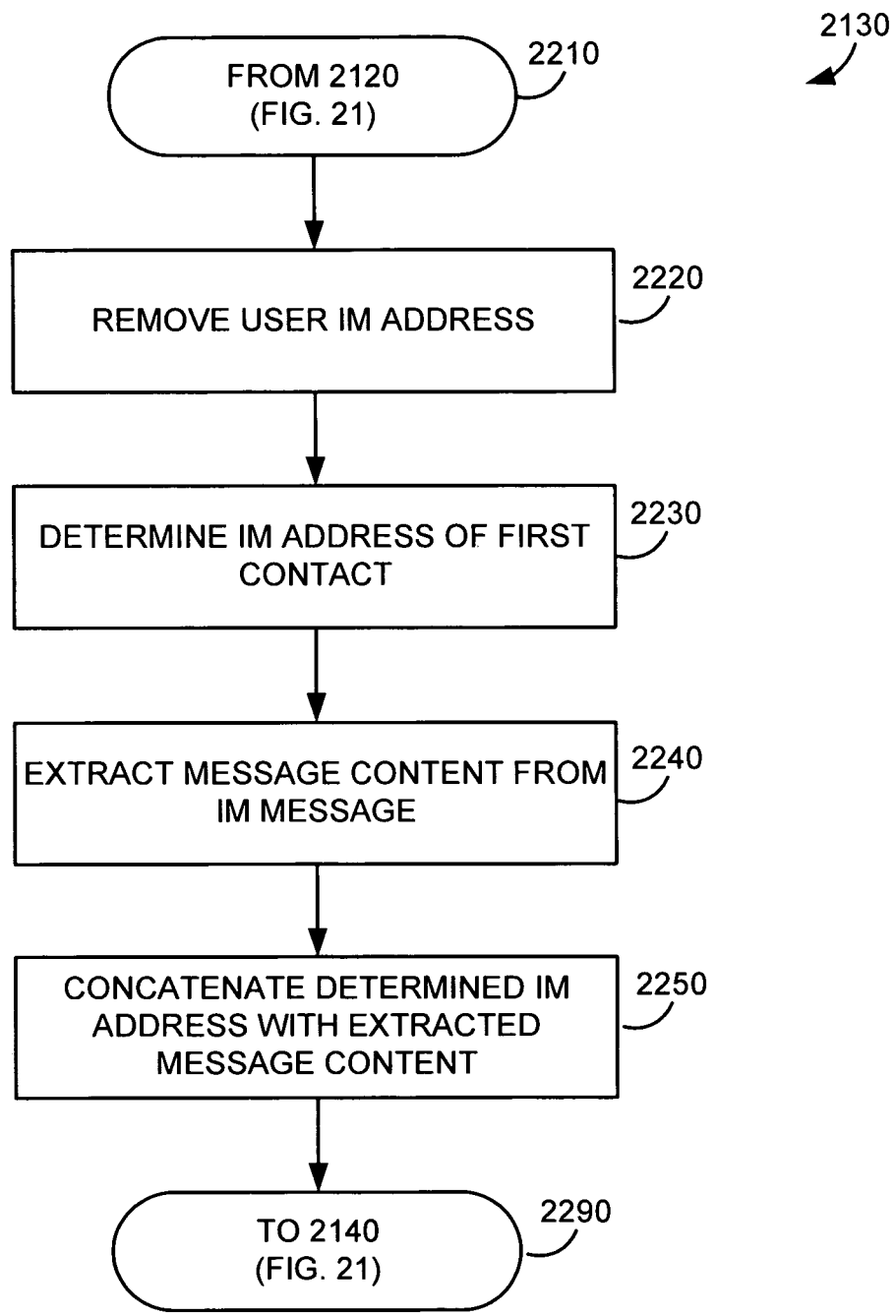
FIG. 22 is a flowchart showing, in greater detail, the reformatting of the IM message shown in FIG. 21.

FIG. 22 is a flowchart showing, in greater detail, the reformatting (2130) of the IM message shown in FIG. 21. As shown in FIG. 22, the reformatting (2130) may be seen as comprising the removal (2220) of the user's IM address. Upon removing (2220) the user's IM address, the IM address of the first contact is determined (2230). Once the IM address of the first contact is determined (2230), the message content from the IM message is extracted (2240). The extracted (2240) message content is then concatenated (2250) with the determined IM address of the first contact. As shown in the embodiment of FIG. 22, by removing the user's IM address from the message, the IM message is forwarded to the recipient as if it were directly sent to the recipient, rather than being cascaded through the user's system.

Figure 23:
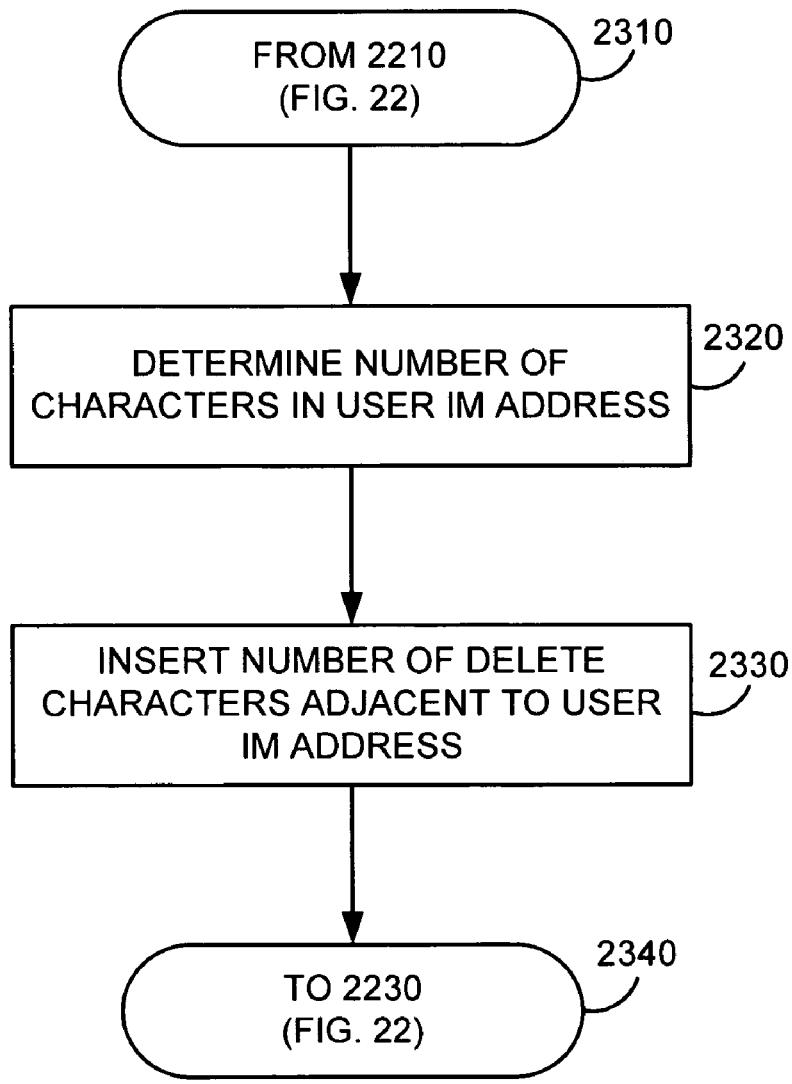
FIG. 23 is a flowchart showing, in greater detail, the removing of the user IM address from the IM message as shown in FIG. 22.

FIG. 23 is a flowchart showing, in greater detail, the removing (2220) of the user IM address shown in FIG. 22. The removing (2220) of the user's IM address may be seen as a two-step process. Thus, as shown in FIG. 23, the removing (2220) of the user's IM address begins with determining (2320) a number of characters in the user's IM address. Upon determining (2320) the number of characters in the user's IM address, the same number of delete characters is inserted (2330) adjacent to the user's IM address. Thus, in effect, the inserted delete characters removes the user's IM address from the message stream.

Figure 24:
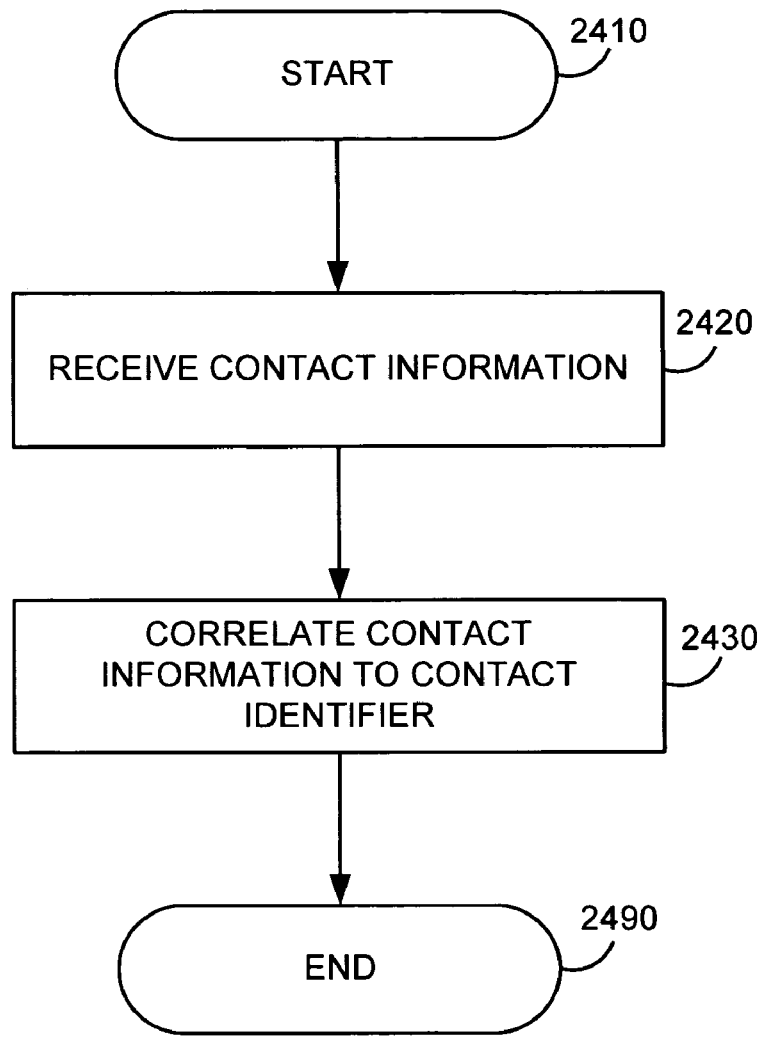
FIG. 24 is a flowchart showing one embodiment of a method for integrating email and IM services in which contact information is correlated to a contact identifier associated with a particular contact.

FIG. 24 is a flowchart showing one embodiment of a method for integrating email and IM services in which contact information is correlated to a contact identifier associated with a particular contact. As shown in FIG. 24, one embodiment of the method begins with receiving (2420) of contact information. Upon receiving (2420) the contact information, the received (2420) contact information is correlated (2430) to a contact identifier. As described with reference to FIGS. 12 through 13B, the contact information may comprise a full name, one or more email addresses, one or more IM addresses, one or more phone numbers, one or more mailing addresses, and other detailed information related to the contact.

Figure 25:
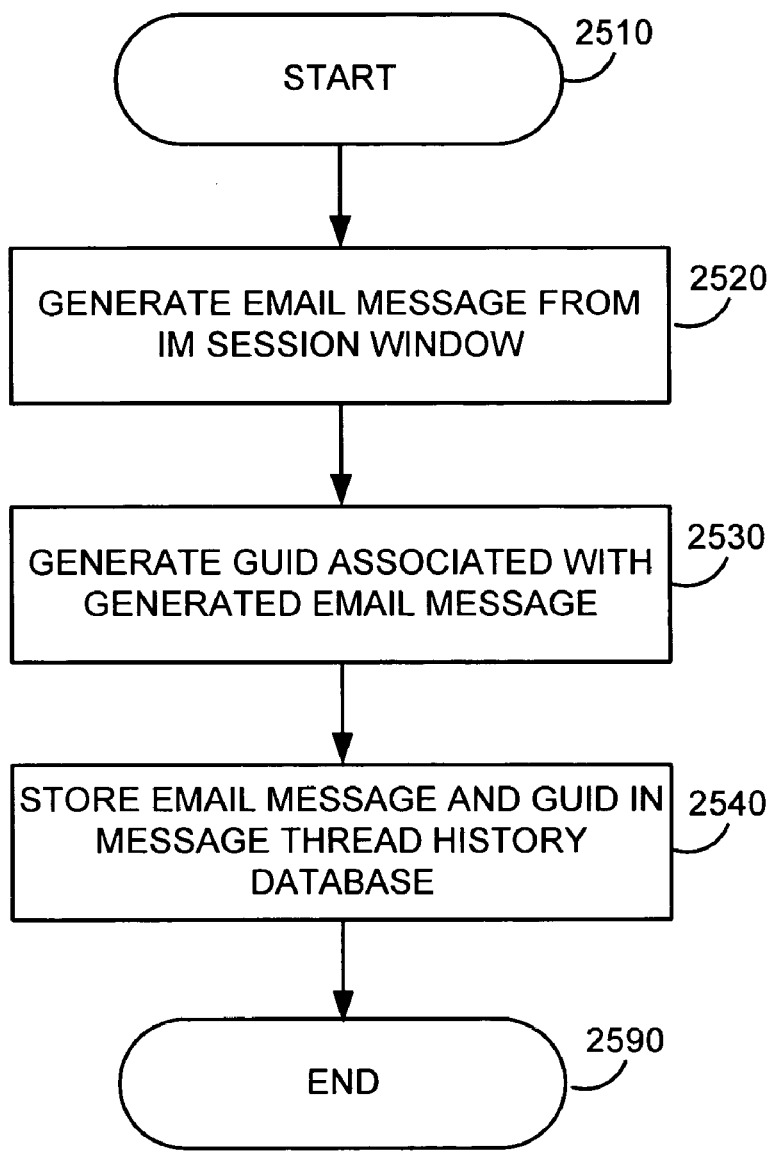
FIG. 25 is a flowchart showing one embodiment of a method for integrating email and IM services in which an email thread history is stored in a single thread history database.
Figure 26:
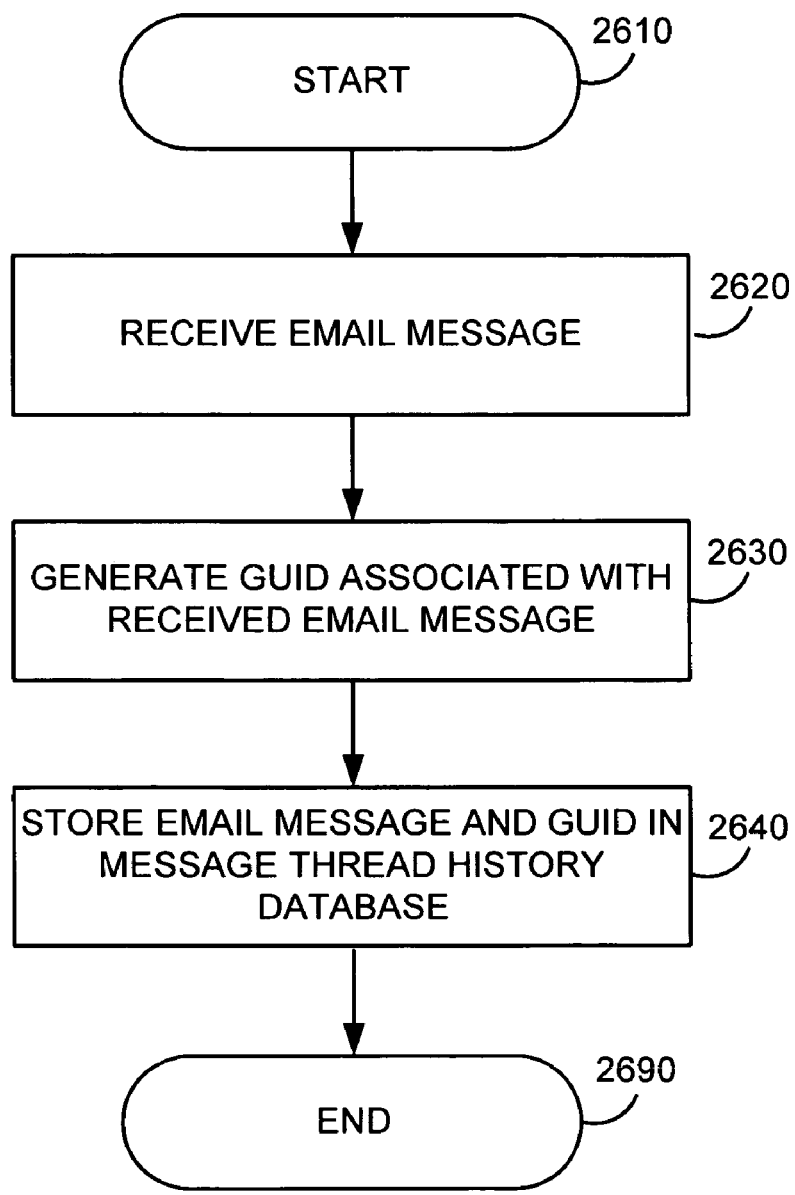
FIG. 26 is a flowchart showing one embodiment of a method for integrating email and IM services in which an email thread history is stored in a single thread history database.
Figure 27:
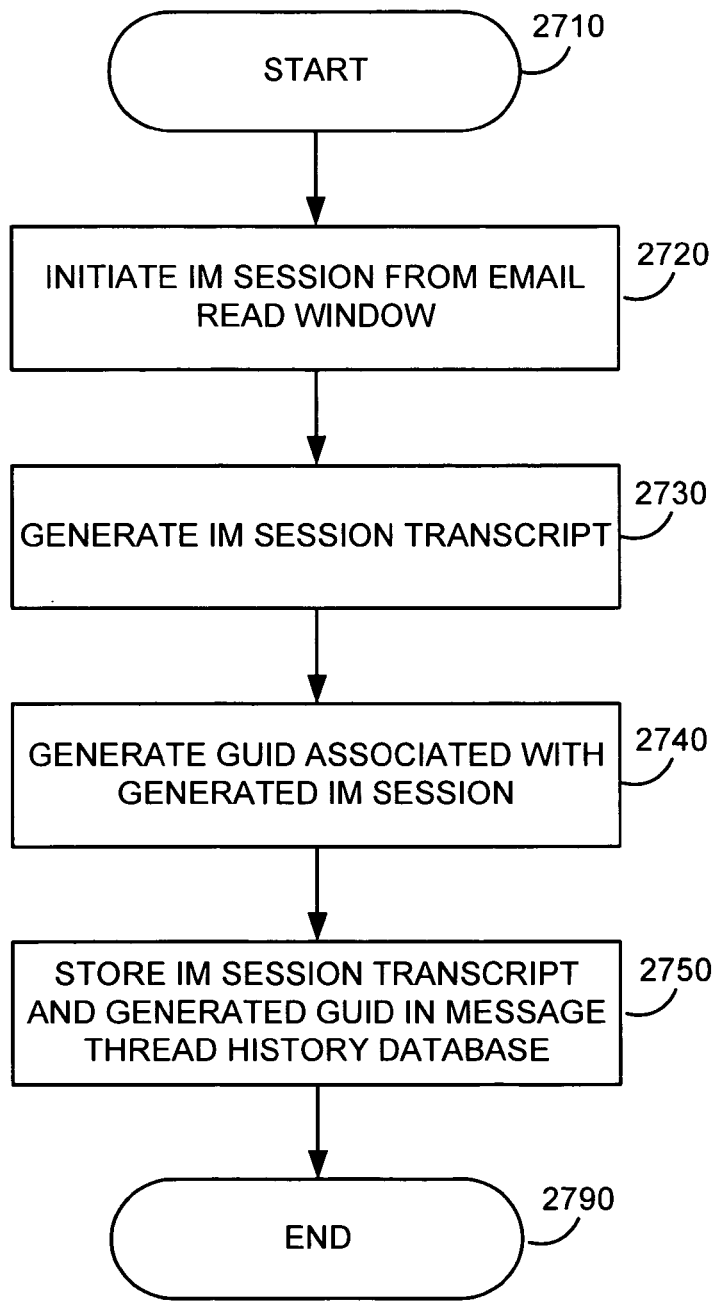
FIG. 27 is a flowchart showing one embodiment of a method for integrating email and IM services in which an IM thread history is stored in a single thread history database.

FIGS. 25 through 27 are flowcharts showing several embodiments of methods for integrating email and IM services in which email thread history and IM thread history are stored in a single thread history database. As shown in FIG. 25, one embodiment may be seen as comprising the generating (2520) of an email message from an IM session window. In addition to generating (2520) the email message from the IM session window, a globally unique identifier (GUID) associated with the generated email message is also generated (2530). Both the email message and the GUID are then stored (2540) in a message thread history database. Similarly, as shown in FIG. 26, when an email message is received (2620), a GUID associated with the received (2620) email message is generated (2630). The received (2620) email and the generated (2630) GUID are stored (2640) in the message thread history database. Also, when an IM session is initiated (2720) from an email read window, a session transcript is generated (2730). In addition to the session transcript, a GUID associated with the session transcript is also generated (2740). The IM session transcript and the GUID are stored (2750) in the thread history database. Thus, as shown in FIGS. 25 through 27, both IM and email thread histories may be stored in a single thread history database, thereby permitting a user to access any IM transcript or email message associated with a particular thread. In an example embodiment, the thread history database may be similar to the database shown in FIG. 16.

FIGS. 28A through 28E are data flow diagrams corresponding to FIGS. 2A through 2C. In this regard, FIGS. 28A through 28E show the data flow subsequent to installation of software components. As shown in FIG. 28A, the tray manager 102 receives (2902) a selection of an email user interface 210 by the user. Upon receiving the selection of the email user interface 210, the tray manager 102 requests (2804) login names and passwords for all of the user's email and IM accounts from the login database 3050. The login names and passwords for all of the user's email and IM accounts is received (2806) by the tray manager 102 in response to the request (2804). The email login names and passwords are then conveyed (2808) by the tray manager 102 to the email user agent 106, which logs into (2810) each of the user's email accounts using the email login names and passwords. Upon logging into (2810) each of the user's email accounts, the email user agent 106 requests (2812) email messages from the email server 204. In response to the request (2812), the email user agent 106 receives (2814) the email messages from the email server 204. The process of retrieving email messages is described in greater detail with reference to FIGS. 30 and 31 and is, therefore, not discussed further here. Upon receiving (2814) the email messages, the email user agent 106 stores conveys the email messages to a mail store agent 206 for storing (2816).

In addition to retrieving email messages, a user interface is instantiated to display the retrieved email messages. This process is shown in FIG. 28B. As shown in FIG. 28B, the email user agent 104 generates a command to instantiate a user interface. The command is conveyed (2818) to the tray manager 102, which instantiates (2820) the email user interface 210. The email user interface 210 further instantiates (2822) a message center. Upon instantiating (2820) the email user interface 210 and the message center, the email user agent 106 issues a request (2824) to the mail store 206 for all of the stored email messages. The email messages are received (2826) by the email user agent 106 in response to the request. The email user agent 106 conveys (2828) the email messages to the tray manager 102, which, in turn, conveys (2830) the email messages to the email user interface 210 for display.

As shown in FIG. 28C, in a substantially parallel process as the retrieval of the email messages, the tray manager 102 conveys (2832) the IM login names and passwords to the IM user agent 104. The IM user agent 104 logs into (2834) each of the user's IM accounts using the received IM login names and passwords. Upon logging into (2834) each of the IM accounts, the IM user agent obtains (2836) the IM Internet presence information for each of the IM contacts as described in U.S. provisional patent application Ser. Nos. 60/411,336 and 60/419,613, and U.S. patent application Ser. Nos. 10/274, 408, 10/274,478, and 10/274,405.

Thus, as shown in FIGS. 28A through 28C, if the user chooses to launch the email user interface 210, then all of the user's email messages from all of the user's email accounts is displayed to the user by launching the tray manager 102. Additionally, all of the user's contacts' IM Internet presence information is retrieved by the launching of the tray manager 102.

FIGS. 29A through 29E are data flow diagrams corresponding to FIGS. 3A through 3C. In this regard, FIGS. 29A through 29E show the data flow subsequent to installation of software components. As shown in FIG. 29A, the tray manager 102 receives (2902) the selection of the IM user interface. Upon receiving (2902) the selection, the tray manager 102 instantiates (2904) the IM user interface 308. The IM user interface 308 queries (2906) the user for a login name and password. Thus, unlike the selection of the email user interface 210 in FIGS. 28A through 28C, the selection of the IM user interface 308, in this embodiment, results in user input of a login name and password. The IM user interface 308 receives (2908) the login name and password entered by the user and conveys (2910) the login name and password to the IM user agent 104. The IM user agent 104 looks up (2912) the login database 3050 to determine whether or the login name and password are in the login database 3050. If the login name and password are in the login database 3050, then the IM user agent 104 receives (2914) a confirmation that the login name and password are valid. Upon receiving the confirmation, the IM user agent 104 issues a request (2916) to the login database 3050 for all IM login names and passwords. The IM login names and passwords are received (2918) in response to the request (2916).

As shown in FIG. 29B, upon receiving (2918) all of the IM login names and passwords, the IM user agent logs into (2920) each of the user's IM accounts through the IM server 304 using the IM login names and passwords. Since the login process is discussed in detail in U.S. provisional patent application Ser. Nos. 60/411,336 and 60/419,613, and U.S. patent application Ser. Nos. 10/274,408, 10/274,478, and 10/274,405, further discussion of the login process is omitted here. Upon logging into (2920) the IM accounts through the IM server 304, the IM user agent 104 obtains (2922) the IM Internet presence information for each of the user's contacts from the IM server 304. Upon obtaining (2922) the IM Internet presence information, the IM user agent 104 issues (2924) a command to the tray manager 102 to display the IM Internet presence information for all of the user's contacts. In response to the command, the tray manager 102 issues a request (2926) to the IM user interface 308 to instantiate a roster window. The IM user interface 308 instantiates (2928) the roster window in response to the issued request by the tray manager 102. Upon instantiation (2928) of the roster window, the IM user agent 104 conveys (2930) the IM Internet presence information to the tray manager 102, which, in turn, conveys (2932) the IM Internet presence information to the roster window through the IM user interface 308. The IM Internet presence information is subsequently displayed to the user at the roster window.

As shown in FIG. 29C, in a substantially parallel process as the retrieval of the IM Internet presence information, the IM user agent 104 conveys (2934) the login name and password to the tray manager 102, which, in turn, conveys (2936) the login name and password to the email user agent 106. The email user agent 106 issues (2942) a request to the login database 3050 for all of the email login names and passwords for all of the user's email accounts. In response to the request (2942), the email user agent 106 receives (2944) the email login names and passwords from the login database 3050.

Continuing with FIG. 29D, the email user agent 106 logs into (2946) each of the user's email accounts using the email login names and passwords. The process of logging into each of the user's email accounts is shown in greater detail with reference to FIGS. 30 and 31. Upon logging into (2946) each of the email accounts, the email user agent 106 issues a request (2948) for all of the email messages at the various email accounts. The email messages are received (2950) by the email user agent 106 in response to the request (2948). Upon receiving (2950) the email messages, the email user agent 106 conveys the email messages to the mail store 206, which stores (2952) the email messages.

Thus, as shown in FIGS. 29A through 29D, if the user chooses to launch the IM user interface 308, all of the user's contacts' IM Internet presence information is retrieved and displayed to the user by inputting a single user name and password. Additionally, all of the user's email messages from all of the user's email accounts is retrieved by the inputting of the single user name and password.

Figure 30:
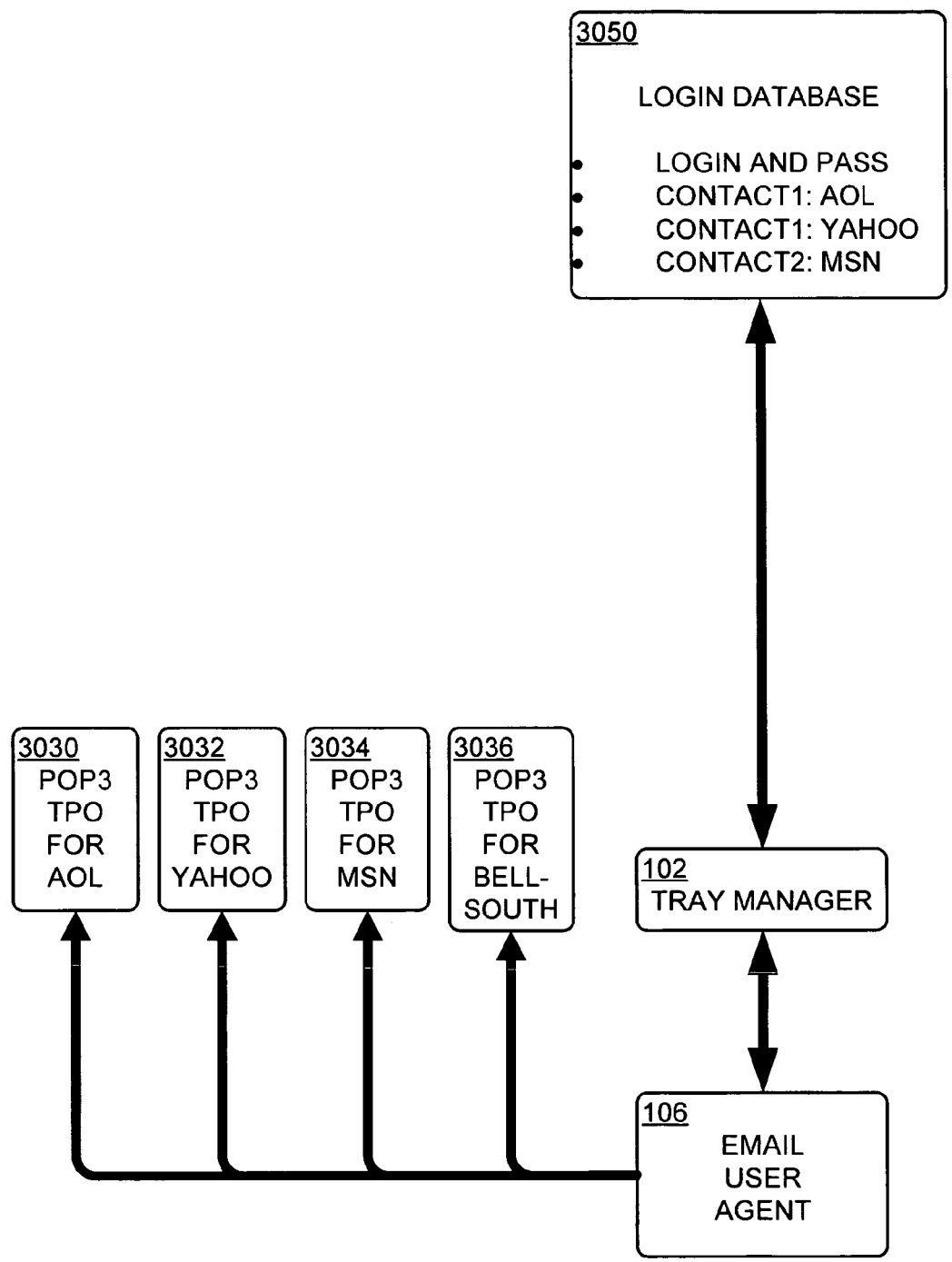
FIG. 30 is a block diagram showing one embodiment of an email user agent instantiating a plurality of post office protocol version 3 (POP3) transport protocol objects (TPOs).
Figure 31:
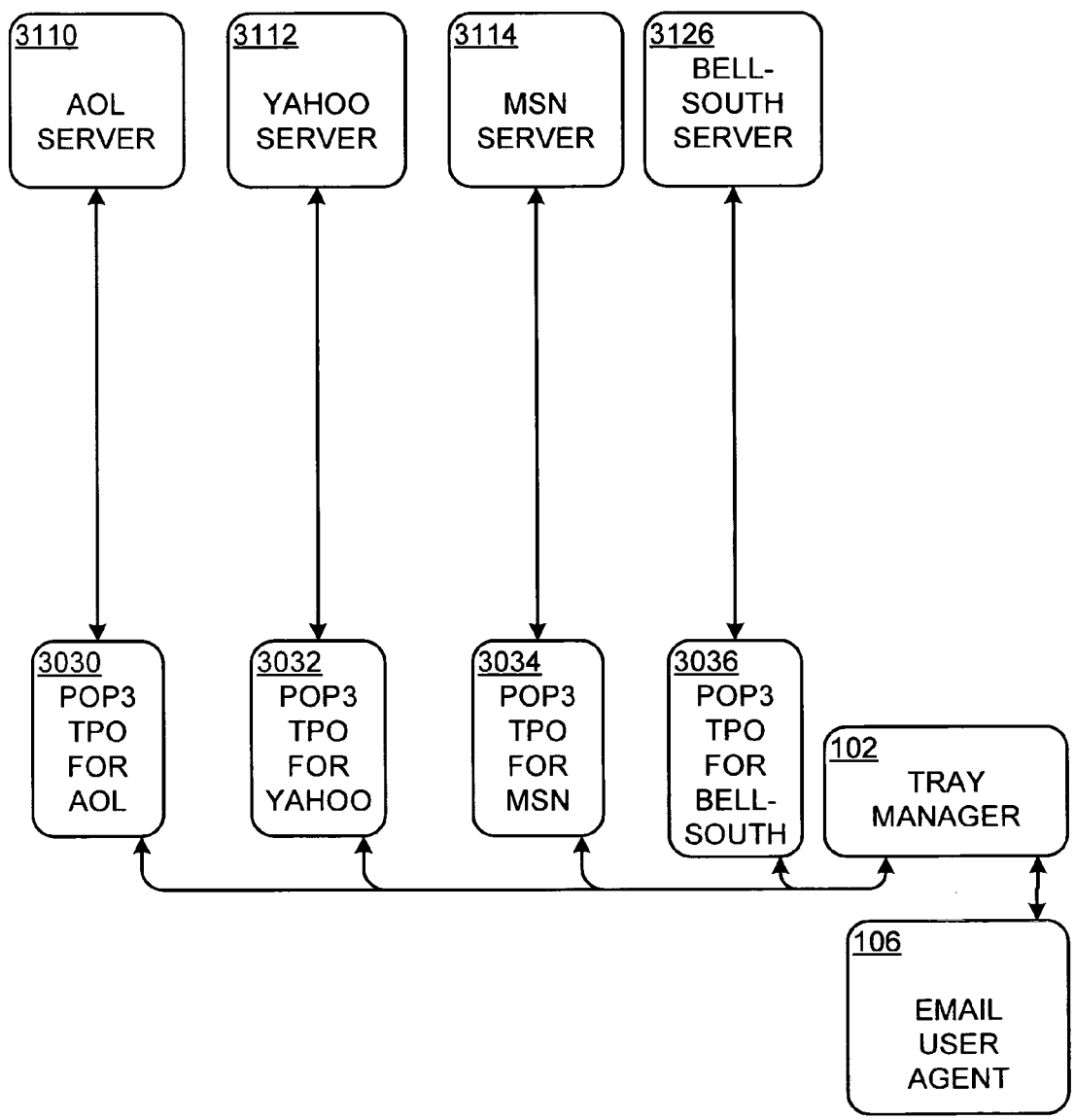
FIG. 31 is a block diagram showing one embodiment of an email user agent communicating with a plurality of email servers through the plurality of POP3 TPOs.

FIGS. 30 and 31 show an example email login process in which a specific user may log into several email accounts to retrieve email messages. In this regard, FIGS. 30 and 31 show email components that correspond to the IM components shown in U.S. provisional patent application Ser. Nos. 60/411,336 and 60/419,613, and U.S. patent application Ser. Nos. 10/274,408, 10/274,478, and 10/274,405. While the embodiments of FIGS. 30 and 31 refer to specific Internet service providers (e.g., Yahoo, Microsoft Network (MSN), America On-Line (AOL), BellSouth, etc.), it should be understood that these specific references are provided for purposes of clarity, and are not intended to limit the invention to the specifically provided examples. Since similar transport mechanisms are described in U.S. provisional patent application Ser. Nos. 60/411,336 and 60/419,613, and U.S. patent application Ser. Nos. 10/274,408, 10/274,478, and 10/274,405, only a truncated discussion of email transport mechanisms is presented with reference to FIGS. 30 and 31.

As shown in an example embodiment in FIG. 30, after a setup process, a tray manager 102 accesses a login database 3050 to retrieve login names and passwords for each email account belonging to a user. The example of FIG. 30 shows the user as having post office protocol version 3 (POP3) email accounts on AOL, Yahoo, MSN, and BellSouth. Since POP3 is known in the art, further discussion of POP3 is omitted here. Upon retrieving the login names and passwords, the tray manager 102 generates a request to the email user agent 106, which includes information for instantiating one or more transport protocol objects (TPOs). Each of the TPOs is configured to provide an interface to each of the user's POP3 email accounts. Thus, in response to the request, the email user agent 106 instantiates POP3 TPOs 3030, 3032, 3034, 3036 for the user's AOL email account, Yahoo email account, MSN email account, and BellSouth email account. Other embodiments may include transport mechanisms launched or activated in other manners.

FIG. 31 is a block diagram showing one embodiment in which instantiated POP3 TPOs 3030, 3032, 3034, 3036 log into their respective email servers 3110, 3112, 3114, 3126 to retrieve email messages from the various email servers 3110, 3112, 3114, 3126. Upon being instantiated, each of the POP3 TPOs 3030, 3032, 3034, 3036 receives the login names and passwords for their respective email server 3110, 3112, 3114, 3126, thereby permitting the POP3 TPOs 3030, 3032, 3034, 3036 to log into the user's email accounts at their respective servers 3110, 3112, 3114, 3126. Upon logging into each of the email accounts at the various email servers 3110, 3112, 3114, 3126, each of the POP3 TPOs 3030, 3032, 3034, 3036 retrieves email messages from its respective server 3110, 3112, 3114, 3126. In this regard, for example, the AOL POP3 TPO 3030 retrieves email messages from the AOL server 3110; the Yahoo POP3 TPO 3032 retrieves email messages from the Yahoo server 3112, etc. The retrieved email messages are conveyed to the tray manager 102, which, in turn, conveys the email messages to the email user agent 106. Since the email messages are directed through different POP3 TPOs 3030, 3032, 3034, 3036, each email message may be sorted by the email user agent 106 according to its originating email account (e.g., AOL email account, Yahoo email account, MSN email account, BellSouth email account, etc.). Consequently, when the user chooses to reply to a received email message, the email user agent 106, in one embodiment, may direct the reply email message through the same POP3 TPO through which the email message was received. In other words, the reply to an email message uses the same email account from which the email message was received. Thus, for example, if the email user agent 106 receives an email message through the user's AOL email account, then the reply to that email message, in one embodiment, would be directed to the recipient through the user's AOL account. Similarly, if an email message is received through the user's BellSouth email account, then the reply to that email message would be directed to the recipient through the user's BellSouth email account.

Figure 32:
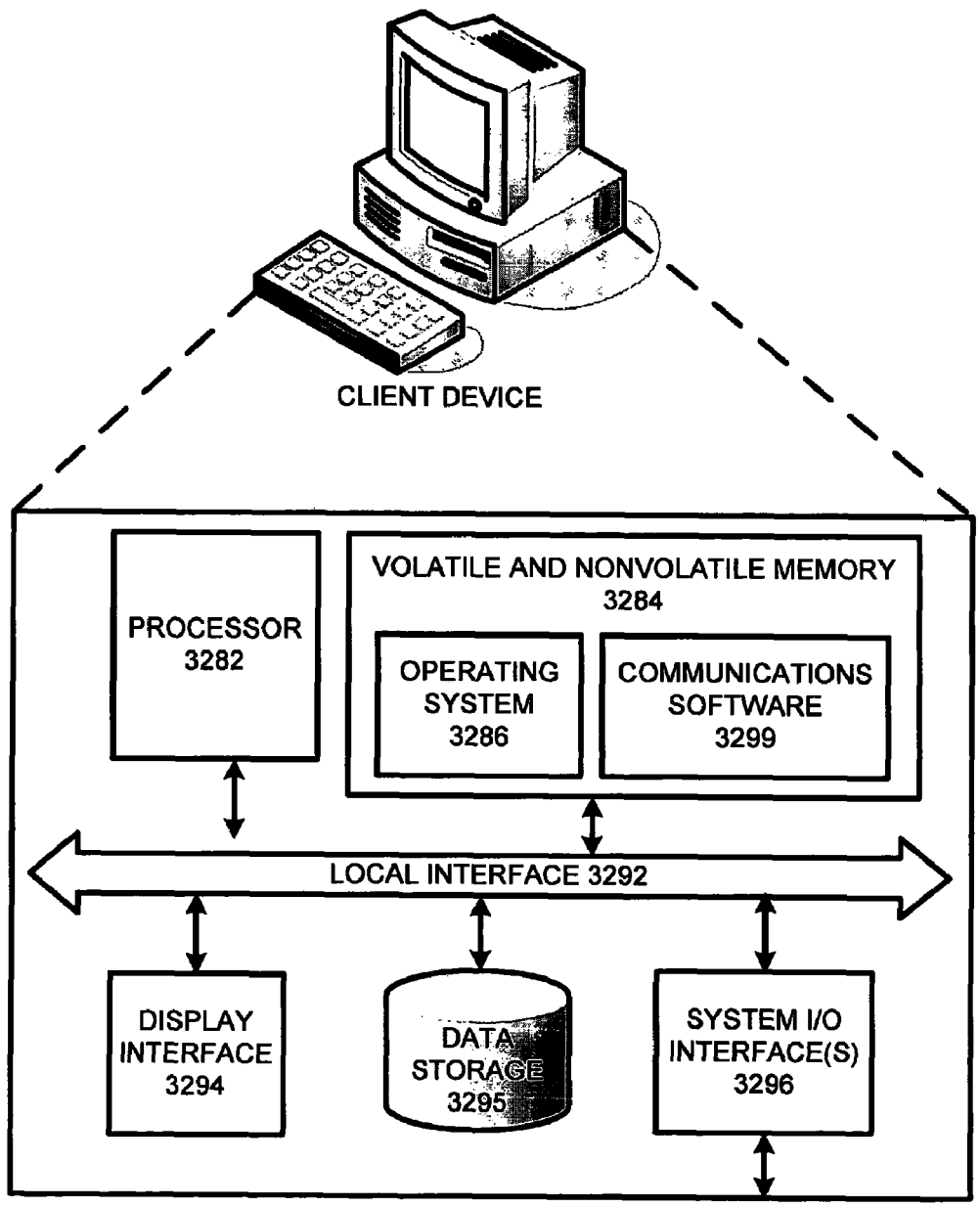
FIG. 32 is a functional diagram illustrating an exemplary embodiment of a client device that may be configured to communicate in a communications environment, such as the environment from FIG. 1.

FIG. 32 is a functional diagram illustrating an exemplary embodiment of a client device that may be configured to provide an email interface, such as the email interface from FIG. 2B, among others. Although a wire-line client device is illustrated, this discussion can be applied to any device including, but not limited to a mobile telephone, a portable telephone, a wireless personal computer, a wire-line personal computer, a PDA, a blackberry, an IPOD, and any other device configured for communications. Generally, in terms of hardware architecture, as shown in FIG. 32, the client device includes a processor 3282, volatile and nonvolatile memory 3284, a display interface 3294, data storage 3295, and one or more input and/or output (I/O) device interface(s) 3296 that are communicatively coupled via a local interface 3292. The local interface 3292 can include, for example but not limited to, one or more buses or other wired or wireless connections. The local interface 3292 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 3282 may be a hardware device for executing software, particularly software stored in volatile and nonvolatile memory 3284.

The processor 3282 can be any custom made or commercially available processor, a central processing unit (CPU), an auxiliary processor among several processors associated with the client device, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80×86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The volatile and nonvolatile memory 3284 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 3284 may incorporate electronic, magnetic, optical, and/or other types of storage media. Note that the volatile and nonvolatile memory 3284 can have a distributed architecture, where various components are situated remote from one another, but can be accessed by the processor 3282. Additionally volatile and nonvolatile memory 3284 can include communications software 3299 and an operating system 3286.

The software in volatile and nonvolatile memory 3284 may include one or more separate programs, each of which includes an ordered listing of executable instructions for implementing logical functions. In the example of FIG. 32, the software in the volatile and nonvolatile memory 3284 may include communications software 3299 (which can include instant messaging software, email software, Internet telephony software, web conferencing software, etc. in one or more separate software packages), as well as operating system 3286. A nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system 3286 can be configured to control the execution of other computer programs and provides scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 3284, so as to operate properly in connection with the Operating System 3286.

The Input/Output devices that may be coupled to system I/O Interface(s) 3296 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If the client device is a personal computer, workstation, or the like, the software in the volatile and nonvolatile memory 3284 may further include a basic input output system (BIOS) (omitted for simplicity). The BIOS is a set of software routines that initialize and test hardware at startup, start the Operating System 3286, and support the transfer of data among the hardware devices. The BIOS is stored in ROM so that the BIOS can be executed when the client device 106 is activated.

When the client device 106 is in operation, the processor 3282 is configured to execute software stored within the volatile and nonvolatile memory 3284, to communicate data to and from the volatile and nonvolatile memory 3284, and to generally control operations of the client device 106 pursuant to the software. Software in memory, in whole or in part, are read by the processor 3282, perhaps buffered within the processor 3282, and then executed.

Figure 33:
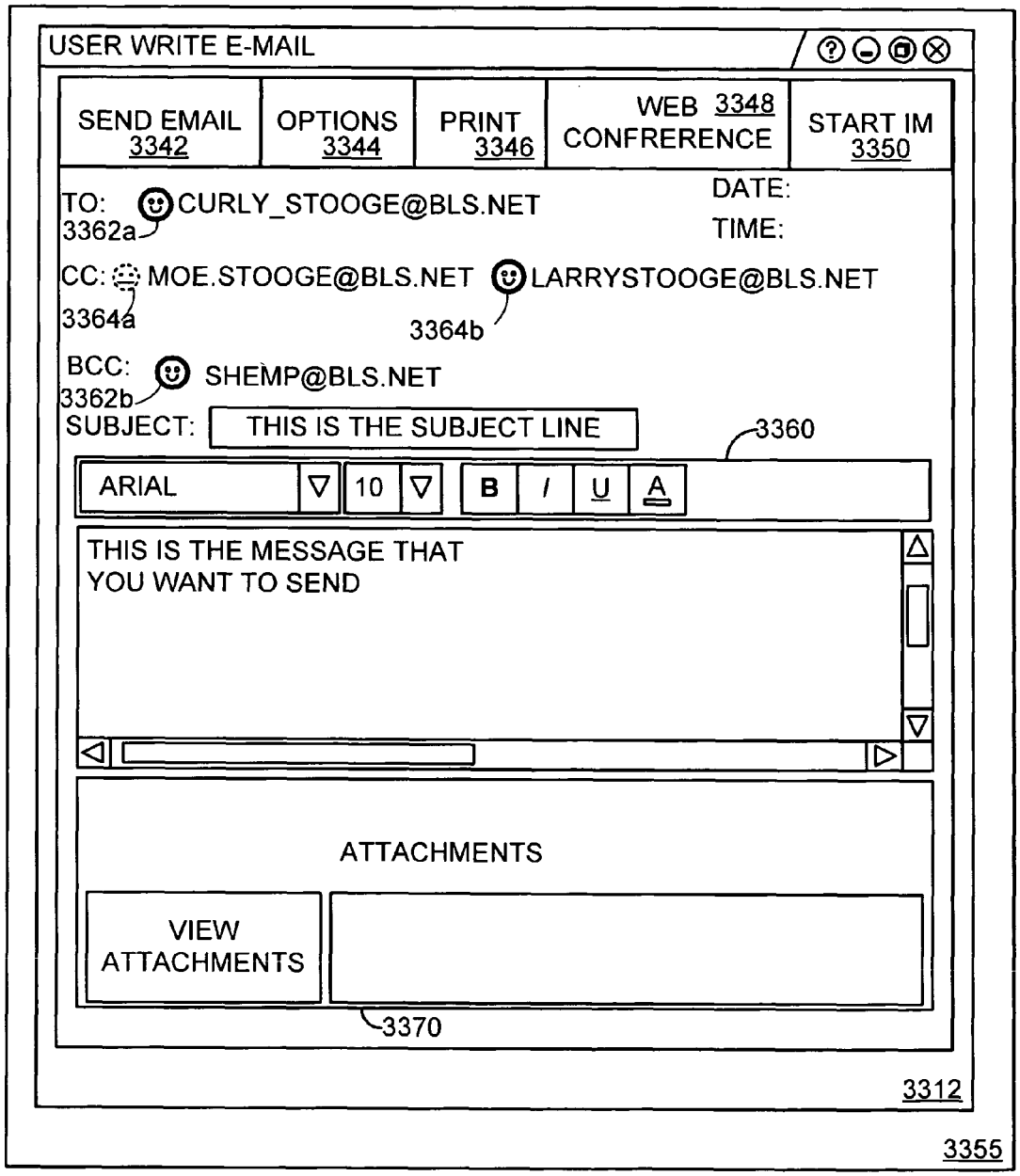
FIG. 33 is an exemplary user interface of an email compose window associated with a sender, similar to the read window from FIG. 10.

FIG. 33 is an exemplary user interface of an email compose window associated with a sender, similar to the read window from FIG. 10. As illustrated, the user write window 3312 of user interface 3355 includes a "To:" line, which currently lists curly_stooge@BLS.net and includes a presence icon 3362a associated with that recipient. More specifically, in this non-limiting example, the presence icon 3362a provides instant messaging presence data related to that recipient. Similarly, in the "CC:" line moe.stooge@BLS.net and larrystooge@BLS.net are listed. Presence icon 3364a signifies that moe.stooge@BLS.net is currently not present according to an instant messaging server associated with that address. However, larrystooge@BLS.net is currently present with an instant messaging server associated with that address. In the "BCC:" line shemp@BLS.net is present on an instant messaging server associated with that address, as indicated with presence icon 3362b.

Also included in the exemplary write window of FIG. 33 is send mail option 3342, an options option 3344, a print option 3346, a web conferencing option 3348 and a start IM option 3350. These options can be configured to perform various functions associated with the outgoing email intended for the recipients indicated above. More specifically, the send email option 3342 is an execution option that facilitates sending of the composed email. The options option 3344 can provide the sender with supplemental options related to the user interface, sending options, etc. In at least one embodiment, the options option provides the sender with the ability to delay delivery of an email until all of the intended recipients (where the term "intended recipients" can include intended recipients of the email, intended recipients of a courtesy copy of the email, and intended recipients of a blind courtesy copy of the email) are present, until none of the intended recipients are present, until certain intended recipients are present (or not present), or until a certain number of intended recipients are present or not present (or any permutation of the above).

The start IM option 3350 can provide the sender with the ability to launch an instant messaging session, as described in more detail below. Additionally, the web conference option 3348 can provide the sender with the ability to launch a web conference with one or more of the intended recipients to the email. Such a configuration can be configured to operate similarly to the start IM option 3350, however this is not a requirement. Also included is a formatting menu 3360, and an attachments menu 3370.

One should note that while the read email window from FIG. 10 illustrates displaying presence data to a recipient of an email, the nonlimiting example of FIG. 33 illustrates displaying presence data to a sender of an email. With this information, the sender can determine whether to proceed with sending the email now, proceed with sending the email at a later time, contact one or more of the intended recipients via other means (such as instant messaging, web conferencing, etc.), or refrain from sending the email. Additionally, while FIG. 33 illustrates determining presence of user accounts from a common domain (@BLS.net), this is a nonlimiting example. As one of ordinary skill in the art will understand, presence data can be provided regarding user accounts from any of a plurality of different domains.

Figure 34:
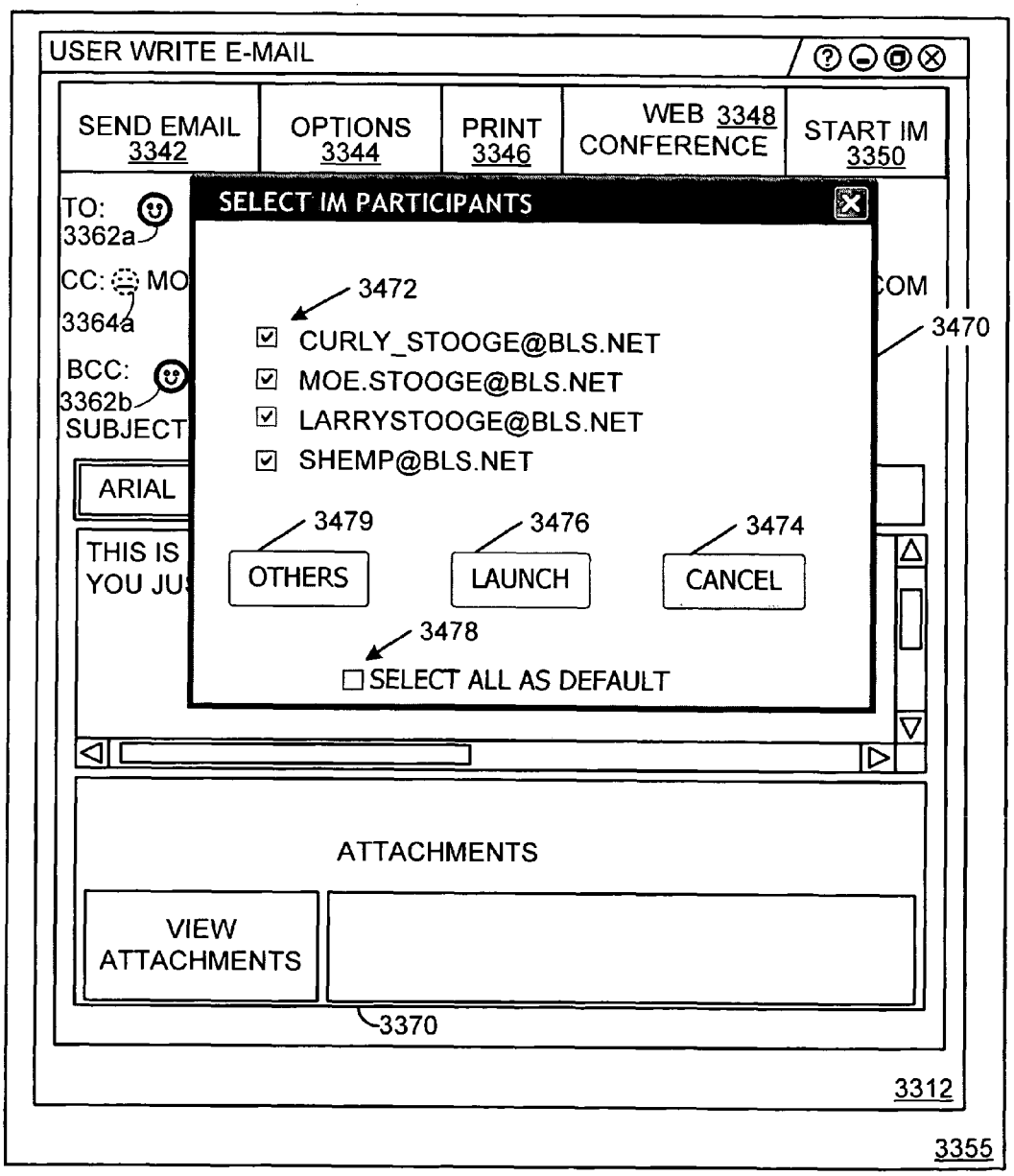
FIG. 34 is an exemplary user interface illustrating selection of the start IM option from FIG. 33.

FIG. 34 is an exemplary user interface illustrating selection of the start IM option from FIG. 33. As illustrated in this nonlimiting example, by selecting the start IM option 3350, a sender is provided with a select IM participants window 3470. The select IM participants window 3470 provides the sender with an option to select one or more of the intended recipients listed in the email from which the start IM option 3350 was selected. More specifically, the sender is provided with selection option 3472 for selecting one or more of the intended recipients in an instant messaging session. Additionally, the others option 3479 provides the sender with the option of adding users who are not currently listed as intended recipients of the email in the instant messaging session. The launch option 3476 is an execution option for launching the instant messaging session with the selected users. The cancel option 3474 provides the user with the ability to cancel this action and return to the email write window 3312 of user interface 3355.

The select all as default option 3478 provides the sender with the ability to automatically launch an instant messaging session from an email with all of intended recipients in that email. More specifically, by selecting this option, the sender will no longer be provided with the select IM participants window 3470, but an instant messaging session will be automatically launched.

One should note that while a select all as default option is illustrated in FIG. 34, this is a nonlimiting example. More specifically, one or more other options can be provided in addition to or in substitution for the select all as default option 3478. Such options can include providing the sender with a default setting to launch instant messaging sessions with those listed in the "To:" line, an option to launch instant messaging sessions with those listed in the "CC:" line, an option to launch instant messaging sessions with those listed in the "BCC:" line, an option to launch instant messaging sessions with only those currently present, or any permutation.

One should also note that if the sender has selected the select all as default option 3478 (or other option), but later desires that the select IM participants window be displayed for future instant messaging sessions launched from an email window, such as email window 3312, the user can change this option by selecting the options option 3344 and selecting a desired configuration.

Figure 35:
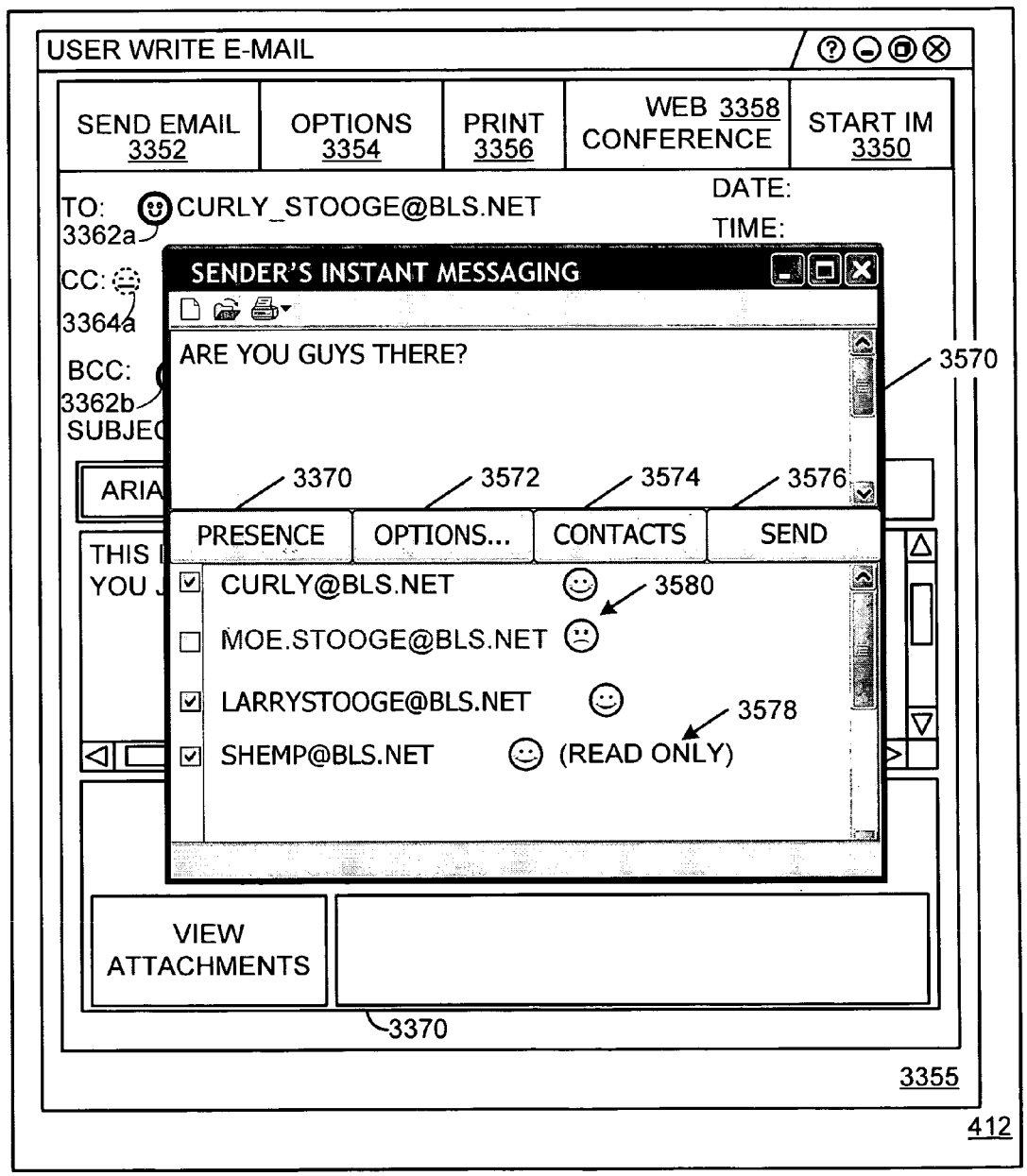
FIG. 35 is an exemplary user interface illustrating an instant messaging window that has been launched by selecting the start IM option from the user interface of FIG. 33.

FIG. 35 is an exemplary user interface illustrating an instant messaging window that has been launched by selecting the start IM option from FIG. 33. As illustrated in this nonlimiting example, an instant messaging window 3570 includes a plurality of options, such as a presence option 3370, an options option 3572, a contacts option 3574, and a send option 3576. Additionally, the instant messaging window 3570 includes a listing of the parties to the instant messaging session, as well as data associated to their respective presence. More specifically, as illustrated with presence icon 3362a (FIG. 33), curley_stooge@BLS.net is currently present and is included in the current instant messaging session. Similarly, moe.stooge@BLS.net is not present as illustrated by presence icon 3580 (which corresponds to presence icon 3364a). Additionally, while the address "moe.stooge@BLS.net" is displayed in instant messaging window 3570, Moe is not currently a participant of the instant messaging session. However, the address "moe.stooge@BLS.net" is displayed in the event this user desires to join the instant messaging session.

Additionally, as shemp@BLS.net was included in the original email as a "BCC" recipient, the other intended recipients are currently not aware of Shemp's inclusion in the instant messaging session. As such, in at least one embodiment shemp@BLS.net has read-only capabilities in the instant messaging session, and presence data is communicated only to the sender of the original email.

One should note that, while at least one embodiment provides read-only capabilities and limited presence data for "BCC" recipients, this is a nonlimiting example. As one of ordinary skill in the art will understand, other embodiments can provide various options to "BCC" recipients, as well as other recipients. More specifically, in at least one nonlimiting example, the sender of the original email can be provided with an option to change a "BCC" recipient's read-only capabilities and/or allow other recipients to view the "BCC" recipient's presence data. Other embodiments can provide the ability to change these capabilities to the "BCC" recipient.

Figure 36:
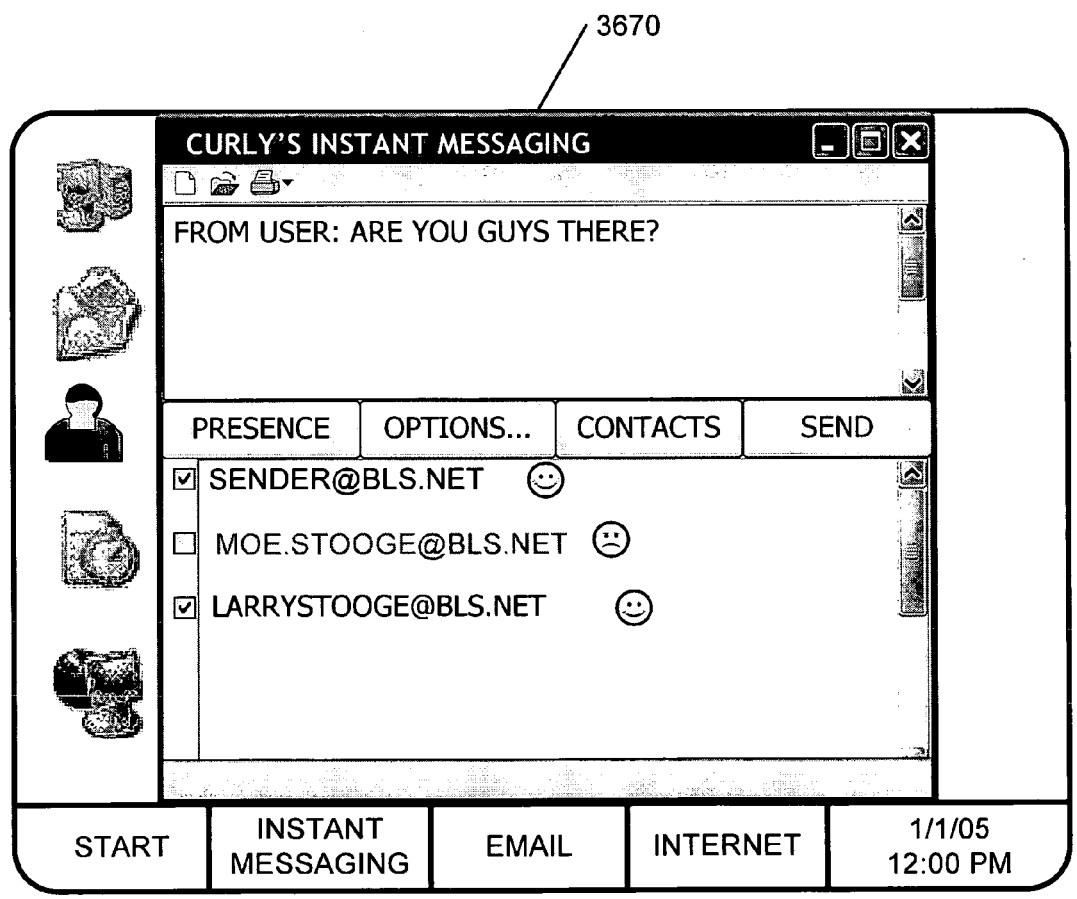
FIG. 36 is an exemplary instant messaging user interface for an intended recipient of an email received from a sender using the user interface from FIG. 33.

FIG. 36 is an exemplary instant messaging user interface for an intended recipient of an email received from a sender using the user interface from FIG. 33. In this nonlimiting example, curly_stooge@bls.net has been invited to participate in an instant messaging session initiated by sender@BLS.net. As illustrated, instant messaging window 3670 includes presence data related to sender@BLS.net, moe.stooge@BLS.net, and larrystooge@BLS.net. As illustrated above, moe.stooge@bls.net is currently not present, but is displayed as being invited to the instant messaging session. Additionally, as discussed above, because shemp@BLS.net is included as a "BCC" intended recipient, Shemp's presence data is not displayed to Curly, since Curly is also an intended recipient of the email.

Figure 37:
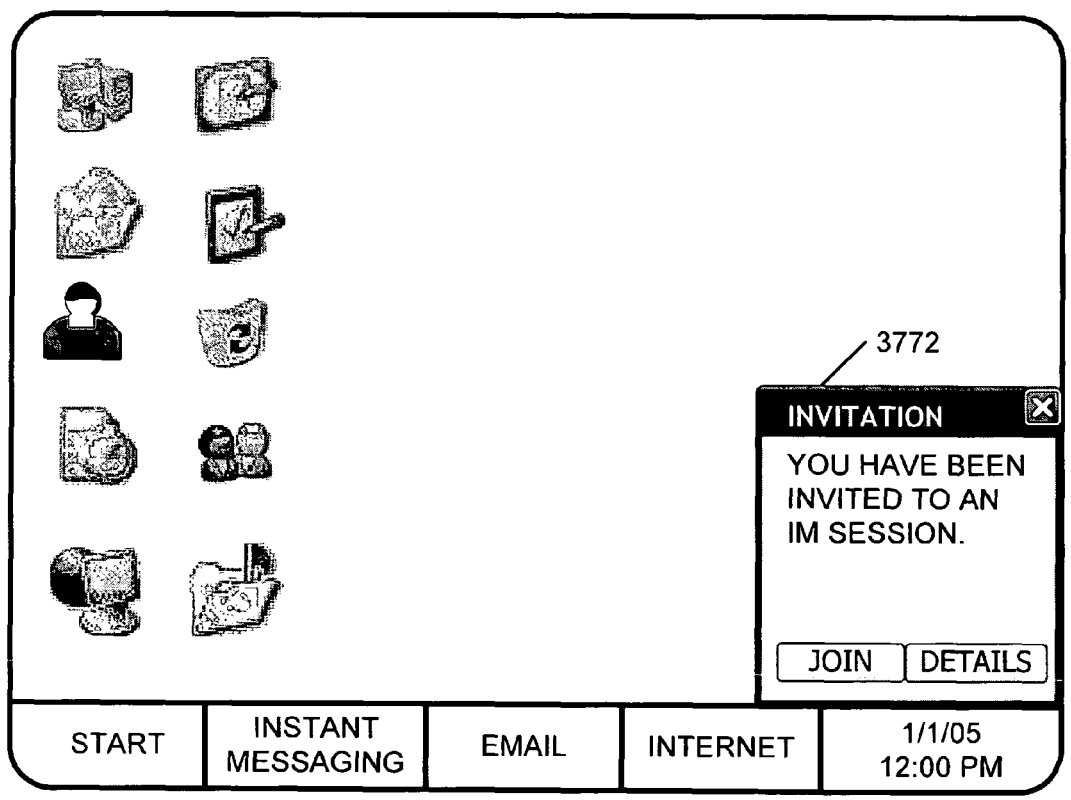
FIG. 37 is an exemplary user interface for an intended recipient of an email, who has been invited to an instant messaging session, such as an instant messaging session shown in the instant messaging window from FIG. 35.

FIG. 37 is an exemplary user interface for an intended recipient of an email, who has been invited to an instant messaging session, such as an instant messaging session shown in the instant messaging window from FIG. 35. As illustrated in this nonlimiting example, a popup window 3772 or other indicator is displayed to moe.stooge@BLS.net. As discussed above, Moe has been previously "not present" in association with an instant messaging server. Upon logging in to an instant messaging server, a message can be sent to Moe to indicate that Moe has been invited to an instant messaging session. Such indication can take the form of invitation window 3772, which includes a join option, as well as a details option. The join option can automatically connect Moe with the instant messaging session described above. By selecting the details option, various data related to the instant messaging session can be displayed. More specifically, in at least one nonlimiting example, participants, duration, as well as other information can be displayed. Moe can decline the invitation by selecting the close option at the top of invitation window 3772.

Figure 38:
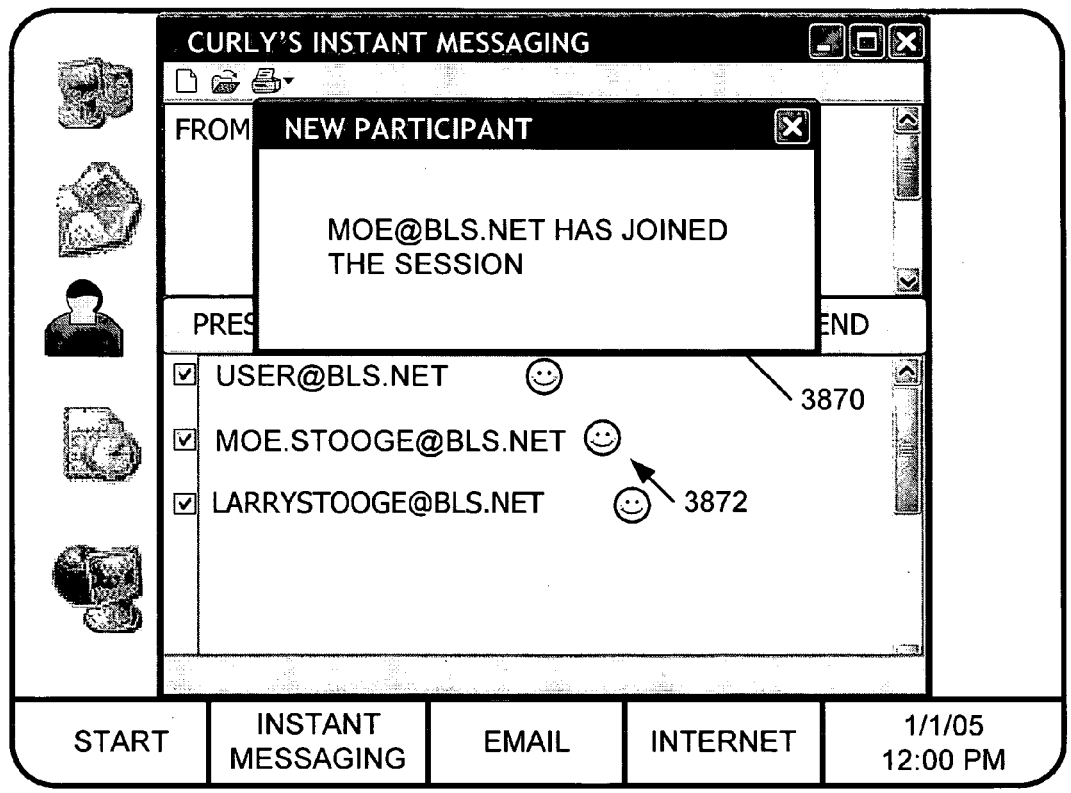
FIG. 38 is an exemplary instant messaging user interface illustrating that a user has joined the instant messaging session as shown in the instant messaging window from FIG. 35.

FIG. 38 is an exemplary instant messaging user interface illustrating that a user has joined the instant messaging session as shown in the instant messaging window from FIG. 35. More specifically, in this nonlimiting example, moe.stooge@BLS.net has selected the join option from FIG. 37 to join the current instant messaging session. Upon joining the instant messaging session, other participants of the instant messaging session can be provided with an indication that this user has joined. Such an indication can take the form of a new participant window 3870, as illustrated in FIG. 38. Additionally, other embodiments can provide that in addition to or in substitution for new participant window 3870, the participants are provided with another indication to convey this data.

One should also note that upon establishing contact with an instant messaging server, the presence icon 3872 associated with moe.stooge@BLS.net has changed to indicate that moe.stooge@BLS.net is currently present. This presence change can occur regardless of whether moe.stooge@BLS.net actually decides to join the instant messaging session. Additionally, depending on the particular configuration, upon establishing contact with an instant messaging server, moe.stooge@BLS.net can determine whether to display accurate presence information.

Figure 39:
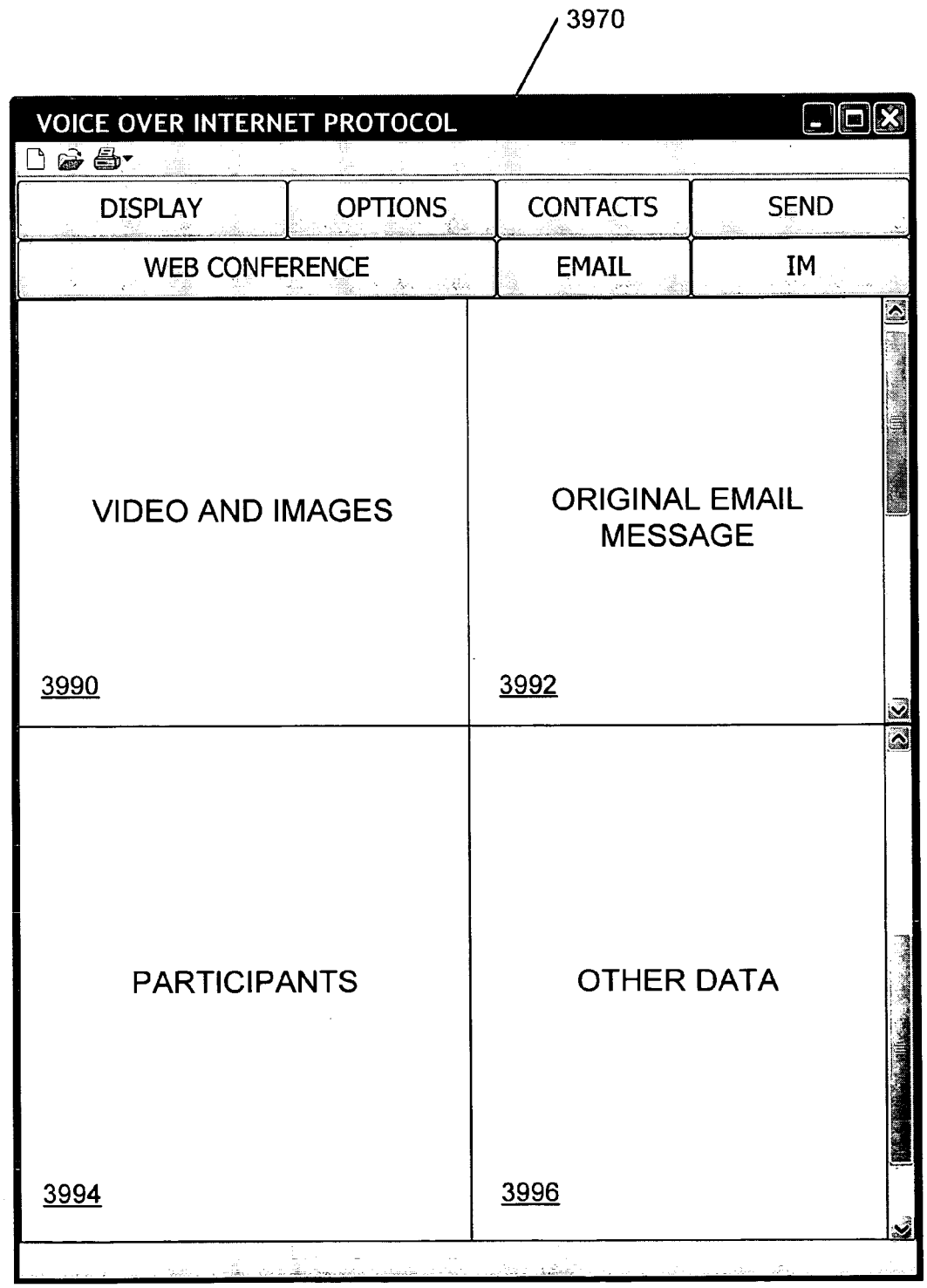
FIG. 39 is an exemplary user interface associated with logic for facilitating a web conference from an email, in response to selecting a web conferencing option from the user interface of FIG. 33.

FIG. 39 is an exemplary user interface associated with logic for facilitating a web conference from an email, in response to selecting a web conferencing option from the user interface of FIG. 33. As indicated above, an email sender and/or recipient can determine presence data associated with at least one party to the email. Additionally, the sender and/or recipient can launch an instant messaging and/or a web conference with at least one of the parties to the email. Upon launching a web conference, the following user interface can be displayed. More specifically, the nonlimiting example of FIG. 39 includes a web conferencing user interface 3970 that includes a plurality of options. The options displayed include display option, options option, contacts option, send option, a web conference option, and email option and an IM option. Additionally, the web conferencing user interface of FIG. 39 includes a video and images display window 3990, an original email message display window 3992, a participants display window 3994, and an other data display window 3996.

Figure 40:
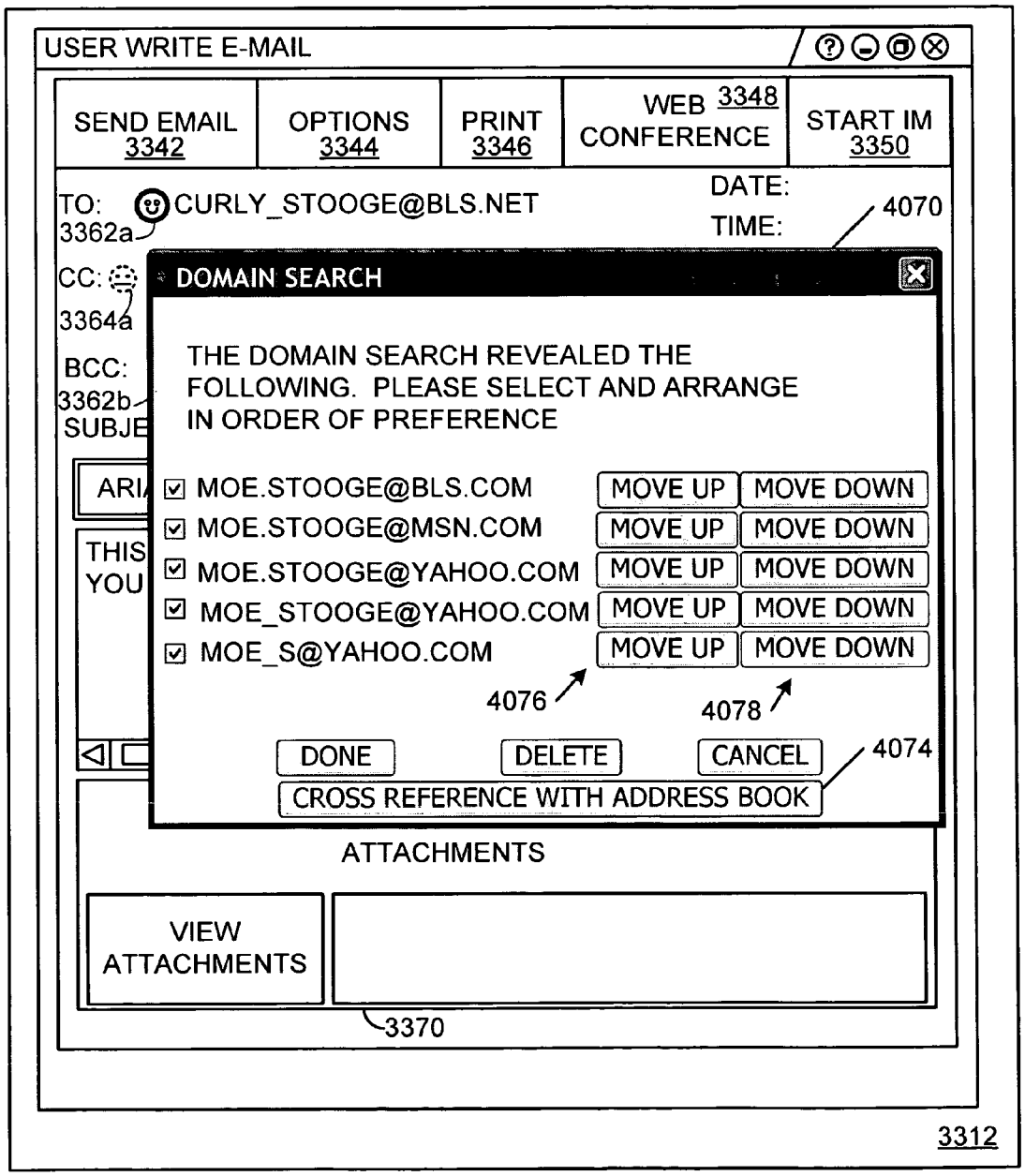
FIG. 40 is an exemplary user interface for displaying presence data for a secondary domain in an email interface, such as the interface FIG. 33.

FIG. 40 is an exemplary user interface for displaying presence data for a secondary domain in an email interface, such as the interface FIG. 33. More specifically, in this nonlimiting example, the sender indicates that the recipients of this email are curly_stooge@BLS.net, moe.stooge@BLS.net, larrystooge@BLS.net, and Shemp@BLS.net, as similarly illustrated in FIG. 33. Also as illustrated in FIG. 33, moe.stooge@BLS.net is currently not present with an instant messaging server associated with that address. In the nonlimiting example of FIG. 40, upon determining that moe.stooge@BLS.net is currently not present, logic associated with the email user interface 3312 is configured to strip the domain from the address and search at least one other domain with the same (or similar) prefix. More specifically, the logic can be configured to remove the "@BLS.net" domain suffix from the address. The logic can then search various other domains (e.g., @hotmail.com, @msn.com, @yahoo.com, @comcast.net, @insightbb.com, @aol.com, etc) with the prefix from this address. By applying the prefix "moe.stooge" to various domains, a domain search window 4070 can be displayed with the address(es) revealed in the search. Additionally, variations to the prefix can also be included in the search (e.g., moe_stooge, moestooge, moe_s, etc.) In this nonlimiting example, a plurality of addresses are found, with options 4076 and 4078, which provide the sender with the ability to arrange a desired order of addresses for determining presence. More specifically, in the current order, the presence of moe.stooge@BLS.net is first determined. If that address is not present, the logic will determine the presence of moe.stooge@msn.com, and so on. The sender can delete an address if so desired. Additionally, to further narrow the results displayed in domain search window 4070, the sender can select the cross-reference with address book option 4074. By selecting this option, the logic can determine information related to Moe Stooge in an address book maintained by the sender. Such information can contain address, telephone number, birthday, likes, dislikes, etc. By using this information, the logic can more accurately determine if one or more of the addresses displayed in domain search window 4070 is associated with the desired recipient. Once the sender selects the desired address(es) in domain search window 4070, the address can be added to the associated recipient line, and in some embodiments, updated in the sender's address book.

One should note that while, in some embodiments, domain search window may be displayed, other embodiments, may simply include the received (and most likely accurate) address in the intended recipient line. As a sender may not wish to manually configure each recipient who is currently not present, such a configuration may be desirable.

Figure 41:
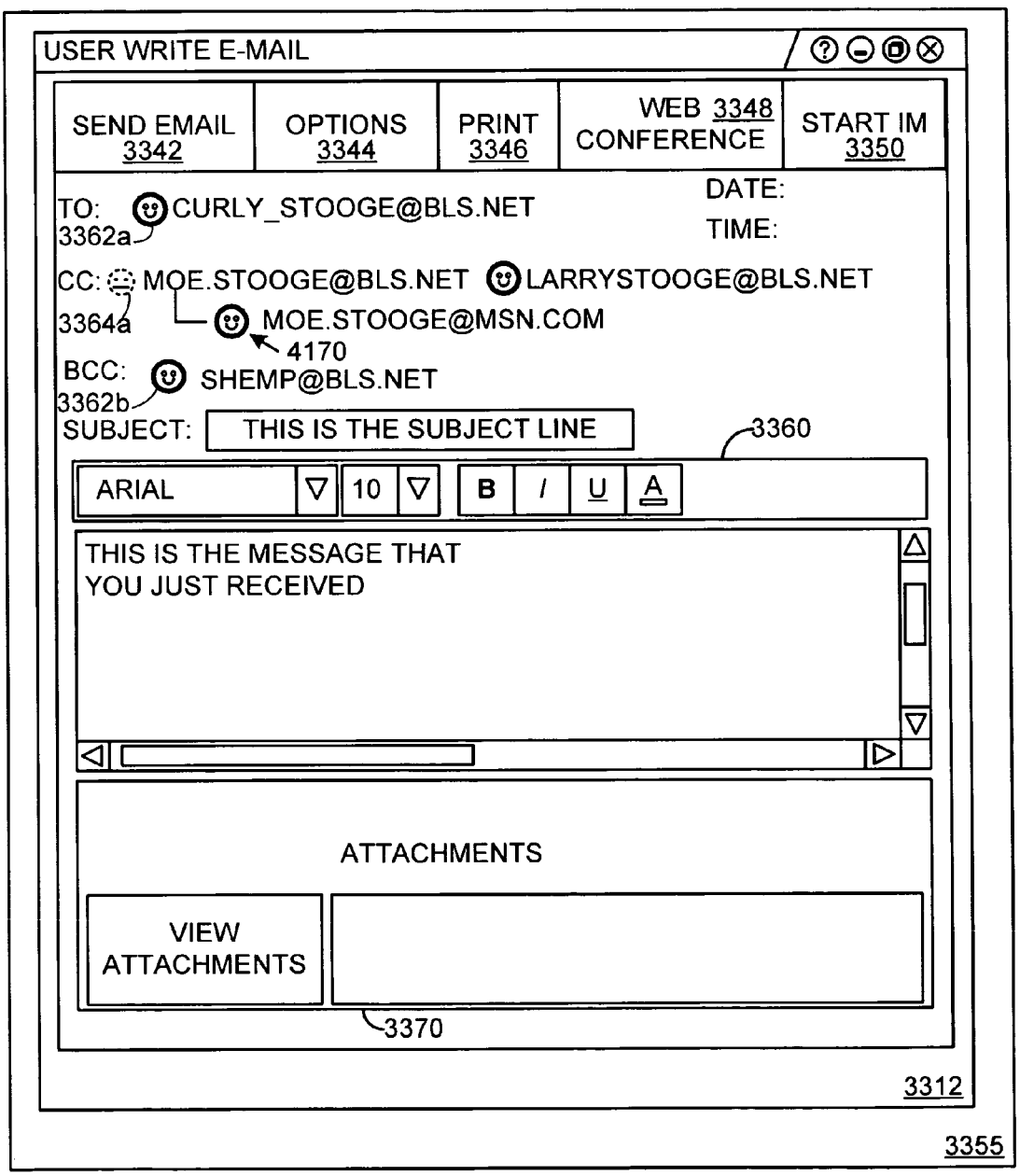
FIG. 41 is an exemplary user interface illustrating the display of presence information related to a second account, as revealed by the domain search window shown in FIG. 40.

FIG. 41 is an exemplary user interface illustrating the display of presence information related to a second account, as revealed by the domain search window shown in FIG. 40. As illustrated in this nonlimiting example, moe.stooge@msn.com has been selected as a secondary address for determining presence of that intended recipient. More specifically, in response to receiving the domain search window 4070, the sender can select one or more of the addresses displayed (other embodiments can provide that logic associated with the email client perform this selection). Both the original address (and associated presence data 3364*a*) and the selected address (and associated presence data 4170) can be displayed. Additionally, upon selection of the start IM option 3350, the present recipients of the email can be included in an instant messaging session, as described above. Further, depending on the particular configuration, upon selecting the send email option 3342, an email message can be sent to all of the intended recipients' addresses, including both the original address (moe.stooge@BLS.net) and the selected address (moe.stooge@msn.com). Other embodiments can provide that the email be sent to only one address associated with an intended recipient.

One should note that while the nonlimiting example of FIG. 41 illustrates an embodiment of a sender's email interface, similar functionality can be provided to a recipient of an email. More specifically, similar to FIG. 10, a recipient can be provided with presence data related to an email sender and other email recipients. If a determination is made that one or more of the parties to the email are not currently present, the recipient's email logic (or instant messaging logic, other logic, etc.) can be configured to determine whether there is an alternate address associated with that party. User selection of a desired address can be provided to the recipient, as illustrated for the sender in FIG. 38. This data can be provided in the recipient's email interface, thereby providing an option to launch an instant messaging session from the email and including one or more of the parties to the email.

Figure 42:
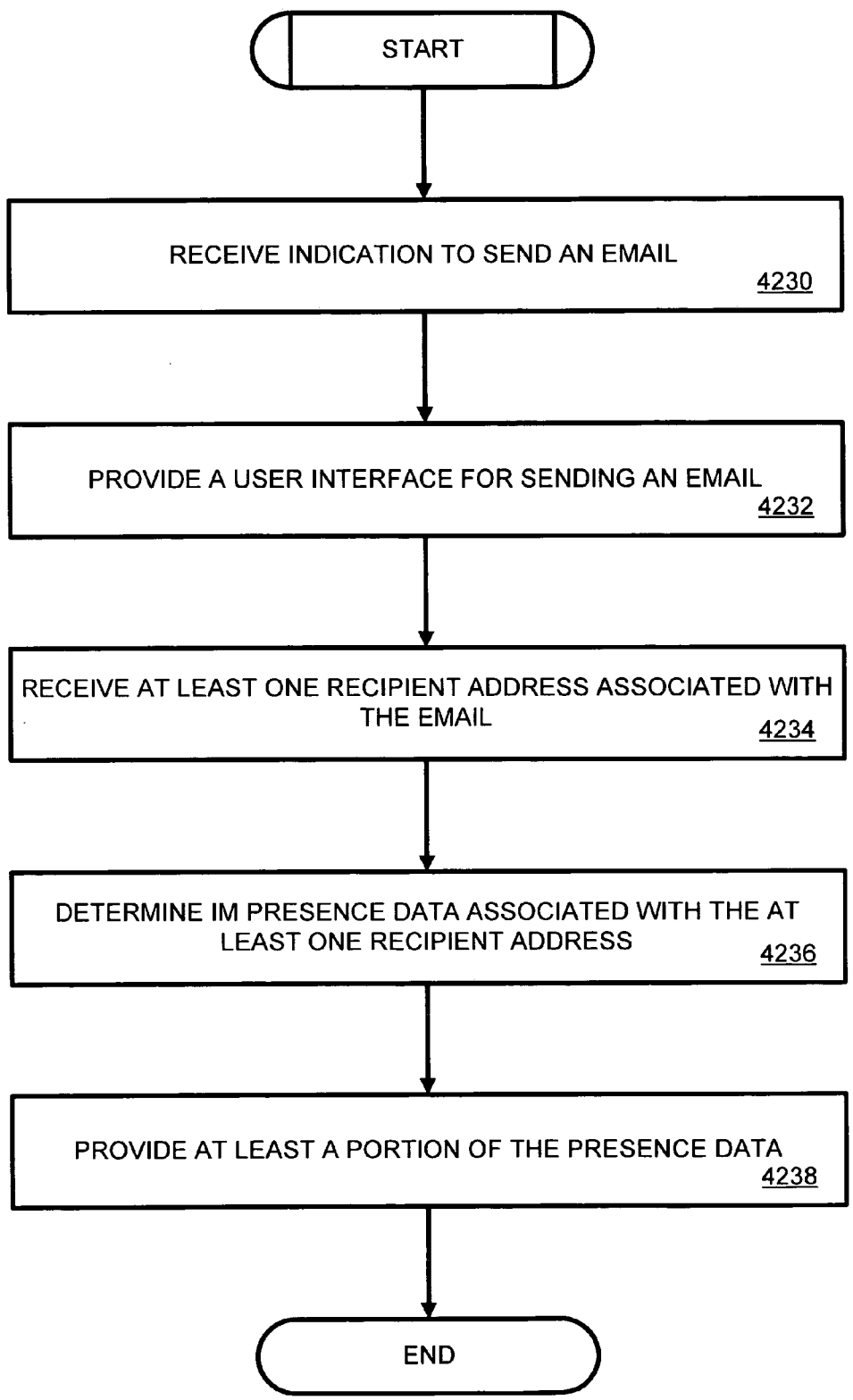
FIG. 42 is a flowchart illustrating exemplary steps that can be taken by a sender's client device for providing presence data with the sender's email interface, such as the interface from FIG. 33.

FIG. 42 is a flowchart illustrating exemplary steps that can be taken by a sender's client device for providing presence data with the sender's email interface, such as the interface from FIG. 33. More specifically, the first step in this nonlimiting example is to receive an indication to send an email (block 4230). This step can include receiving an indication to open an email application or, if an email application is currently open, receiving an indication from the sender to compose an outgoing email. Upon receiving this indication, the client device can provide a user interface for sending an email (block 4232). The user interface can take a form similar to the configuration from FIGS. 10, 33, and/or 39, however this is not a requirement. The client device can then receive at least one recipient address associated with the email (block 4234). As one of ordinary skill in the art will understand, the sender can manually input the at least one address and/or select at least one address from an address book. Upon receiving an address, the client device can determine instant messaging (IM) presence data associated with at least one recipient address (block 4236). The client device can then provide at least a portion of the presence data to the sender via the email user interface (block 4238).

Figure 43:
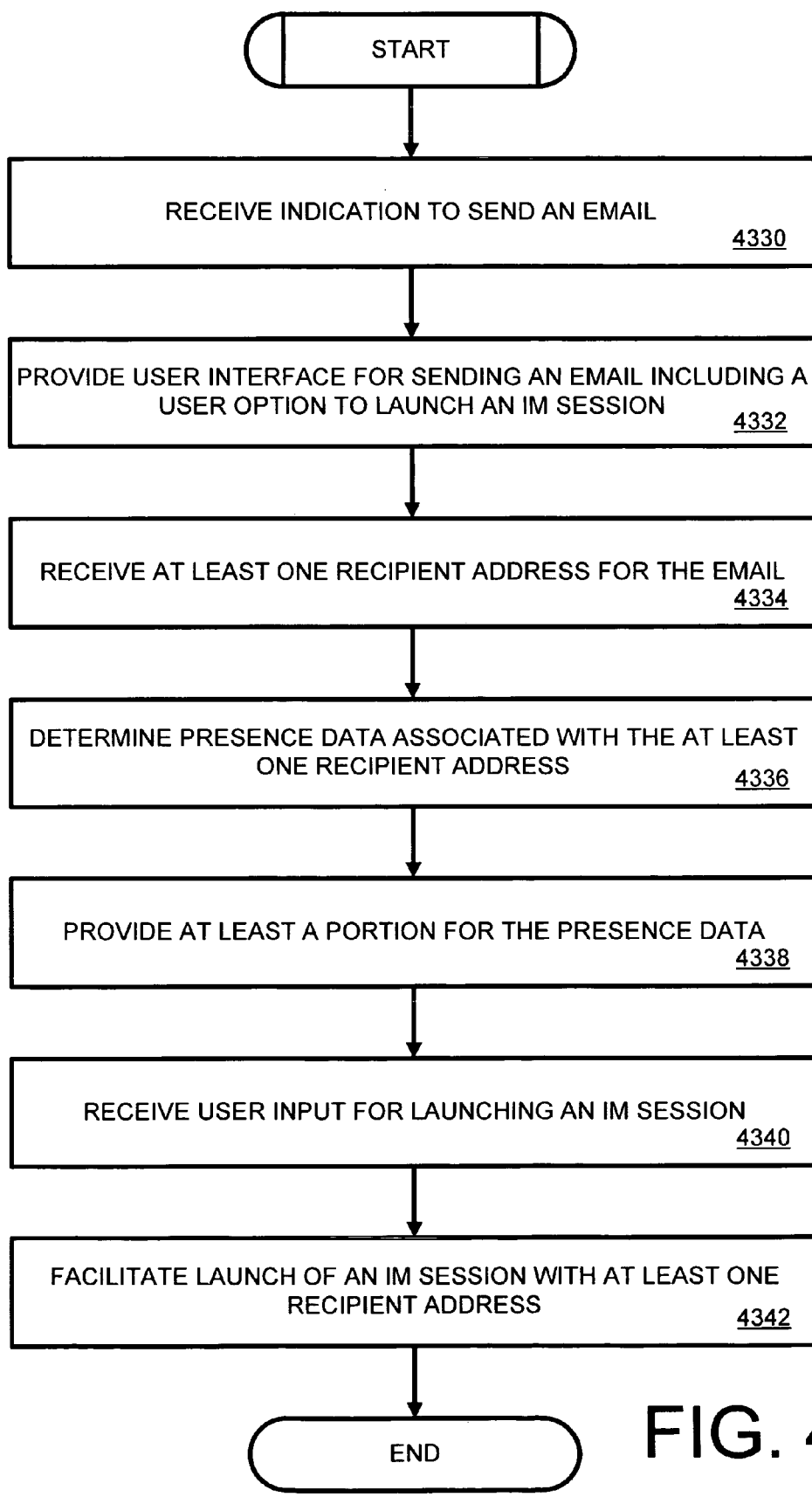
FIG. 43 is a flowchart illustrating exemplary steps that can be taken by a sender's client device in facilitating the launch of an instant messaging session from an email interface, such as displayed in FIG. 33.

FIG. 43 is a flowchart illustrating exemplary steps that can be taken by a sender's client device in facilitating the launch of an instant messaging session from an email interface, such as displayed in FIG. 33. More specifically, the first step in this nonlimiting example is to receive an indication to send an email (block 4330). Upon receiving an email indication, the client device can provide a user interface for sending an email including a user option to launch an instant messaging session from the user interface (block 4332). The client device can then receive at least one recipient address for the email (block 4334) and determine presence data associated with the at least one recipient address (block 4336). The client device can then provide at least a portion of the presence data to the user (block 4338). This data can be provided via the email user interface, as discussed above, however other methods of providing this information are also included within this disclosure. The client device can then receive user input for launching an instant messaging session from the email interface (block 4340). The client device can then facilitate the launch of an instant messaging session with at least one recipient address (4342).

The launch of an instant messaging session can include email logic communicating with instant messaging logic to initiate contact with an instant messaging server to begin an instant messaging session with one or more of the intended recipients. Other configurations can provide that the email logic includes instant messaging capabilities (and/or web conferencing capabilities), and initiating an instant messaging session (and/or web conference) can begin from the email client directly. While various other techniques can be utilized in addition to or in substitution for those described above, these techniques are considered as part of this disclosure.

One should also note that, as discussed above, while the description with regard to FIG. 43 is directed to providing an email sender with various options, this is a nonlimiting example. More specifically, similar functionality can be provided to an email recipient, depending on the particular configuration. Additionally, other configurations can provide similar functionality to both senders and recipients of email messages.

Figure 44:
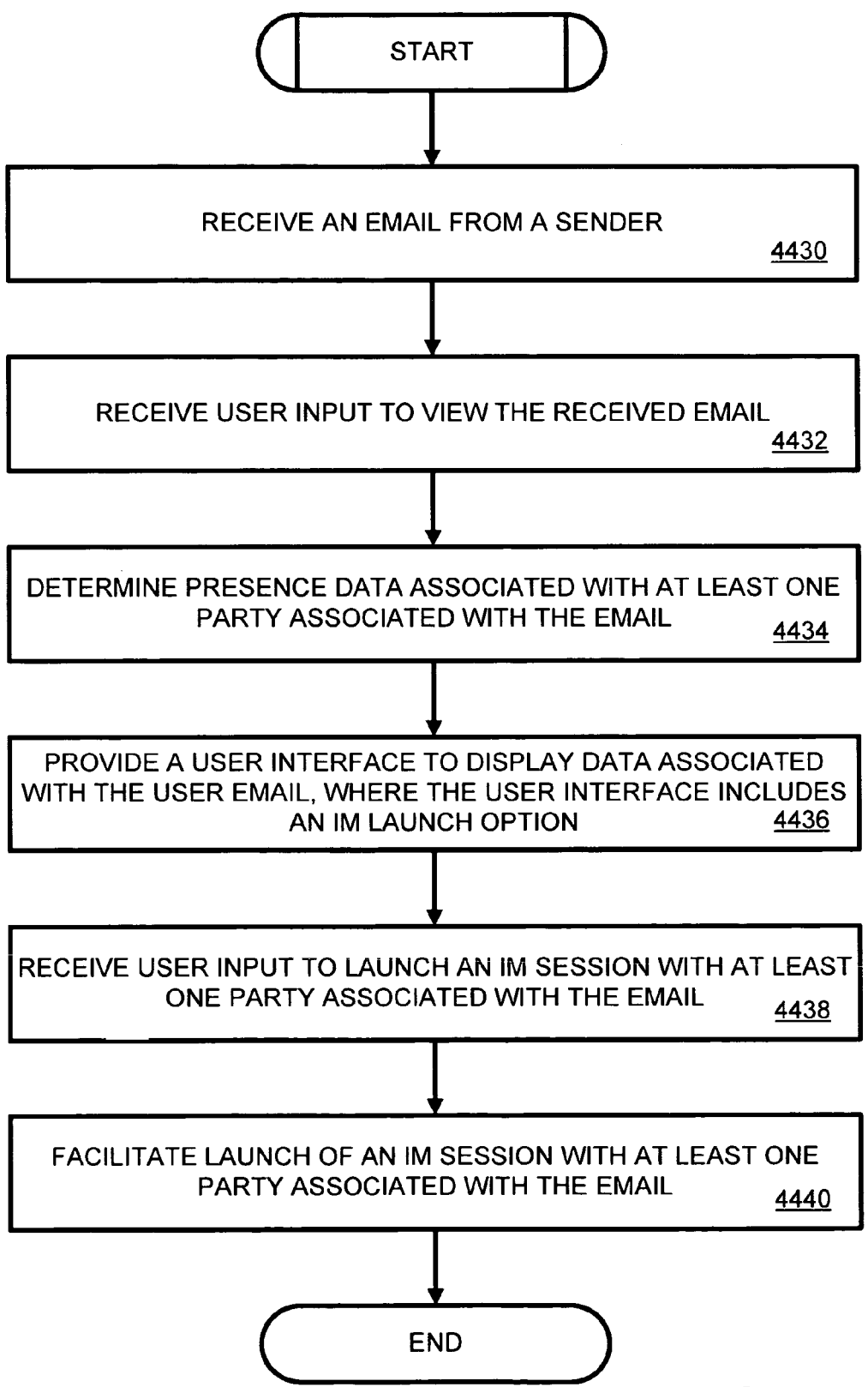
FIG. 44 is a flowchart illustrating exemplary steps that can be taken by an email recipient's client device, similar to the flowchart from FIG. 43.

FIG. 44 is a flowchart illustrating exemplary steps that can be taken by an email recipient's client device, similar to the flowchart from FIG. 43. More specifically, the first step in this nonlimiting example is to receive an email from a sender (block 4430). The recipient's client device can then receive user input (from the recipient) to view the received email (block 4432). The client device can then determine presence data associated with at least one party to the email (block 4434). The at least one party can include one or more of the other recipients, and/or the sender of the message. Next, the client device can provide a user interface to display at least a portion of the data associated with the user email, where the user interface includes an instant messaging launch option (block 4436). The client device can then receive user input to launch an instant messaging session with at least one party associated with the email (block 4438). The client device can then facilitate launch of an instant messaging session with at least one party associated with the email (block 4440).

Figure 45:
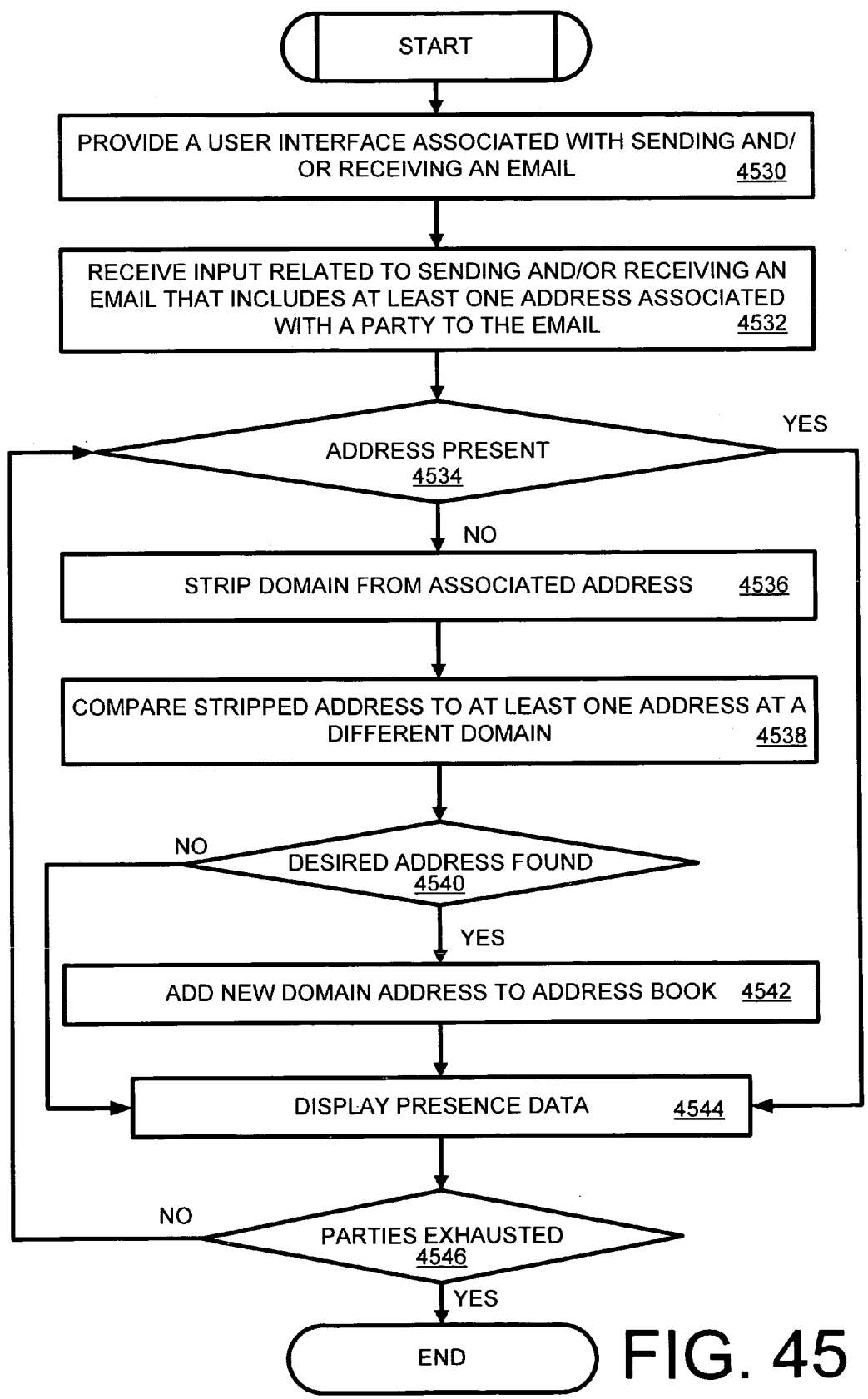
FIG. 45 is a flowchart illustrating exemplary steps that can be taken by a client device in determining presence data associated with at least one party to an email, similar to the flowchart from FIG. 44.

FIG. 45 is a flowchart illustrating exemplary steps that can be taken by a client device in determining presence data associated with at least one party to an email, similar to the flowchart from FIG. 44. More specifically, the first step in this nonlimiting example is to provide a user interface associated with sending and/or receiving an email (block 4530). Depending on the particular embodiment, the exemplary steps of FIG. 45 can apply to a client device associated with an email sender and/or recipient. The next step of FIG. 45 is to receive an input related to sending and/or receiving an email that includes at least one address associated with a party to the email (block 4532). Once the address is received, the client device facilitates a determination of whether a received address is currently present (block 4534). If the address is present, the client device can simply display the presence data (block 4544). If, however, the address is not present, the client device can strip the domain from the associated address (block 4536) and compare the stripped address to at least one address at a different domain (block 4538). As a nonlimiting example, if the received address is moe.stooge@BLS.net and Moe is currently not present at this address, the client device can remove (or strip) the "@BLS.net" from the address and search for "moe.stooge" at other domains (e.g., @hotmail.com, @comcast.net, @yahoo.com, etc.). Additionally, depending on the received results from this search, variations of the stripped address can also be compared to the original domain and the other domains. As a nonlimiting example, "moe_stooge" can be searched at various domains, as well as other variations of this stripped address, depending on the particular configuration.

Next, the client device can determine whether a desired address is found (block 4540). If a desired address is found, the client device can add the new address to the address book (block 4542) and display the received presence data (block 4544). If a desired address is not found, presence data is displayed indicating that the party is currently not present (block 4544). The client device then determines whether all of the parties to the email have been exhausted (whether presence data related to all parties has been determined) (block 4546). If not, the flowchart returns to block 4534 to determine whether the next address is present. If all the parties to the email are exhausted, the flowchart can end.

One should note that, while portions of the above description relate to providing functionality to an email sender, this is a nonlimiting example. Further embodiments provide that similar functionality is provided to an email sender, an email recipient, or both. Similarly, while the description with respect to the flowcharts of FIGS. 42-45 relate to steps performed by a client device, as one of ordinary skill in the art will understand, one or more of these steps can be performed by logic associated with a network element, such as an email server, and instant messaging server, a database server, etc. (or any permutation thereof), as discussed with respect to FIGS. 1-7.

The address book object 108, the email user agent 106, the IM user agent 104, the tray manager 102, and other objects instantiated by these components may be implemented in hardware, software, firmware, or a combination thereof. In the preferred embodiment(s), the address book object 108, the email user agent 106, the IM user agent 104, the tray manager 102, and other objects instantiated by these components is implemented in software or firmware that is stored in a memory and that is executed by a suitable instruction execution system. If implemented in hardware, as in an alternative embodiment, the address book object 108, the email user agent 106, the IM user agent 104, the tray manager 102, and other objects instantiated by these components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present disclosure.

The address book object 108, the email user agent 106, the IM user agent 104, the tray manager 102, and other objects instantiated by these components may be implemented as a computer program, which comprises an ordered listing of executable instructions for implementing logical functions. As such the address book object 108, the email user agent 106, the IM user agent 104, the tray manager 102, the address book database 110, and other objects instantiated by these components can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the invention as described may be made. For example, while the disclosed embodiments show the various modules (e.g., address book object 108, the email user agent 106, the IM user agent 104, the tray manager 102, other objects instantiated by these components, etc.) as being in a distributed network, it will be clear to one of ordinary skill in the art that the various modules may be located on a server or a client without adverse effect to the functioning of the various components. All such changes, modifications, and alterations should therefore be seen as within the scope of the disclosure.

What is claimed is:

1. A system comprising:
a memory component that stores at least the following:
first logic for providing an email compose window configured to display, to a sender, an email message being composed, the email message including a plurality of intended email recipients, wherein the email window is also configured to display information about the plurality of intended email recipients, the email compose window further configured to provide a plurality of instant messaging presence icons in the email compose window, the instant messaging presence icon configured to provide an indication regarding whether each of the intended email recipients is currently present and active on an instant messaging account;
second logic for providing an instant messaging option in the email compose window, the instant messaging option configured to automatically begin a multi-party instant messaging session with the sender and at least two of the plurality of intended email recipients that have information displayed in the email compose window,
wherein the at least two of the plurality of intended email recipients that have information displayed in the email compose window are indicated as being currently present and active based on the instant messaging presence icon of the respective intended email recipients, and wherein the instant messaging option in the email compose window comprises a default option to launch the multi-party instant messaging session with only those email recipients currently present and active on the instant messaging account;
third logic for providing a first delay delivery option via the email compose window to delay delivery of the email until each of selected intended email recipients is present and active on the instant messaging account; and
fourth logic for providing a second delay delivery option via the email compose window to delay delivery of the email until each of selected intended email recipients is not present and not active on the instant messaging account.

2. The system of claim 1, the memory component further storing third logic configured to provide an instant messaging participant window configured to determine at least one participant of the instant messaging session.

3. The system of claim 1, wherein the plurality of intended recipients includes at least one intended recipient of a blind courtesy copy of the email and wherein the intended recipient of the blind courtesy copy is provided read-only instant messaging functionality.

4. The system of claim 1, the memory component further storing third logic configured to provide a web conferencing option configured to begin a web conference with at least two of the plurality of intended recipients that have information displayed in the email compose window.

5. The method of claim 1, wherein the default option comprises a default setting to launch the multi-party communications session with only those email recipients currently present and active on the instant messaging account and listed in the To address field of the email message being composed.

6. The method of claim 1, wherein the default option comprises a default setting to launch the multi-party communications session with only those email recipients currently present and active on the instant messaging account and listed in the Courtesy Copy address field of the email message being composed.

7. A method comprising:
a message from a sender in a first communications protocol in a message write window, the message including a plurality of intended email recipients, the message write window being configured to display information about the at least one of the plurality of intended email recipients, the message write window further configured to provide an instant messaging presence icon in the message write window, the instant messaging presence icon configured to provide an indication regarding whether each of the intended email recipients is currently present and active on an instant messaging account;
providing a second communication protocol option configured to automatically begin a multi-party communications session with the sender and at least two intended email recipients from the message write window in a second protocol,
wherein the at least two intended email recipients that have information displayed in the message write window are indicated as being currently present and active based on the instant messaging presence icon of the respective intended email recipients, and wherein the second communication protocol option in the message write window comprises a default option to launch the multi-party communications session with only those email recipients currently present and active on the instant messaging account;
providing a first delay delivery option via the message write window to delay delivery of the email until each of selected intended email recipients is present and active on the instant messaging account; and
providing a second delay delivery option via the message write window to delay delivery of the email until each of selected intended email recipients is not present and not active on the instant messaging account.

8. The method of claim 7, wherein the first communications protocol includes an email protocol.

9. The method of claim 7, wherein the second communications protocol includes at least one of the following: an instant messaging protocol and a web conferencing protocol.

10. The method of claim 7, wherein the second communication protocol option is provided to a message sender.

11. The method of claim 7, further comprising determining current instant messaging availability related to at least one of the plurality of intended recipients.

12. The method of claim 7, further comprising determining at least one participant of the instant messaging session.

13. The method of claim 7, wherein the plurality of intended recipients includes at least one intended recipient of a blind courtesy copy of the message and wherein the at least one intended recipient of the blind courtesy copy is provided read-only functionality in the communications session.

14. The method of claim 12, wherein determining at least one participant of the communications session includes setting a current participant configuration as a default configuration.

15. A non-transitory computer readable storage medium comprising instructions that, when executed on a computer, cause the computer to:
display, in an email compose window, an email message from a sender, the email message including a plurality of intended email recipients, the email compose window configured to provide an instant messaging presence icon in the email compose window, the instant messaging presence icon configured to provide an indication regarding whether each of the intended email recipients is currently present and active on an instant messaging account;
display information related to the plurality of intended email recipients; and provide a communications session option configured to automatically begin a multiparty communications session with the sender and at least two of the plurality of intended email recipients with information displayed in the email compose window,
wherein the at least two intended email recipients that have information displayed in the email compose window are indicated as being currently present and active based on the instant messaging presence icon of the respective intended email recipients, and
wherein the communications session option in the email compose window comprises a default option to launch the multi-party communications session with only those email recipients currently present and active on the instant messaging account;
provide a first delay delivery option via the email compose window to delay delivery of the email until each of selected intended email recipients is present and active on the instant messaging account; and
provide a second delay delivery option via the email compose window to delay delivery of the email until each of selected intended email recipients is not present and not active on the instant messaging account.

16. The computer readable storage medium of claim 15, wherein the email window includes a compose email window for sending an email.

17. The computer readable storage medium of claim 15, wherein communications session includes at least one of the following: an instant messaging session and a web conference.

18. The computer readable storage medium of claim 15, further comprising instructions for causing the computer to determine current instant messaging availability related to at least one of the plurality of intended recipients.

19. The computer readable storage medium of claim 15, further comprising instructions for causing the computer to determine at least one participant of the communications session.

20. The computer readable storage medium of claim 15, wherein the plurality of intended recipients includes at least one intended recipient of a blind courtesy copy of the email and wherein the at least one intended recipient of the blind courtesy copy is provided read-only instant messaging functionality.

* * * * *